United States Patent
Kameyama

(10) Patent No.: US 8,472,745 B2
(45) Date of Patent: Jun. 25, 2013

(54) IMAGE PROCESSING METHOD, APPARATUS, PROGRAM, AND RECORDING MEDIUM FOR THE SAME

(75) Inventor: Hirokazu Kameyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 238 days.

(21) Appl. No.: 12/972,040

(22) Filed: Dec. 17, 2010

(65) Prior Publication Data
US 2011/0200270 A1 Aug. 18, 2011

(30) Foreign Application Priority Data

Feb. 16, 2010 (JP) ................. 2010-031657

(51) Int. Cl.
*G06K 9/40* (2006.01)
*G06K 9/32* (2006.01)
(52) U.S. Cl.
USPC .......................... 382/260; 382/300
(58) Field of Classification Search
USPC ............... 382/240, 254, 260–264, 298–300, 382/305, 312; 359/1.2, 3.27, 525, 532; 345/606
See application file for complete search history.

(56) References Cited

U.S. PATENT DOCUMENTS

| | | | | |
|---|---|---|---|---|
| 5,703,889 A | * | 12/1997 | Shimoda et al. | 714/809 |
| 6,157,749 A | * | 12/2000 | Miyake | 382/300 |
| 6,714,693 B1 | * | 3/2004 | Miyake | 382/300 |
| 6,738,169 B1 | * | 5/2004 | Nakase | 358/539 |
| 7,738,739 B2 | | 6/2010 | Altunbasak et al. | |

FOREIGN PATENT DOCUMENTS

| | | |
|---|---|---|
| JP | 3724008 B2 | 12/2005 |
| JP | 2009-524861 A | 7/2009 |
| JP | 2009-188891 A | 8/2009 |
| JP | 2009-253765 A | 10/2009 |
| WO | 2009/125578 A1 | 10/2009 |

OTHER PUBLICATIONS

C. Brian Atkins et al. "Optimal Image Scaling Using Pixel Classification", https://engineering.purdue.edu/bouman/publications/pdf/icip01atkins.pdf.

* cited by examiner

*Primary Examiner* — Kanjibhai Patel
(74) *Attorney, Agent, or Firm* — Birch, Stewart, Kolasch & Birch, LLP

(57) ABSTRACT

In an aspect of an image processing technique according to the present invention, a high-frequency component is extracted from a low-resolution image z which is a restoration target, and a high-frequency image z' is generated (#20). Interpolation filter coefficients $A'_i$, $B'_i$ and $\pi_i$ and a representative high-frequency image $z'_i$ are set (#22), a Gaussian mixture model represented by $x=\Sigma\{((A'_i \times z')+B'_i) \times w_i((z'_i-z'), \pi_i)\}$ is assumed and a filtering process is applied to the high-frequency image z' (#24). On the other hand, an enlargement process is applied to a low-frequency component and a medium-frequency component of the low-resolution image z (#26), a processing result of the filtering process and a processing result of the enlargement process are added (#28), and a high-resolution image is restored.

29 Claims, 21 Drawing Sheets

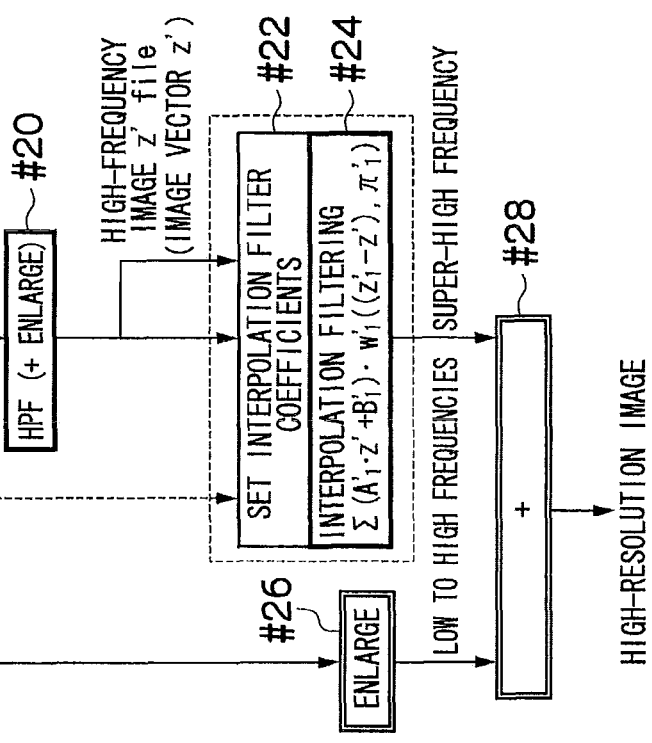
FIG. 1B
<RESTORATION STEP>
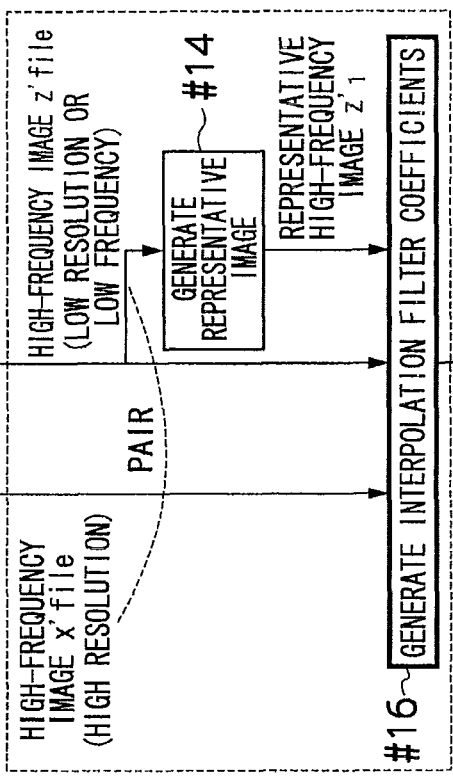
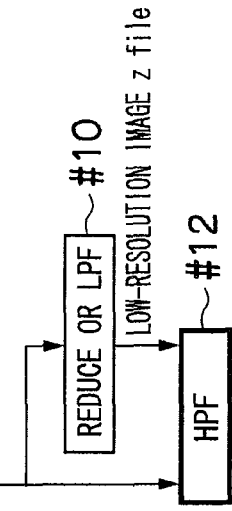
FIG. 1A
<LEARNING STEP>

FIG. 2A

| 5 | 5 | 5 |
|---|---|---|
| 5 | 14 | 5 |
| 5 | 5 | 5 |

FIG. 2B

| -1 | -1 | -1 |
|---|---|---|
| -1 | 8 | -1 |
| -1 | -1 | -1 |

FIG. 2C

| 5 | 5 | 5 |
|---|---|---|
| 5 | -4 | 5 |
| 5 | 5 | 5 |

FIG. 2D

| 1 | 1 | 1 |
|---|---|---|
| 1 | -8 | 1 |
| 1 | 1 | 1 |

270

| DIRECTION | IMAGE PROCESSING PARAMETER |
|---|---|
| 0° | SPECIFIC PARAMETER A0 |
| 20° | SPECIFIC PARAMETER A1 |
| ⋮ | ⋮ |
| FOR NON-PERSON | NON-SPECIFIC PARAMETER B |

FIG. 23A

| 5 | 5 | 5 |
|---|---|---|
| 5 | 14 | 5 |
| 5 | 5 | 5 |

FIG. 23B

| -9 | -9 | -9 |
|---|---|---|
| -9 |  | -9 |
| -9 | -9 | -9 |

FIG. 23C

| 5 | 5 | 5 |
|---|---|---|
| 5 | -4 | 5 |
| 5 | 5 | 5 |

FIG. 23D

| 9 | 9 | 9 |
|---|---|---|
| 9 |  | 9 |
| 9 | 9 | 9 |

IMAGE PROCESSING METHOD, APPARATUS, PROGRAM, AND RECORDING MEDIUM FOR THE SAME

BACKGROUND OF THE INVENTION

1. Field of the Invention

The present invention relates to an image processing method, apparatus, program, and recording medium for the same, and more particularly, to interpolation, enlargement and coding processes for generating (restoring) high-image-quality information which does not exist before the processes are performed, from low-image-quality information.

2. Description of the Related Art

As a method of generating an output image having a high resolution (high image quality) from an input image having a low resolution (low image quality), various techniques have been proposed in which a pair of a low-resolution image and a high-resolution image is previously learned for content of many images, a relationship of conversion from low-resolution information to high-resolution information is obtained, and this conversion relationship is used to generate (restore) an image including the high-resolution information from the input image having the low resolution. For example, a Bicubic method known as a cubic interpolation method is an approach which provides a natural image with less information loss in comparison with a nearest neighbor method, a bilinear method and the like, while the Bicubic method causes image blurring.

On the other hand, a method has been known in which a correspondence relationship between the low-resolution image and the high-resolution image is previously learned, and also stored as the pair of the low-resolution image and the high-resolution image for each patch (a divided region of each predetermined number of pixels), in a database thereof, and the low-resolution image is converted into the high-resolution image with reference to this database of the patch pair of the low-resolution image and the high-resolution image. This approach requires a processing time proportional to the number of databases×a filter size×the number of pixels. If a high-resolution image of about 640×480 pixels is obtained, the number of databases becomes about a hundred thousand. Thus, a storage capacity required for storing the databases increases, and also, a conversion process requires a long processing time.

As an approach which solves the above described problem, the next approach has been known. FIGS. 22A and 22B are diagrams illustrating a schematic configuration of an image processing method for solving the above described problem. The image processing method illustrated in the same figures applies a reduction (thinning) process to a high-resolution image x in a learning step illustrated in FIG. 22A, and a low-resolution image z which makes a pair with the high-resolution image x is obtained. Then, a cluster vector Y is generated as a difference between a noted pixel and a vector filter in the low-resolution image z.

In nine pixels of 3×3 size illustrated in FIG. 23A, one pixel with a data value of "14" positioned in the center is the noted pixel, and eight pixels surrounding the noted pixel are the vector filter. The difference between the noted pixel and the vector filter illustrated in FIG. 23A is calculated (a differential process and a normalization process), and thereby, an eight-dimensional cluster vector Y illustrated in FIG. 23B is generated. Similarly, the difference between the noted pixel and the vector filter illustrated in FIG. 23C is calculated, and thereby, a cluster vector Y illustrated in FIG. 23D is generated. This cluster vector Y is generated for each pixel in a low-resolution pixel (a pair of the low-resolution pixel and a high-resolution pixel).

When as many cluster vectors Y as the number of pixels in the low-resolution image are generated, a representative vector $\mu_i$ (i is a class number) is generated as a representative of the cluster vectors Y. In other words, a smaller number of the representative vectors $\mu_i$ than the number of pixels in the low-resolution image are generated from as many cluster vectors Y as the number of pixels in the low-resolution image. For example, about 100 representative vectors $\mu_i$ are generated for a hundred thousand cluster vectors. Each pixel in the low-resolution image is classified (classification) into any of i classes by this representative vector $\mu_i$.

Approaches for generating the representative vector $\mu_i$ include, for example, an approach in which an EM algorithm is applied to a GMM (Gaussian Mixture Model). In this way, significant reduction in the number of databases is realized by obtaining the representative vector $\mu_i$ in which the cluster vectors Y is converted into a representative value. In addition, interpolation filter coefficients $A_i$, $B_i$ and $\mu_i$ (i is the class number) are generated from the high-resolution image x, the low-resolution image z, the cluster vector Y and the representative vector $\mu_i$.

The interpolation filter coefficients $A_i$, $B_i$ and $\mu_i$ generated in the learning step are used in a restoration step illustrated in FIG. 22B. Here, the interpolation filter coefficient $A_i$ requires a size larger than the cluster vector Y in order to restore frequency components from a low-frequency component to a medium-frequency component in the low-resolution image. For example, as the interpolation filter coefficient $A_i$, a size of about 5×5 (a vector of about 25 dimensions) with the noted pixel in the center is required.

On the other hand, in the restoration step illustrated in FIG. 22B, the cluster vector Y is generated for each pixel, from a high-frequency component of the inputted low-resolution image z, and also, interpolation filter coefficients $A_i$, $B_i$ and $\mu_i$ as well as the representative vector $\mu_i$ are set depending on the inputted low-resolution image z and the cluster vector Y. In other words, an interpolation calculation $((A_i \times z) + B_i)$ using the interpolation filter coefficients $A_i$ and $B_i$ is weighted by a weight $(w_i((\mu_i - Y), \pi_i))$ determined using the cluster vector Y, the representative vector $\mu_i$ and the interpolation filter coefficient $\pi_i$, and all calculation results obtained for the respective classes are added to generate a high-frequency image as an output.

In other words, the inputted low-resolution image z is multiplied by a compound matrix (filter coefficient) $A_i$, supplemented with a bias $B_i$, and also multiplied by the weight depending on the difference $(\mu_i - Y)$ between the representative vector $\mu_i$ and the cluster vector Y for each input pixel. This calculation is repeated for i, and a weighted sum of all the classes is calculated and outputted as the high-frequency image. The above described interpolation filtering process can be represented as $\Sigma((A_i \cdot z) + B_i) \cdot w_i((\mu_i - Y), \pi_i)$. It should be noted that $\pi_i$ means a contribution rate (a contribution rate for each class) in the normalization process, and $\Sigma \pi_i = 1$ (a sum of $\pi$ of all the classes is 1).

"OPTIMAL IMAGE SCALING USING PIXEL CLASSIFICATION" (https://engineering.purdue.edu/~bouman/publications/pdf/icip01atkins.pdf, C. Brian Atkins, Charles A. Bouman, Jan P. Allebach) discloses an image processing method similar to the above described approach. Here, an outline of the image processing method according to "OPTIMAL IMAGE SCALING USING PIXEL CLASSIFICATION" (https://engineering.purdue.edu/~bouman/publications/pdf/icip01atkins.pdf, C. Brian Atkins, Charles A.

Bouman, Jan P. Allebach) will be described. In the image processing method according to "OPTIMAL IMAGE SCALING USING PIXEL CLASSIFICATION" (https://engineering.purdue.edu/~bouman/publications/pdf/icip01atkins.pdf, C. Brian Atkins, Charles A. Bouman, Jan P. Allebach), an interpolation calculation is performed with a combination of representative values of the pair (patch pair) of the high-resolution image x (High-resolution pixels x) and the low-resolution image z (Low-resolution image), information on the high-resolution image x which does not exist in the low-resolution image z is interpolated, and thus, the low-resolution image z is converted into the high-resolution image x.

The input low-resolution image (input pixel) illustrated in FIG. 24 is placed in the center of a window of 5×5 size, and the window of the 5×5 size which is peripheral pixels around this input pixel is vectorized to generate an observation vector z of 1×25 columns. This observation vector z is used for the calculation for the entire frequency domain from the low-frequency component to the high-frequency component.

On the other hand, a projection operator f is applied to the observation vector z to generate a cluster vector y. The cluster vector y is generated for each input pixel, and is for converting the input pixel into a feature so as to be associated with a context class (classify). As described above, the cluster vector y is generated as an eight-dimensional vector from a window of 3×3 size with the noted pixel of the inputted low-resolution image in the center (see FIGS. 23A to 23D). Furthermore, in a training step, weighting $w_i$ for each context class is determined based on a previously obtained distribution parameter θ.

On the other hand, according to an offline training approach, the above described distribution parameter θ and an interpolation filter coefficient Ψ are previously obtained. The high-resolution image is generated by filtering (linear filter) in which this interpolation filter coefficient Ψ is applied. The filtering with this interpolation filter coefficient Ψ can be represented as $x=\Sigma(w_i \times (A \times z+\beta))$. It should be noted that A is an interpolation function, β is a bias vector, and A and β are equivalent to $A_i$ and $B_i$ as described above, respectively. Also in an approach disclosed in "OPTIMAL IMAGE SCALING USING PIXEL CLASSIFICATION" (https://engineering.purdue.edu/~bouman/publications/pdf/icip01atkins.pdf, C. Brian Atkins, Charles A. Bouman, Jan P. Allebach), the significant reduction in the number of databases is realized by converting the cluster vectors y obtained for the respective input pixels, into representative values.

Japanese Patent No. 3724008 discloses an apparatus which converts normal-resolution image information into high-resolution image information, and outputs the high-resolution image information. The apparatus according to Japanese Patent No. 3724008 is configured so that coefficient data used for estimating a video signal of a high-definition system (HD image) corresponding to a video signal of an NTSC system (SD data) is previously obtained by learning for each class, and then, an SD image is interpolated based on this coefficient data, and thus, data which is more approximate to actual HD data is obtained.

Moreover, Japanese Patent Application Laid-Open No. 2009-524861 discloses an apparatus and a method for improving a spatial resolution of a digital image. The apparatus and the method are configured so that an interpolation filter is used to classify and interpolate input pixels in a low-resolution image, and the classification and updating of the interpolation filter are repeated until a predetermined convergence condition is satisfied. Paragraph [0044] of Japanese Patent Application Laid-Open No. 2009-524861 describes that a corresponding low-resolution image is obtained from a high-resolution image in order to obtain a training image.

Japanese Patent Application Laid-Open No. 2009-253765 discloses an image processing system which models a feature region of an input image, and reduces a calculation time required for generating a high-quality image from a low-quality image. Paragraph [0124] of Japanese Patent Application Laid-Open No. 2009-253765 describes that a high-frequency component is extracted from a sample image, and the high-frequency component of an image of an object is stored.

Japanese Patent Application Laid-Open No. 2009-188891 discloses an image processing apparatus in which, when a still image is extracted from a moving image, it is determined whether effective analysis between images is forward analysis or reverse analysis, and a predetermined super resolution enlargement process is applied to the extracted still image based on a result of the determination. Paragraph [0130] of Japanese Patent Application Laid-Open No. 2009-188891 describes that a high-frequency component is extracted from supplied image information.

SUMMARY OF THE INVENTION

However, in the image processing method according to the above described conventional art, there are still many representative values of the pair of the high-resolution image and the low-resolution image, such as about 50 to 100 classes. Thus, a high-capacity memory is required for storing the classes, and also, a processing speed cannot be said to be sufficiently high. Furthermore, since a restoration target is all the frequency components from the low-frequency component to the high-frequency component, a filter size for restoring the frequency components from the low-frequency component to the medium-frequency component cannot be reduced, which is a problem.

Moreover, while the restoration target is all the frequency components from the low-frequency component to the high-frequency component, the representative vector $\mu_i$ for decreasing the number of representatives (the number of classes) is obtained from the high-frequency component, and thus, an artifact occurs in every patch cycle due to this inconsistency of the frequency components. In other words, as in examples described using FIGS. 23A to 23D, if one dimension in the center significantly varies, such as from "14" to "−4", the cluster vector y significantly varies, and classification into a similar class becomes difficult. As a result, smoothness between pixels restored from adjacent input pixels is lost, and thus, unnaturalness occurs in a restored image.

The present invention has been made in view of such circumstances, and it is an object of the present invention to provide a preferred image processing technique which attempts to accelerate a processing speed in an interpolation process when a high-quality image is generated from a low-quality image, and also can reduce a necessary memory capacity, and furthermore, eliminates unnaturalness occurring in each patch in a restored high-quality image.

The following aspects of the present invention are provided in order to achieve the above described object.

An image processing method according to a first aspect of the present invention includes a setting step of setting interpolation filter coefficients which are used in an interpolation calculation and generated from a high-frequency/high-quality image which is generated by extracting a high-frequency component of a high-quality image, and a high-frequency/low-quality image which is generated by extracting a high-frequency component of a low-quality image is extracted, the high-quality image and the low-quality image being in a pair having image qualities different from each other, as well as from a representative high-frequency image corresponding to any of a previously set number of classes into which the high-frequency/low-quality image is converted as representative values, and setting the representative high-frequency image; a high-frequency/low-quality image generation step of generating a high-frequency/low-quality image by extracting a high-frequency component of a low-quality image which is an input image in a restoration processing; and a high-quality-image generation step of generating a super-high-frequency component which does not exist in the high-frequency/low-quality image by applying an interpolation calculation process using the set interpolation filter coefficients and the set representative high-frequency image to each pixel of the generated high-frequency/low-quality image, and including the generated super-high-frequency component into the low-quality image to generate a high quality image which has an image quality higher than the low-quality image.

A step of extracting high-frequency component in the first aspect may include an enlargement step of enlarging a size of the low-quality image.

In the image processing method according to the first aspect, an aspect including a storage step of storing the interpolation filter coefficients and the representative high-frequency image is preferable.

Moreover, examples of the interpolation filter coefficients include an interpolation matrix, a bias vector, a contribution rate of each class, and a combination thereof.

"High-quality image" is a concept including images including information which does not exist in a low-quality image, and examples of "high-quality image" include a high-resolution image having a resolution higher than a low-quality image (low-resolution image), an image having the same resolution as the low-quality image and including, for example, a super-high-frequency component which does not exist in the low-quality image, and the like.

Examples of the representative high-frequency image include an aspect represented by a multidimensional (m×n dimensional) vector in which pixel values of a process target pixel and peripheral pixels included in a range of a size of m×n (where m and n are any positive integers, and may be m=n) with the process target pixel in the center are subtracted from an average value of the pixel value of the process target pixel and the pixel values of the peripheral pixels.

The image processing method according to a second aspect of the present invention, in the image processing method according to the first aspect, further includes an obtaining step of obtaining the interpolation filter coefficients and the representative high-frequency image.

Specific examples of the image processing method according to the second aspect include an aspect in which the interpolation filter coefficients and the representative high-frequency image are read out from a storage device which stores the interpolation filter coefficients and the representative high-frequency image.

In the image processing method according to a third aspect of the present invention, in the image processing method according to the first or second aspect, the interpolation filter coefficients and the representative high-frequency image are generated in a learning step using a learning image pair including a high-quality learning image and a low-quality learning image having image qualities different from each other, and the learning step includes a low-quality learning image generation step of generating the low-quality learning image from the high-quality learning image; a high-frequency/low-quality learning image generation step of generating a high-frequency/low-quality learning image by extracting a high-frequency component of the low-quality learning image; a representative high-frequency image generation step of generating the representative high-frequency image in which the generated high-frequency/low-quality learning image is converted into a same number of classes as a previously set number of learning representatives, as representative values; a high-frequency/high-quality image generation step of generating the high-frequency/high-quality image by extracting the high-frequency component of the high-quality image; and an interpolation filter coefficient generation step of generating the interpolation filter coefficients from the high-frequency/low-quality image, the high-frequency/high-quality image and the representative high-frequency image.

In the image processing method according to the third aspect, learning in the learning step according to the third aspect may be executed depending on a restoration condition in a restoration step according to the first aspect.

The image processing method according to a fourth aspect of the present invention, in the image processing method according to the third aspect, further includes a number of learning representatives obtaining step of obtaining the number of learning representatives.

In the image processing method according to the fourth aspect, an aspect in which the number of learning representatives corresponding to the low-quality image which is the input image in the restoration processing is obtained is preferable.

In the image processing method according to a fifth aspect of the present invention, in the image processing method according to any of the first to fourth aspects, the high-quality-image generation step generates the super-high-frequency component which does not exist in the high-frequency/low-quality image, by executing an interpolation process represented in a form of a product of result of an interpolation coefficient calculation having at least the high-frequency/low-quality image included in a parameter and a weight coefficient having at least the high-frequency/low-quality image included in a parameter and represented as a multiple sum for the number of classes at least any of one of a Gaussian mixture distribution and a mixture multinomial distribution, by using the representative high-frequency image, the high-frequency/low-quality image, the interpolation filter coefficients, and a weight depending on the low-quality image which is the input image in the restoration processing for each class.

According to the image processing method according to the fifth aspect, since the high-frequency/low-quality image is set to be common as the parameter in the parameters of the interpolation coefficient calculation and the weight coefficient, a cluster vector y which is a parameter unique to the weight coefficient in the image processing method according to the conventional art is not required to be generated.

In the image processing method according to a sixth aspect of the present invention, in the image processing method according to any of the first to fifth aspects, the interpolation process is executed using following formula:

$$x' = \Sigma[(A'_i z' + B'_i) \times w'_i \{(z_i' - z'), \pi_i\}]$$

where x' is the super-high-frequency component which does not exist in the high-frequency/low-quality image, $z'_i$ is the representative high-frequency image, z' is the image vector of the high-frequency/low-quality image, $A'_i$ is an interpolation matrix of the class i corresponding to each process target pixel, $B'_i$ is an bias vector, $\pi_i$ is a contribution rate of each class of the target pixel, and wi is the weight.

The image processing method according to a seventh aspect of the present invention, in the image processing method according to any of the first to sixth aspects, further includes an enlargement step of applying an enlargement process to the low-quality image so as to cause a number of pixels in the low-quality image which is the restoration target, to correspond to a number of pixels in the high-quality image after being restored; and an addition step of adding a processing result in the enlargement step and a processing result in the high-quality-image generation step.

In the seventh aspect of the image processing method according to the present invention, an aspect in which the enlargement process in the enlargement step is applied to frequency components from a low-frequency component to a medium-frequency component, in the low-quality image which is the input image in the restoration processing, is preferable.

The image processing method according to an eighth aspect of the present invention, in the image processing method according to any of the first to seventh aspects, further includes a normalization processing step of applying a normalization process to the generated high-frequency/low-quality image.

According to the image processing method according to the eighth aspect, if a small number of particular classes have a too high contribution rate, the contribution rate can be distributed across a plurality of classes.

In the image processing method according to a ninth aspect of the present invention, in the image processing method according to any of the first to eighth aspects, the high-quality-image generation step includes an interpolation calculation process execution determining step of determining whether or not to execute the interpolation calculation process, depending on any of a size of a data value included in the high-frequency/low-quality image, a frequency of a data value exceeding a predetermined size, and an accumulated value of the data value exceeding the predetermined size.

According to the image processing method according to the ninth aspect, a region for which the interpolation calculation is executed is limited in the low-quality image which is the restoration target, and thereby, it is possible to attempt to accelerate the entire image processing.

The image processing method according to a tenth aspect of the present invention, in the image processing method according to the ninth aspect, further includes a threshold obtaining step of obtaining a threshold used for determining whether or not to execute the interpolation calculation process.

An aspect in which any of a plurality of thresholds determined depending on the restoration condition is selectively obtained is also preferred.

In the image processing method according to an eleventh aspect of the present invention, in the image processing method according to the ninth aspect, the addition step executes a process for adding the processing result in the high-quality-image generation step and the processing result in the enlargement step, when it is determined in the interpolation calculation process execution determining step that the interpolation calculation process in the high-quality-image generation step is executed.

In the image processing method according to the eleventh aspect, a preferred aspect includes a configuration in which the processing result in the enlargement step is outputted when it is determined in the interpolation calculation process execution determining step that the interpolation calculation is not executed.

The image processing method according to a twelfth aspect of the present invention, in the image processing method according to the ninth aspect, further includes a switching step of selectively switching whether a processing result in the addition step is outputted or the processing result in the enlargement step is outputted, wherein the switching step outputs the processing result in the addition step when it is determined in the interpolation calculation process execution determining step that the interpolation calculation process in the high-quality-image generation step is executed, and outputs the processing result in the enlargement step when it is determined in the interpolation calculation process execution determining step that the interpolation calculation process in the high-quality-image generation step is not executed.

According to the image processing method according to the twelfth aspect, since the interpolation calculation process is executed if needed, the entire image processing can be accelerated.

The image processing method according to a thirteenth aspect of the present invention, in the image processing method according to any of the first to twelfth aspects, further includes a feature region specifying step of specifying a feature region in the high-frequency/low-quality image; and a compression step of compressing an image portion in the feature region at a first compression strength, while compressing a region other than the feature portion at a second compression strength higher than the first compression strength, in the high-frequency/low-quality image, wherein the high-quality-image generation step applies the interpolation calculation process using the set interpolation filter coefficients and the set representative high-frequency image to at least the feature region.

In the thirteenth aspect, an aspect is also possible in which a second feature region specifying step of specifying a second feature region for a calculation result obtained by the interpolation calculation applied to the region which is not specified as the feature region, and a compression step of compressing the feature region and the second feature region at the first compression strength and compressing the other region at the second compression strength are included.

An image processing method according to a fourteenth aspect of the present invention includes a low-quality learning image generation step of generating a low-quality learning image having an image quality lower than a high-quality image, from a high-quality learning image; a high-frequency/low-quality learning image generation step of generating a high-frequency/low-quality learning image by extracting a high-frequency component of the low-quality learning image; a representative high-frequency image generation step of generating a representative high-frequency image in which the generated high-frequency/low-quality learning image is converted into a same number of classes as a previously set number of learning representatives, as representative values; a high-frequency/high-quality image generation step of generating a high-frequency/high-quality image by extracting a high-frequency component of the high-quality image; and an interpolation filter coefficient generation step of generating interpolation filter coefficients from the high-frequency/low-quality learning image, the high-frequency/high-quality image and the representative high-frequency image.

In a preferred aspect of the image processing method according to the fourteenth aspect, an obtaining step of obtaining the number of learning representatives is included.

An image processing apparatus according to a fifteenth aspect of the present invention includes a setting device which sets interpolation filter coefficients which are used in an interpolation calculation and generated from a high-frequency/ high-quality image which is generated by extracting a high-frequency component of a high-quality image, and a high-frequency/low-quality image which is generated by extracting a high-frequency component of a low-quality image, the high-quality image and the low-quality image being in a pair having image qualities different from each other, as well as from a representative high-frequency image corresponding to at least any of a previously set number of classes into which the high-frequency/low-quality image is converted as representative values, and sets the representative high-frequency image; a high-frequency/low-quality image generation device which generates a high-frequency/low-quality image by extracting a high-frequency component of a low-quality image which is an input image in a restoration processing; and a high-quality-image generation device which generates a super-high-frequency component which does not exist in the high-frequency/low-quality image by applying interpolation calculation process using the set interpolation filter coefficients and the set representative high-frequency image to each pixel of the generated high-frequency/low-quality image, and including the generated super-high-frequency component into the low-quality image to generate a high quality image which has an image quality higher than the low-quality image.

In the image processing apparatus according to the fifteenth aspect, an aspect is also possible in which a device (hardware) having a function corresponding to each step according to any of the second to thirteenth aspects is included.

A program according to a sixteenth aspect of the present invention causes a computer to function as a setting device which sets interpolation filter coefficients which are used in an interpolation calculation and generated from a high-frequency/high-quality image which is generated by extracting a high-frequency component of a high-quality image, and a high-frequency/low-quality image which is generated by extracting a high-frequency component of a low-quality image, the high-quality image and the low-quality image being in a pair having image qualities different from each other, as well as from a representative high-frequency image corresponding to at least any of a previously set number of classes into which the high-frequency/low-quality image is converted as representative values, and sets the representative high-frequency image; a high-frequency/low-quality image generation device which generates a high-frequency/low-quality image by extracting a high-frequency component of a low-quality image which is an input image in a restoration processing; and a high-quality-image generation device which generates a super-high-frequency component which does not exist in the high-frequency/low-quality image by applying an interpolation calculation process using the set interpolation filter coefficients and the set representative high-frequency image to each pixel of the generated high-frequency/low-quality image, and including the generated super-high-frequency component into the low-quality image to generate a high quality image which has an image quality higher than the low-quality image.

The program according to the sixteenth aspect may include a program which causes a computer to function as a low-quality learning image generation device which generates a low-quality learning image having an image quality lower than the high-quality image, from a high-quality learning image; a high-frequency/low-quality learning image generation device which generates a high-frequency/low-quality learning image by extracting a high-frequency component of the low-quality learning image; a representative high-frequency image generation device which generates the representative high-frequency image in which the generated high-frequency/low-quality learning image is converted into a same number of classes as a previously set number of learning representatives, as representative values; a high-frequency/high-quality image generation device which generates the high-frequency/high-quality image by extracting the high-frequency component of the high-quality image; and an interpolation filter coefficient generation device which generates the interpolation filter coefficients from the high-frequency/low-quality image, the high-frequency/high-quality image and the representative high-frequency image.

Moreover, in the program according to the sixteenth aspect, a program which causes a computer to function as a device (hardware) corresponding to each step according to any of the second to thirteenth aspects can also be configured.

A seventeenth aspect of the present invention provides a non-transitory recording medium in which computer-readable code of the program according to the sixteenth aspect is stored. Magneto-optical recording media including CD (compact disk), DVD, and HD (hard disk), and semiconductor memory like flash memory can be adopted as the recording medium.

According to the image processing method according to the present invention, since the restoration target is limited to the high-frequency component, a processing time for the interpolation process in the high-quality-image generation step is significantly reduced. Moreover, since the restoration target is limited to the high-frequency component so as to reduce variation in clustering, an effect of reducing the number of classes can also be expected. In addition, since a size of an interpolation filter is reduced, it is possible to attempt to reduce a processing time when the interpolation filter coefficients are generated, and reduce the memory capacity for storing the interpolation filter coefficients.

Furthermore, since the size of the interpolation filter used in the interpolation process is reduced, it is possible to attempt to reduce the memory capacity. Moreover, inconsistency is prevented when a restoration result of the frequency components from the low-frequency component to the medium-frequency component and a restoration result of the high-frequency component are synthesized, and an artifact which may occur in each restoration process is prevented from occurring in a restored image.

BRIEF DESCRIPTION OF THE DRAWINGS

FIGS. 1A and 1B are overall configuration diagrams illustrating a schematic configuration of an image processing method according to an embodiment of the present invention;

FIGS. 2A to 2D are explanatory diagrams of image vectors;

FIGS. 23A to 23D are explanatory diagrams of cluster vectors in the image processing method according to the conventional art.

DETAILED DESCRIPTION OF THE PREFERRED EMBODIMENTS

Figure 3A:
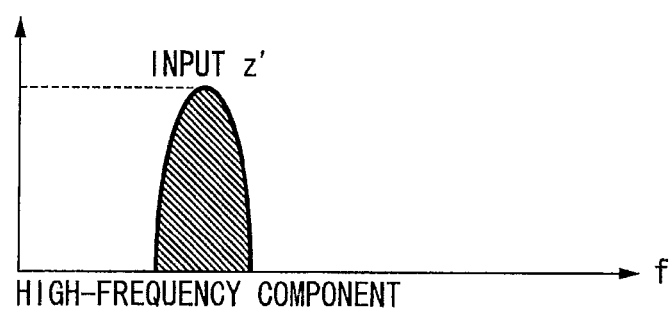
FIGS. 3A and 3B are explanatory diagrams of a high-frequency component and a super-high-frequency component in the image processing method according to an embodiment of the present invention.

Hereinafter, embodiments of the present invention will be described in detail according to the accompanying drawings.

[Summary]

An image processing method to be described below restores a high-resolution image from a low-resolution input image. In this image processing method, the high-resolution image, in which information which does not exist in the low-resolution image is interpolated and high-resolution information is interpolated, is generated by a conversion (interpolation) calculation using interpolation filter coefficients for defining a conversion relationship between the low-resolution image and the high-resolution image.

It should be noted that the image processing method according to the present invention is not limited to an image conversion process including changing of a resolution, and is also applicable to image processing which, for a high-quality image and a low-quality image having the same resolution, restores a high-quality image in which information which does not exist in the low-quality image is interpolated. The following description will be provided on the premise of a process which generates a high-resolution image having 640×480 pixels from a low-resolution image having 320×240 pixels (generates four pixels of the high-resolution image from one pixel of the low-resolution image).

[Description of Learning Step]

As a preparatory stage for performing the image processing, the low-resolution image is previously created from the high-resolution image to learn data, and the interpolation filter coefficients for defining the conversion relationship are obtained. Such a process is referred to as "learning step". Then, a step of obtaining a high-resolution output image from an input image of any low resolution image by using the interpolation filter coefficients obtained in this learning step is referred to as "restoration step".

FIG. 1A is an overall configuration diagram illustrating a schematic configuration of the learning step. Moreover, FIG. 1B is an overall configuration diagram illustrating a schematic configuration of the restoration step.

The learning step illustrated in FIG. 1A is configured to include a low-resolution image generation step (#10) in which a filtering process is applied to a high-resolution image x file (a learning image x) by using a reduction process (for example, a process for thinning a pixel per pixel), a low-pass filter (LPF) or the like, and a low-resolution image z file having a resolution lower than the high-resolution image x file is generated; a high-frequency component extraction step (#12) in which a filtering process (a process for extracting a high-frequency component) is applied to the learning image x file and the low-resolution image z file by using a high-pass filter (HPF), and a pair (patch pair) of a high-frequency/high-resolution image x' file and a high-frequency/low-resolution image z' file is generated; a representative high-frequency image generation step (#14) in which a representative high-frequency image $z'_i$ (i is a class number) for each class is generated from the high-frequency/low-resolution image z' file; and an interpolation filter coefficient generation step (#16) in which interpolation filter coefficients $A'_i$, $B'_i$ and $\pi_i$ are calculated based on the high-frequency/high-resolution image x' file, the high-frequency/low-resolution image z' file and the representative high-frequency image $z'_i$.

In the low-resolution image generation step (#10), a process for reducing an inputted high-resolution learning image x to a designated size, for example, such as (½)×(½) or (¼)×(¼), is applied. As a reduction method applied in the same step, approaches such as a Bicubic method, a B-spline method, a bilinear method and a nearest neighbor method can be applied.

In the high-frequency component extraction step (#12), a process in which the high-frequency component is extracted from the learning image x and the low-resolution image z file which have been inputted (a process in which a low-frequency component and a medium-frequency component are suppressed for the learning image x and the low-resolution image z file which have been inputted) is applied. Examples of a filter applied in the high-frequency component extraction step include a filter used for an unsharp mask (input-averaging filter), Laplacian (second-order differential), gradient (first-order differential) and the like.

Examples of the high-frequency component extracted in the high-frequency component extraction step include a Nyquist frequency in a sampling theorem. In other words, the high-frequency component extraction process is performed for the input image by using a frequency corresponding to the Nyquist frequency in the output image as a threshold, and thereby, any image quality degradation factor included in the low-frequency component of the input image can be eliminated, and a preferable high-quality image is restored.

It should be noted that the high-frequency component extracted in the high-frequency component extraction step may be a so-called cutoff frequency (a frequency with a response of −3 dB), and is set as appropriate depending on conditions of the resolutions of the input image (low-resolution image) and the output image (high-frequency image) and the like.

In other words, in the high-frequency component extraction step, the high-frequency/low-resolution image z' file (image vector z') is generated from the low-resolution image z file. FIGS. 2A to 2D are diagrams in which a relationship between the input and the output in the high-frequency component extraction step is schematically represented. FIG. 2A illustrates a noted pixel (a pixel with a data value of "14") and peripheral pixels (pixels of 3×3 size with data values of "5") around the noted pixel, in the low-resolution image z file. A nine-dimensional image vector z' as illustrated in FIG. 2B is generated by calculating a difference between a value of each pixel and an average of the noted pixel and the peripheral pixels around the noted pixel ((5×8)+14)/9=6. Similarly, a nine-dimensional image vector z' illustrated in FIG. 2D is generated from an input of 3×3 size illustrated in FIG. 2C.

The representative high-frequency image generation step (#14) is a step of converting the image vectors z' into a representative value, and as many representative high-frequency images $z'_i$ as the number of classes are generated. An approach in which an EM algorithm is applied to a GMM (mixture normal distribution model) is applied to the representative high-frequency image $z'_i$, similarly to the approach for generating the representative vector $\mu_i$ from the cluster vectors y in the conventional art. In other words, a conditional probability is inferred in an E step of the EM algorithm, and in an M step, a likelihood function is maximized by using an inferred value in the E step, the likelihood function is maximized with a current conditional probability, a next conditional probability is obtained, and a loop calculation in the E step and the M step is repeatedly executed until an output of the likelihood function is stabilized.

It should be noted that a Dirichlet mixture model or the like may be used in addition to the GMM, and a variational Bayesian method, an MCMC (Markov Chain Monte Carlo), a Gibbs sampler or the like may be used instead of the EM algorithm.

In the above calculation, a center of gravity for each class of the image vector z' may be obtained and classified by a k-means method, and set in an initial state. For example, in order to learn a hundred thousand pixels based on 100 classes, the learning is performed about ten-thousand times. A convergence condition in this case is $e^{-10}$. In a process in the representative high-frequency image generation step, a calculation process represented by the following equations (1) to (4) is repeatedly executed.

$$N_i^{(k+1)} = \sum_{s \in S} p_{i|z'}(i \mid z'_s, \theta^{(k)}) \sum p_{z|i} \quad (1)$$

$$\pi_i^{(k+1)} = N_i^{(k+1)} / N \quad (2)$$

$$z_i^{(k+1)} = (1/N_i) \sum_{s \in S} z'_s P_{i|z'}(i \mid z'_s, \theta^{(k)}) \quad (3)$$

$$\sigma^{2(k+1)} = (1/d) \sum_{i=l}^{M} [\pi_i^{(k+1)} \Xi_i] \quad (4)$$

where $$\Xi_i = 1/N_i^{(k+1)} \sum_{s \in S} \|1 z'_s - z_i^{(k+1)}\|^2 P(i \mid z'_s, \theta^{(k)})$$

It should be noted that "N" in Equation (1) represents the number of training vectors (z,x) generated from a pair (training set) of the high-resolution image x file and the low-resolution image z file, and when a set of pixels of the low-resolution image in the pair of the training set is S, the training vectors extracted from the training set are represented as $\{(z_s, x_s)\}_s \in s$.

"$\pi_i$" in Equation (2) is an existence probability of an i-th class, and in Equation (3), "$p_i|z'(i|z',\theta)$" is a probability of the high-frequency image z' existing in a class i, and "$p_i|z'(i|z')$" is a multivariate Gaussian density equation or a multivariate Dirichlet density equation for i and z'. In (4), "$\sigma^2$" is an average of sample variance of elements of the image vector z', "d" is the number of elements of the image vector z', and M is the number of classes. It should be noted that maximum likelihood estimation for "θ" in Equation (2) is performed by the EM algorithm (θmax is decided), θmax is assigned, and thus "θ" becomes nonexistent as a variable.

The interpolation filter coefficient generation step (#16) is a step in which the interpolation filter coefficients used for the interpolation calculation in the restoration step are generated. In the interpolation filter coefficient generation step, the pair of the high-frequency/high-resolution image x' file and the high-frequency/low-resolution image z' file, as well as the representative high-frequency image $z'_i$ are inputted, and the interpolation filter coefficients $A'_i$, $B'_i$ and $\pi_i$ are generated. The interpolation filter coefficient $A'_i$ is an interpolation matrix, and is represented by the following Equation (5). Moreover, the interpolation filter coefficient $B'_i$ is a bias vector, and is represented by the following Equation (6). $\pi_i$ is the existence probability (contribution rate) of the i-th class, and is normalized so that a sum of all the classes becomes 1, and represented by the above Equation (2).

$$A'_i = \sum_{x'z'} \left| i \sum_z z \right| i \right|^{-1} \quad (5)$$

$$B'_i = V_{x'} \left| i - \sum_{x'} z' \right| i \sum_{z'} z' |iV_{z'}| i \quad (6)$$

where $1 \leq i \leq M$, $$v_i \stackrel{def}{=} \begin{pmatrix} V_{x'|i} \\ V_{z'|i} \end{pmatrix} = (1/N_i) \sum_{s \in S} b_s p_{i|zs'}(i \mid z'_s, \theta)$$

$$\sum_i \stackrel{def}{=} \begin{pmatrix} \sum_{x'} x' \left| i \sum_{x'} zs' \right| i \\ \sum_{x'}^t z' \left| i \sum_{z'} z' \right| i \end{pmatrix} = \frac{1}{N_i s \in \in} \sum b_s b'_s p_{i|y}(i \mid z'_s, \theta)$$

$$b_s \stackrel{def}{=} \begin{pmatrix} Xs' \\ Zs' \end{pmatrix}$$

It should be noted that the above described interpolation filter $A'_i$, $B'_i$ and $\pi_i$ coefficients are merely an example, and the interpolation filter coefficients are determined as appropriate depending on the interpolation calculation in the restoration step.

The representative high-frequency image $z'_i$ and the interpolation filter coefficients $A'_i$, $B'_i$ and $\pi_i$, which are generated in the above described learning step, are provided to the restoration step to be described next. It should be noted that a preferred aspect includes a storage step (not illustrated) in which the interpolation filter coefficients $A'_i$, $B'_i$ and $\pi_i$ generated in the interpolation filter coefficient generation step are stored in a predetermined memory. Moreover, in the learning step, the learning in accordance with restoration conditions in the restoration step to be described later is preferably performed.

The restoration conditions include a resolution ratio of the low-resolution image which is a restoration target to the high-resolution image after being restored, a size ratio of the low-resolution image to the high-resolution image, a frequency component of the restoration target (which is added to the high-resolution image after being restored), a storage capacity for the high-resolution image after being restored, and the like.

Figure 22B:
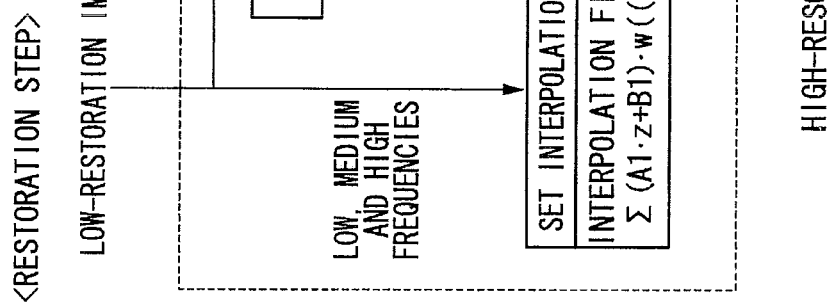
FIGS. 22A and 22B are overall configuration diagrams illustrating a schematic configuration of an image processing method according to the conventional art.
Figure 22A:
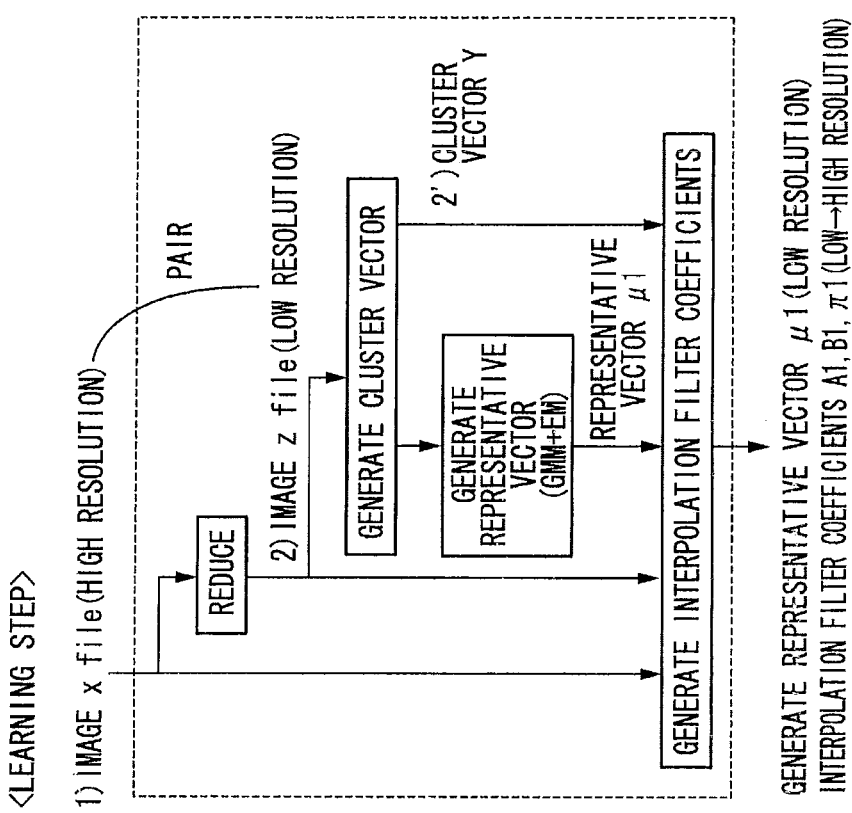
Figure 24:
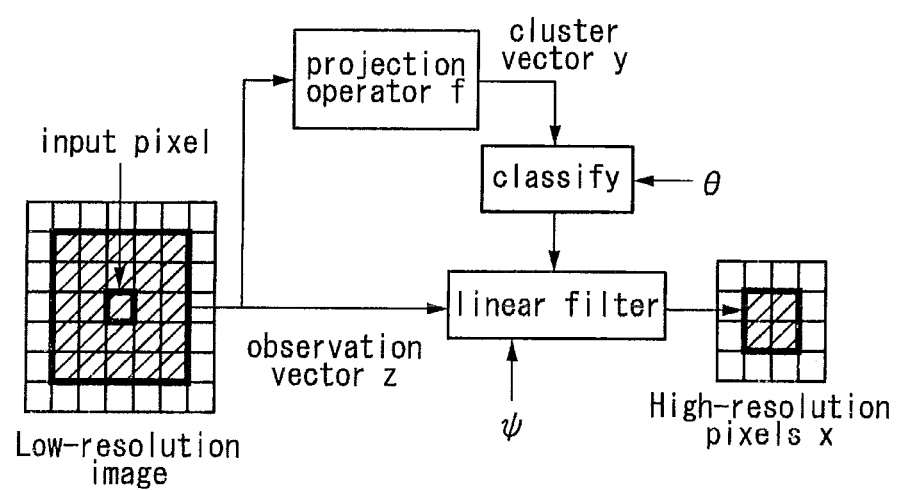
FIG. 24 is an explanatory diagram of an image processing method described in "OPTIMAL IMAGE SCALING USING PIXEL CLASSIFICATION" (https://engineering.purdue.edu/~bouman/publications/pdf/icip01atkins.pdf, C. Brian Atkins, Charles A. Bouman, Jan P. Allebach).

In the above described learning step, since the cluster vector y for generating the interpolation filter coefficients in the learning step according to the conventional art can be replaced with the image vector z', the cluster vector y is not required, and a step of generating the cluster vector y is not required to be provided (see FIGS. 22A, 22B and 24).

[Description of Restoration Step]

Next, the restoration step will be described. In the restoration step, the high-resolution image is generated from the input image (low-resolution image z) and outputted. In the restoration step, a process may be performed for each patch of a predetermined size which is made by dividing the input image, or the process may be performed for each pixel. In this example, it is premised that the input image is divided into a plurality of patches of the predetermined size, and the process is performed for each of the patches.

The restoration step illustrated in FIG. 1B is configured to include a high-frequency component extraction step (#20) in which the high-frequency component is extracted from the low-resolution image z which is the restoration target, and the image vector z' is generated; an interpolation filter coefficient setting step (#22) in which the interpolation filter coefficients $A'_i$, $B'_i$ and $\pi_i$ and the representative high-frequency image $z'_i$, which are generated in the learning step illustrated in FIG. 1A, are set for each pixel of the inputted low-resolution image z; an interpolation filtering step (#24) in which a filtering process is applied to the image vector z' generated from the low-resolution image z, by using the interpolation filter coefficients $A'_i$, $B'_i$ and $\pi_i$ and the representative high-frequency image $z'_i$, which are set in the interpolation filter coefficient setting step; an enlargement processing step (#26) in which an enlargement process is applied to the low-resolution image z by using the approach such as the Bicubic; and an addition step (#28) in which frequency components from a low-frequency component to a high-frequency component of an high-resolution image enlarged in the enlargement processing step are added to a super-high-frequency component of a high-resolution image generated in the interpolation filtering step, and thereby, a high-resolution image including all the frequency components ranging from the low-frequency component to the super-high-frequency component is generated.

As an output for one pixel of the inputted low-resolution image z, four pixels of the high-resolution image in which the information which does not exist in the low-resolution image is interpolated are obtained through each step in the restoration step illustrated in FIG. 1B.

In other words, the low, medium and high-frequency components of the high-resolution image generated by applying the enlargement process to the low-resolution image z are added to the super-high-frequency component of the high-resolution image generated by applying a conversion process using the interpolation filter coefficients, and thereby, the high-resolution image including information on the super-high-frequency component which does not exist in the low-resolution image z is generated.

The high-frequency component extraction step may have a configuration in which the enlargement process is added to the process for suppressing the low-frequency component and the medium-frequency component by using the high-pass filter (the high-frequency component extraction process). Content of the high-frequency component extraction process in the high-frequency component extraction step is common to the process illustrated in FIG. 1A, and thus a description thereof is herein omitted.

In the interpolation filter coefficient setting step, the interpolation filter coefficients $A'_i$, $B'_i$ and $\pi_i$ and the representative high-frequency image $z'_i$, which have been previously generated in the learning step, are set, and also, a weight coefficient $w_i$ depending on the inputted low-resolution image z is set. In the interpolation filtering step, a process for converting the image vector z' into a super-high-frequency/high-resolution image (an image in which the information which does not exist in the low-resolution image z is interpolated) is executed by using the interpolation filter coefficients $A'_i$, $B'_i$ and $\pi_i$ and the representative high-frequency image $z'_i$, which have been set in the interpolation filter coefficient setting step. This conversion process assumes a Gaussian mixture model (Gaussian mixture distribution) represented by the following Equation (7). It should be noted that a mixture multinomial distribution such as a Dirichlet mixture model may be assumed instead of the Gaussian mixture model.

$$x'=\Sigma(A'_i z'+B'_i)\times w_i'((z_i'-z'),\pi_i) \tag{7}$$

In other words, the image vector z' is multiplied by the interpolation matrix $A'_i$ of the class i corresponding to each process target pixel, and also, the bias vector $B'_i$ is added to a result of this multiplication. Moreover, weighting with the weight $w_i$ calculated corresponding to each process target pixel is performed, and a weighted sum is obtained for all the classes. The weight $w_i$ is calculated depending on a difference between the representative high-frequency image $z'_i$ and the image vector z' (an Euclidean distance in a vector space), and the contribution rate $\pi_i$ of each class of the target pixel.

Figure 3B:
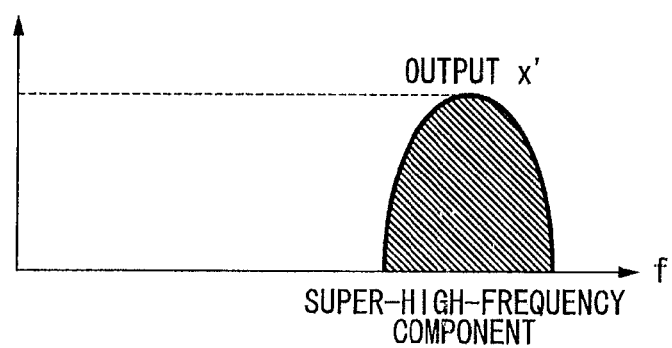

In this way, based on the information included in the high-frequency component (a hatched frequency region in FIG. 3A) of the high-frequency/low-resolution image z' (input z'), the information on the super-high-frequency component (a hatched region in FIG. 3B) in the high-resolution image x' (output x') is interpolated. Data of the frequency components from the low-frequency component to the high-frequency component in the high-frequency image to which the process is applied by the enlargement processing step is added to data of this super-high-frequency component, and the output image (high-resolution image) including all the frequency components from the low-frequency component to the super-high-frequency component is generated.

In this example, an aspect has been illustrated in which, as a function of increasing the number of pixels so as to cause the number of pixels in the image including the super-high-frequency component for the output, and the number of pixels in the image including the frequency components from the low-frequency component to the high-frequency component, to coincide with each other, the enlargement process for the high-frequency/low-resolution image z' file is performed together with a function of the conversion into the super-high-frequency component in the interpolation filtering step. However, the enlargement process for the high-frequency/low-resolution image z' file may be executed in a stage prior to the high-frequency component extraction step or a stage following the high-frequency component extraction step.

According to the image processing method configured as described above, since the restoration target is limited to the high-frequency component, the interpolation filter coefficients $A'_i$, $B'_i$ and $\pi_i$ used for the interpolation are downsized, and thus, high-speed processing is enabled. Also, a storage capacity for storing the interpolation filter coefficients $A'_i$, $B'_i$ and $\pi_i$ and the representative high-frequency image $z'_i$ can be reduced.

Moreover, since the generation of the cluster vector for reducing variation of a clustering target is eliminated, and frequencies of the clustering target and the restoration target are commonly increased, inconsistency which may occur in a restored image due to a difference between both is eliminated, and an artifact which may occur in every patch cycle is reduced. Furthermore, as illustrated in FIGS. 2A to 2D, the clustering target and the restoration target are caused to coincide with each other in terms of vector elements for representing luminance of the center of the patch (pixels of 3×3 size included in the image vector), and as a result, a new one-dimensional vector element is provided (the nine-dimensional image vector is generated). Therefore, a luminance normalization criterion is changed from the pixel in the center of the patch to the entire patch, and a degree of connection among the patches is improved.

Furthermore, an effect can be obtained in which noise components superimposed from the low-frequency component to the medium-frequency component in the low-resolution image are eliminated by the high-pass filter provided for limiting the restoration target to the high-frequency component of the low-resolution image.

It should be noted that while the image processing method has been described in the above described embodiment, the image processing method can also be replaced with hardware in which the same function as each step described above is realized. For example, an image processing apparatus can also be configured by replacing the low-resolution image generation step (#10), the high-frequency component extraction step (#12), the representative high-frequency image generation step (#14), and the interpolation filter coefficient generation step (#16) of FIG. 1A, with a low-resolution image generation unit, a high-frequency component extraction unit, a representative high-frequency image generation unit, and an interpolation filter coefficient generation unit, respectively, and also replacing the high-frequency component extraction step (#20), the interpolation filter coefficient setting step (#22), the interpolation filtering step (#24), the enlargement processing step (#26), and the addition step (#28), with a high-frequency component extraction unit, an interpolation filter coefficient setting unit, an interpolation filtering unit, an enlargement processing unit, and an addition unit, respectively. Moreover, a program can also be configured in which each step in the above described image processing method is realized by a computer.

Second Embodiment

Next, the image processing method according to a second embodiment of the present invention will be described. In the second embodiment to be described below, new functions are added to the image processing method according to the above described first embodiment. It should be noted that, in the following description, the same reference numerals are assigned to the same or similar portions as the above description, and the description thereof is omitted.

Figure 4B:
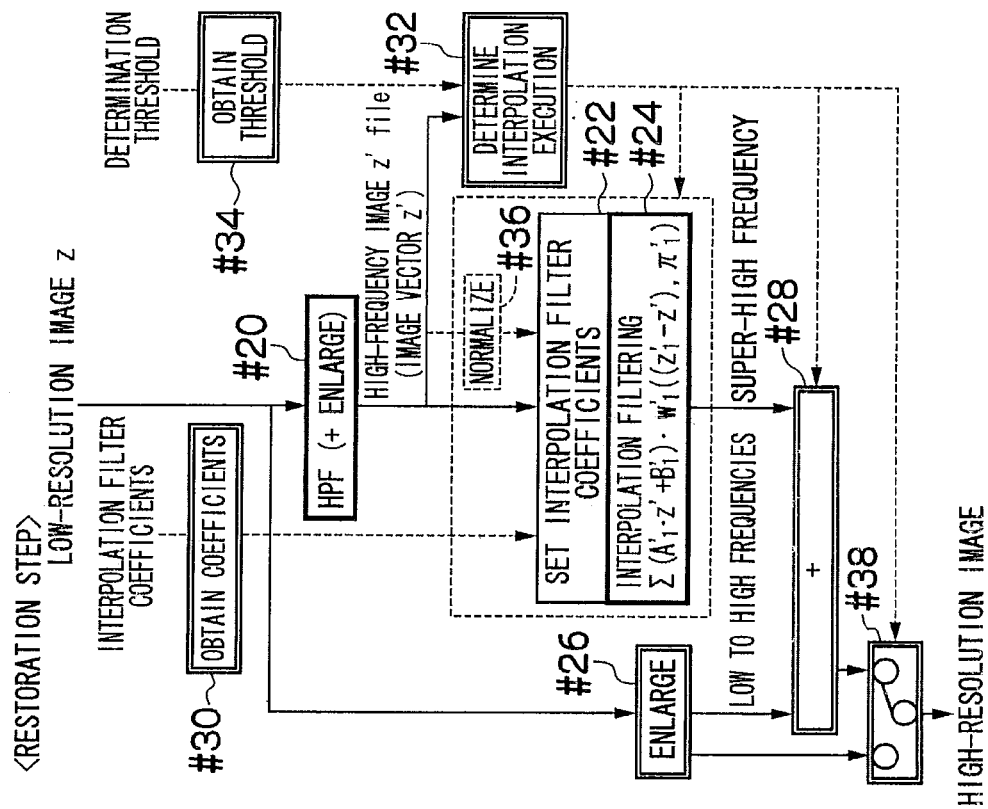
FIGS. 4A and 4B are explanatory diagrams of another aspect of the image processing method illustrated in FIGS. 1A and 1B.
Figure 4A:
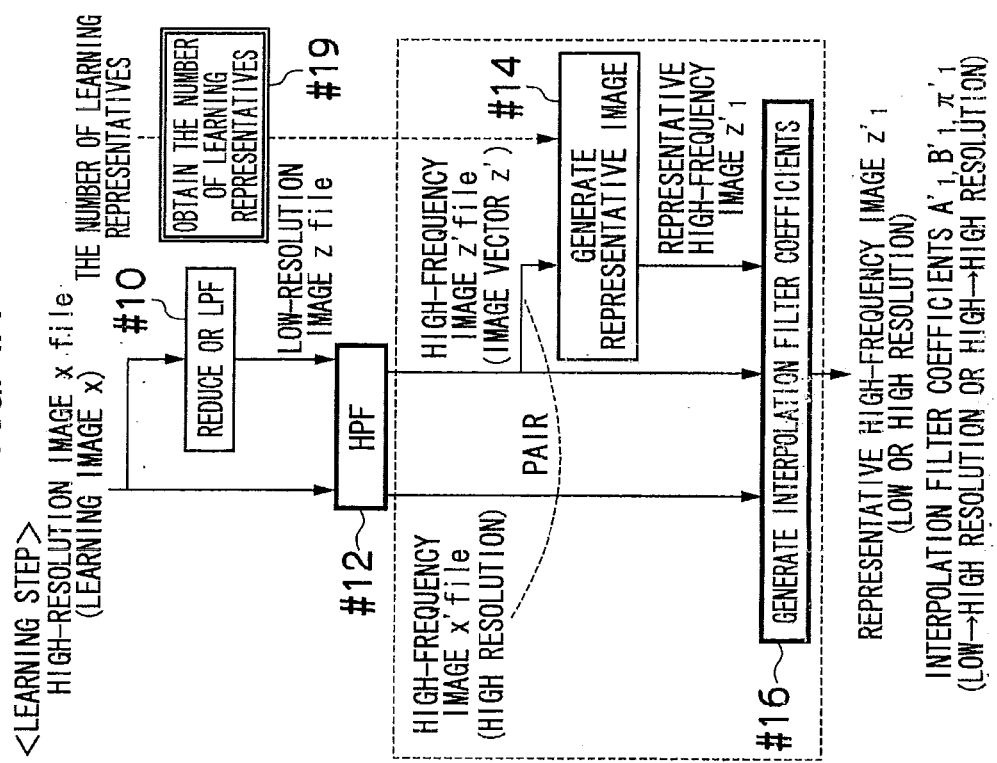

FIG. 4A is an overall configuration diagram illustrating a schematic configuration of the learning step according to the second embodiment of the present invention, and FIG. 4B is an overall configuration diagram illustrating a schematic configuration of the restoration step: In the learning step illustrated in FIG. 4A, a number of learning representatives obtaining step (#19) of obtaining the number of learning representatives (the number of classes, the number of representative high-frequency images $z'_i$) from the outside is added to the learning step illustrated in FIG. 1A.

In other words, since the number of learning representatives can be determined as appropriate depending on an image of a learning object, each step can be efficiently executed in the learning step, and the number of the interpolation filter coefficients $A'_i$, $B'_i$ and $\pi_i$ and the representative high-frequency image $z'_i$, which are obtained in the learning step, is optimized.

The restoration step illustrated in FIG. 4B is configured to include, in addition to the restoration step illustrated in FIG. 1B, an interpolation filter coefficient obtaining step (#30) of obtaining the interpolation filter coefficients $A'_i$, $B'_i$ and $\pi_i$ and the representative high-frequency image $z'_i$ from the outside; an interpolation execution determining step (#32) of determining whether or not an interpolation process using the interpolation filter coefficients $A'_i$, $B'_i$ and $\pi_i$ and the representative high-frequency image $z'_i$ is executed; a threshold obtaining step (#34) of obtaining a determination threshold used for the interpolation execution determination, from the outside; a normalization processing step (#36) of applying a normalization process to the high-frequency/low-resolution image z' file; and a selective output (selector) step (#38) of selectively outputting any one of the image including the information on the entire frequency domain from the low-frequency component to the super-high-frequency component which are added in the addition step (#28), and the image enlarged by the enlargement processing step (#26), according to a result of the determination in the interpolation execution determining step.

Moreover, the addition step (#28) is configured so that an addition process is executed depending on the determination result in the interpolation execution determining step.

In the interpolation execution determining step (#32), the interpolation execution determination depending on the high-frequency image z' file is performed. In other words, processes in the interpolation filter coefficient setting step, the interpolation filtering step, the addition step and the selective output step are determined depending on the determination result in the interpolation execution determining step.

Figure 5:
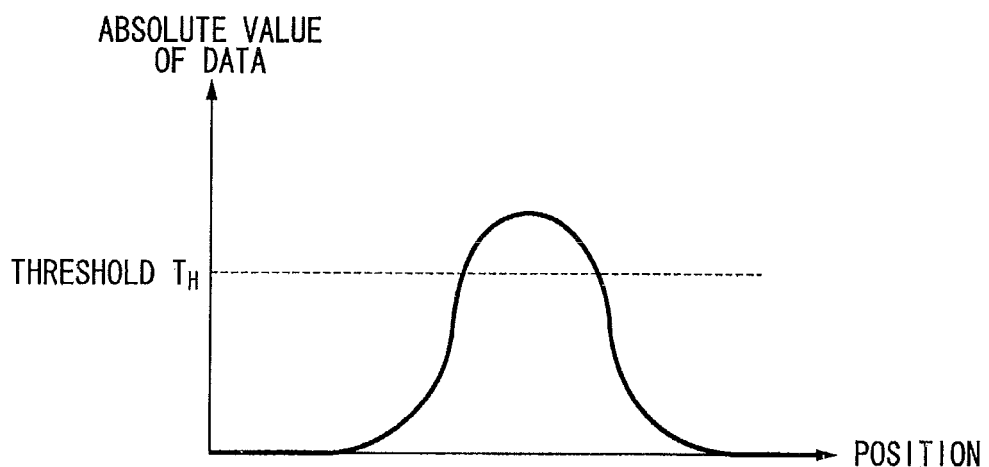
FIG. 5 is an explanatory diagram of an interpolation execution determining step illustrated in FIGS. 4A and 4B.

In the interpolation execution determination, a magnitude (amplitude) of a high-frequency component of data included in the high-frequency image z' file, a frequency of the high-frequency component (the number of pixels having data exceeding a threshold within a local region), the accumulated number of amplitudes within the local region, and the like can be used. FIG. 5 is a diagram illustrating an example in which a predetermined threshold $T_H$ is set for the magnitude of the high-frequency component (an absolute value of the data). In such a case, if the absolute value of the data in the high-frequency image z' which is a process target exceeds the threshold $T_H$ (a position with data exceeding a dashed line in FIG. 5), the interpolation filter coefficients are set in the interpolation filter coefficient setting step, the filtering process is executed in the interpolation filtering step, the addition process is executed in the addition step, and an instruction to output the high-resolution image to which the addition process is applied is issued in the selective output step.

On the other hand, if the absolute value of the data in the high-frequency image z' which is the process target is equal to or less than the predetermined threshold (a position with data equal to or lower than the dashed line in FIG. 5), an instruction to stop the process is issued in the interpolation filter coefficient setting step, the interpolation filtering step, and the addition step, and also, an instruction to output the image to which the enlargement process is applied by the enlargement processing step is issued in the selective output step.

In other words, in a case where a processing speed is regarded as important, it is determined by threshold determination whether or not a restoration process is required for the process target pixel (region), and the restoration process is executed for only the pixel for which the restoration process is required. Since a restoration process target to which the interpolation process is to be applied is limited in this way, the processing speed can be improved.

For example, when a process for a binary image of a person's face represented by each data value of one of two values 1 and 0 is considered, it is conceivable to apply the filtering process using the interpolation filter coefficients (a resolution enhancement process) to a region (black region) represented by the data value of 1, apply a process such as the enlargement process other than the resolution enhancement process to a region (white region) represented by the data value of 0, thereby limit the region to which the resolution enhancement process requiring a long processing time is applied, and attempt to accelerate the total processing speed.

It should be noted that an aspect including a weighting-weighted sum processing step instead of the selective output step is also preferred. The weighting-weighted sum processing step is configured so that a processing result in the addition step (output $I_1$) and a processing result in the enlargement processing step (output $I_2$) are multiplied by weights $w_1$ and $w_2$ ($=1-w_1$) obtained from the absolute value of the data in the high-frequency image z' which is the process target, and the weighted processing results are added ($I_1 \times w_i + I_2 \times w_2$). The weights are determined so that the processing result in the addition step becomes more dominant (a value of $w_1$ becomes larger than a value of $w_2$) as the absolute value of the data in the high-frequency image z' which is the process target is larger. The weighting-weighted sum processing step is effective if a process is executed in which the image quality is regarded as important.

Figure 6:
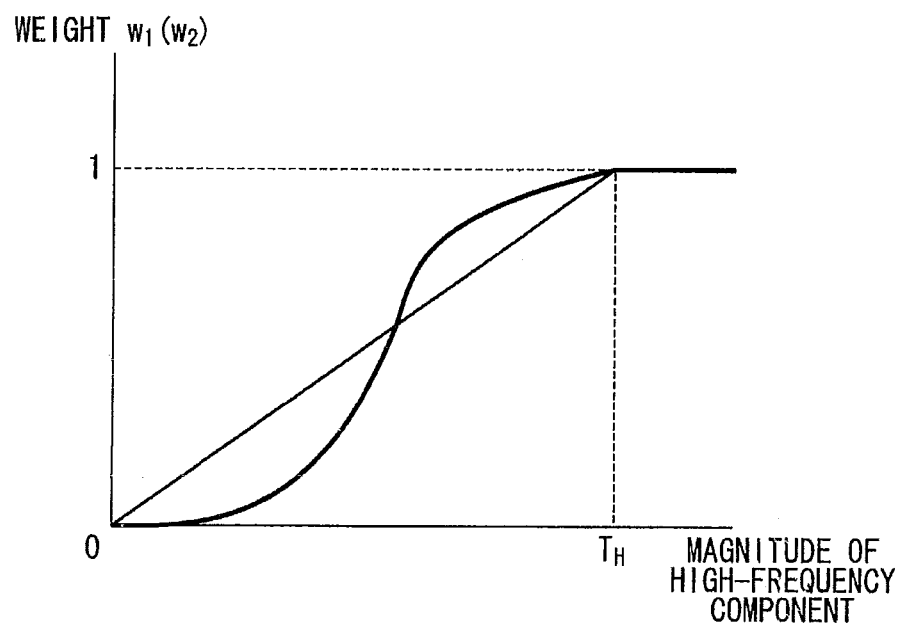
FIG. 6 is an explanatory diagram of a weighting-weighted sum processing step.

As illustrated in FIG. 6, the weight $w_1$ ($w_2$) used in the weighting-weighted sum processing step may be linear or nonlinear (a linear function up to the threshold $T_H$, a sigmoid function or the like).

In the normalization processing step (#36), n-norm |z'| of the inputted high-frequency/low-resolution image z' file is calculated, and z'/|z'| is outputted. n is arbitrarily selected from values around 1. According to the configuration including the normalization processing step, if a small number of particular classes have a too high contribution rate, the contribution rate can be distributed across a plurality of classes, and improvement in robustness of the image subjected to the filtering is expected. On the other hand, the number of classes increases due to homogenization caused by the normalization process, and an amount of calculation can increase. It should be noted that it is determined whether or not the process in the normalization processing step is executed, according to the result in the interpolation execution determining step. It should be noted that a preferred aspect of the image processing method according to the present invention includes the normalization processing step, which, however, is not an essential component.

It should be noted that, similarly to the first embodiment, an image processing apparatus can be configured by using hardware having the same function as each step illustrated in FIGS. 4A and 4B. Moreover, a program which causes a computer to execute the function of each step illustrated in FIGS. 4A and 4B can also be created.

In the image processing method illustrated in this example, while it is not essential to limit an object of a learning image set used in the learning step, an object matching the restoration target such as a natural object or CG (computer graphics) is preferred. Moreover, further image quality enhancement is expected by limiting the learning image set as follows.

For example, the object of the learning image set includes a person's face. Moreover, in addition to the face, it is conceivable to limit the object to a region including a part of a human body, such as a head or a person's hand, or at least a part of a living body other than the human body. It should be noted that "living body" includes a particular tissue existing within the living body, such as a blood vessel or the like within the living body. Moreover, high-molecular and low-molecular substances such as a tumor tissue, cells, proteins, DNA and RNA within the living body in an endoscope system or a microscope system can also be the object.

Furthermore, in addition to the living body, a chemical compound such as a medicine, money and some kind of card such as a cash card in an authentication system, a vehicle and a license plate of the vehicle in a monitoring camera system, as well as an image, a character, a figure, a table, a photograph and the like read by a scanner device such as a duplicating machine can also be the object.

Moreover, in this example, while super-resolution processing has been described, the image processing to which the present invention is applicable is not limited to the super-resolution processing, and the present invention is also applicable to a reduction process in which an aliasing component is reduced, a color increasing process, a tone increasing process, a noise reduction process, an artifact reduction process for reducing artifacts such as block noise and mosquito noise, a blurring reduction process, a sharpening process, a frame rate increasing process, a wide dynamic range achieving process, a color tone correction process, a distortion aberration process, and a projection process such as coding.

For example, in a case of the noise reduction process, an image including noise and an image not including noise are paired and a projection relationship is learned. In other words, a pair of an image before being processed and an image after being processed is prepared, the projection relationship between the image before being processed and the image after being processed is learned, and then, operators, functions and the like to be applied to this projection process are previously prepared.

[Application]

Next, as an application according to an embodiment of the present invention, an application to a monitoring system will be described. In the monitoring system, a low-quality image obtained by a monitoring camera can be converted into a high-quality image, and the high-quality image can be displayed on a monitor, or the high-quality image can be printed by a printing apparatus.

Figure 7:
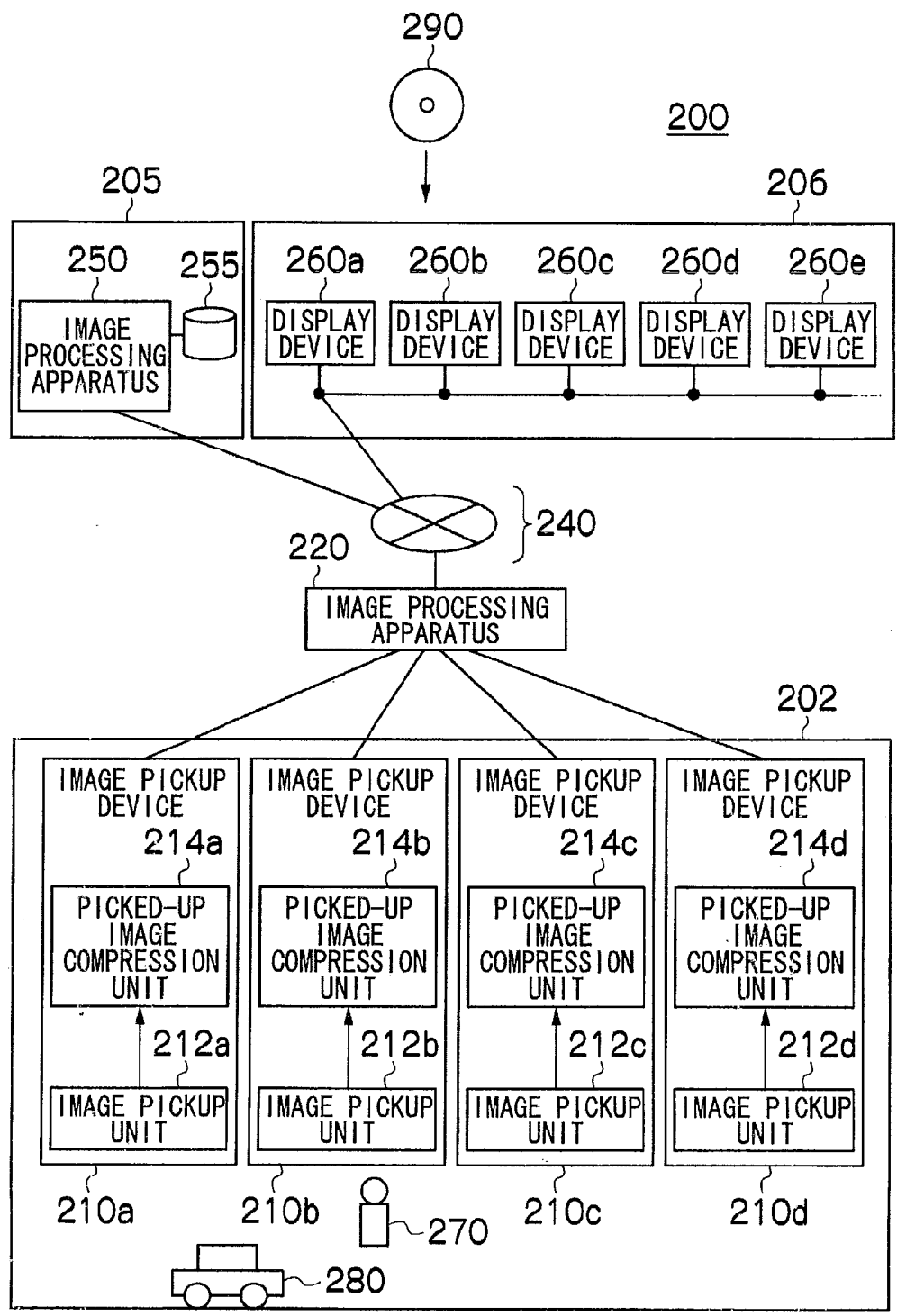
FIG. 7 is a configuration diagram illustrating an example of an image processing system according to an embodiment of the present invention.

FIG. 7 illustrates an example of an image processing system 200 according to an embodiment of the present invention. The image processing system 200 to be described below can function as the monitoring system as an example.

The image processing system 200 includes a plurality of image pickup devices 210a-d which pick up images of a monitored space 202, an image processing apparatus 220 which processes the picked-up images picked up by the image pickup devices 210a-d, a communication network 240, an image processing apparatus 250, an image database (DB) 255, and a plurality of display devices 260a-e. The image processing apparatus 250 can be installed in a space 205 which is different from the monitored space 202 (for example, a location far away from the monitored space 202). The display devices 260a-e can also be provided in a space 206 which is different from the monitored space 202 and the installation space 205 for the image processing apparatus 250.

The image pickup device 210a has an image pickup unit 212a and a picked-up image compression unit 214a. The image pickup unit 212a picks up a plurality of picked-up images by continuously picking up the image of the monitored space 202. The picked-up images obtained by the image pickup unit 212a may be the picked-up images in a RAW format. The picked-up image compression unit 214a synchronizes the picked-up images in the RAW format which have been picked up by the image pickup unit 212a, and compresses a moving image including the plurality of picked-up images, which has been obtained by the synchronization, in MPEG coding or another coding system to generate moving image data. The image pickup device 210a outputs the generated moving image data to the image processing apparatus 220.

Each of the other image pickup devices 210b, 210c and 210d also has a configuration similar to that of the image pickup device 210a, and the moving image data generated by each of the image pickup devices 210a-d is sent to the image processing apparatus 220. It should be noted that, in the following description, the image pickup devices 210a-d may be collectively referred to as "image pickup device 210". Similarly, the display devices 260a-e may be collectively referred to as "display device 260". In the following description, similar components designated by reference numerals followed by characters may be collectively referred to by the reference numeral from which the character following the reference numeral, such as a final alphabetical character following the reference numeral assigned to each of the similar components, is omitted.

The image processing apparatus 220 obtains the moving image by decoding the moving image data obtained from the image pickup device 210. The image processing apparatus 220 detects a plurality of feature regions of different feature types, such as a region in which an image of a person 270 has been picked up, a region in which an image of a mobile object 280 such as a vehicle has been picked up, and the like, from each of the plurality of picked-up images included in the obtained moving image. Then, the image processing apparatus 220 compresses the image in the feature region at a strength depending on the feature type, and also compresses an image in a region other than the feature region at a strength stronger than the compression strength for compressing the image in each feature region.

Moreover, the image processing apparatus 220 generates feature region information including information specifying the feature region detected from the picked-up image. The feature region information may be a position of the feature region, a size of the feature region, the number of the feature regions, text data including identification information identifying the picked-up image from which the feature region has been detected and the like, or data in which the text data has been subjected to a process such as compression or encryption. The image processing apparatus 220 attaches the generated feature region information to the compressed moving image data, and transmits the generated feature region information and the compressed moving image data to the image processing apparatus 250 through the communication network 240.

The image processing apparatus 250 receives the compressed moving image data associated with the feature region information from the image processing apparatus 220. The image processing apparatus 250 stores the compressed moving image data so as to be associated with the feature region information associated with the compressed moving image data, in the image DB 255. It should be noted that the image DB 255 may store the compressed moving image data in a nonvolatile storage medium such as a hard disk. In this way, the image DB 255 stores the compressed picked-up images.

Moreover, in response to a request from the display device 260, the image processing apparatus 250 reads the compressed moving image data and the feature region information from the image DB 255, expands the read compressed moving image data by using the feature region information attached thereto to generate a moving image to be displayed, and transmits the moving image to be displayed, to the display device 260 through the communication network 240. The display device 260 includes a user interface via which an image search condition or the like can be inputted, and can transmit various requests to the image processing apparatus 250, and also displays the moving image to be displayed which is received from the image processing apparatus 250.

Moreover, instead of or in combination with the above described display of the moving image, the image processing apparatus 250 can also specify the picked-up image satisfying various search conditions as well as the feature region thereof, based on the position of the feature region, the size of the feature region, the number of the feature regions and the like included in the feature region information. Then, the image processing apparatus 250 may display the image matching the search condition for the request, on the display device 260, by decoding this specified picked-up image and providing the decoded picked-up image to the display device 260.

It should be noted that the image processing apparatus 250 may expand the compressed moving image data obtained from the image processing apparatus 220, by using the corresponding feature region information, to generate the moving image to be displayed, and then store the moving image to be displayed, in the image DB 255. Moreover, at this time, the image processing apparatus 250 may store the moving image to be displayed, so as to be associated with the feature region information, in the image DB 255. According to this aspect, in response to the request from the display device 260, the image processing apparatus 250 can read the moving image to be displayed (which has been expanded) from the image DB 255, and transmit the moving image to be displayed, along with the feature region information to the display device 260.

Moreover, instead of the aspect in which the expanded moving image to be displayed is provided to the display device 260 from the image processing apparatus 250, an expansion process may be applied to the compressed moving image data to generate the image to be displayed, within the display device 260. In other words, the display device 260 may receive the feature region information and the compressed moving image data from the image processing apparatus 250 or the image processing apparatus 220. In this aspect, if the received compressed moving image data is decoded and displayed on the display device 260, the display device 260 may simply enlarge the feature region in the picked-up image which has been decoded and obtained, once, and display the feature region on the display device 260.

Furthermore, the display device 260 may decide an image quality of each feature region depending on a processing capacity in the display device 260, and enhance the image quality of the image in the feature region with the decided image quality. The display device 260 may replace the image in the feature region in the picked-up image displayed on the display device 260, with the image in the feature region to which the image quality enhancement is applied, and display the image in the feature region to which the image quality enhancement is applied, on the display device 260. As an image quality enhancement processing device used when this replacement of the display is performed, a super-resolution device using the image processing method according to the present invention can be used. In other words, an image processing apparatus to which the image processing method according to the present invention is applied can be mounted within the display device 260.

According to the image processing system 200 of this example, since the information indicating the feature region is stored so as to be associated with the moving image, a picked-up image group satisfying a predetermined condition in the moving image can be quickly retrieved and a start position of the picked-up image group can be quickly found. Moreover, according to the image processing system 200 of this example, since only the picked-up image group satisfying the predetermined condition can be decoded, a partial moving image satisfying the predetermined condition can be quickly displayed immediately in response to a display instruction.

It should be noted that a recording medium 290 illustrated in FIG. 7 stores programs for the image processing apparatus 220, the image processing apparatus 250, and the display device 260. The programs stored in the recording medium 290 are provided to electronic information processing apparatuses such as computers functioning as the image processing apparatus 220, the image processing apparatus 250, and the display device 260 according to the present embodiment, respectively. CPUs included in the computers operate depending on content of the programs to control each unit of the computers. The programs executed by the CPUs cause the computers to function as the image processing apparatus 220, the image processing apparatus 250, the display device 260 and the like, to be described in connection with FIG. 7 and the following figures.

In addition to a CD-ROM, examples of the recording medium 290 can include an optical recording medium such as a DVD or a PD, a magnetic/optical recording medium such as an MO or an MD, a magnetic recording medium such as a tape medium or a hard disk device, a semiconductor memory, a magnetic memory and the like. Moreover, a storage device, such as a hard disk or a RAM, provided in a server system connected to a dedicated communication network or the Internet can also function as the recording medium 290.

Hereinafter, configuration examples of the image processing apparatuses 220 and 250, as well as the display device 260, in the image processing system 200 of this example will be described in more detail.

(Description of Image Processing Apparatus 220)

Figure 8:
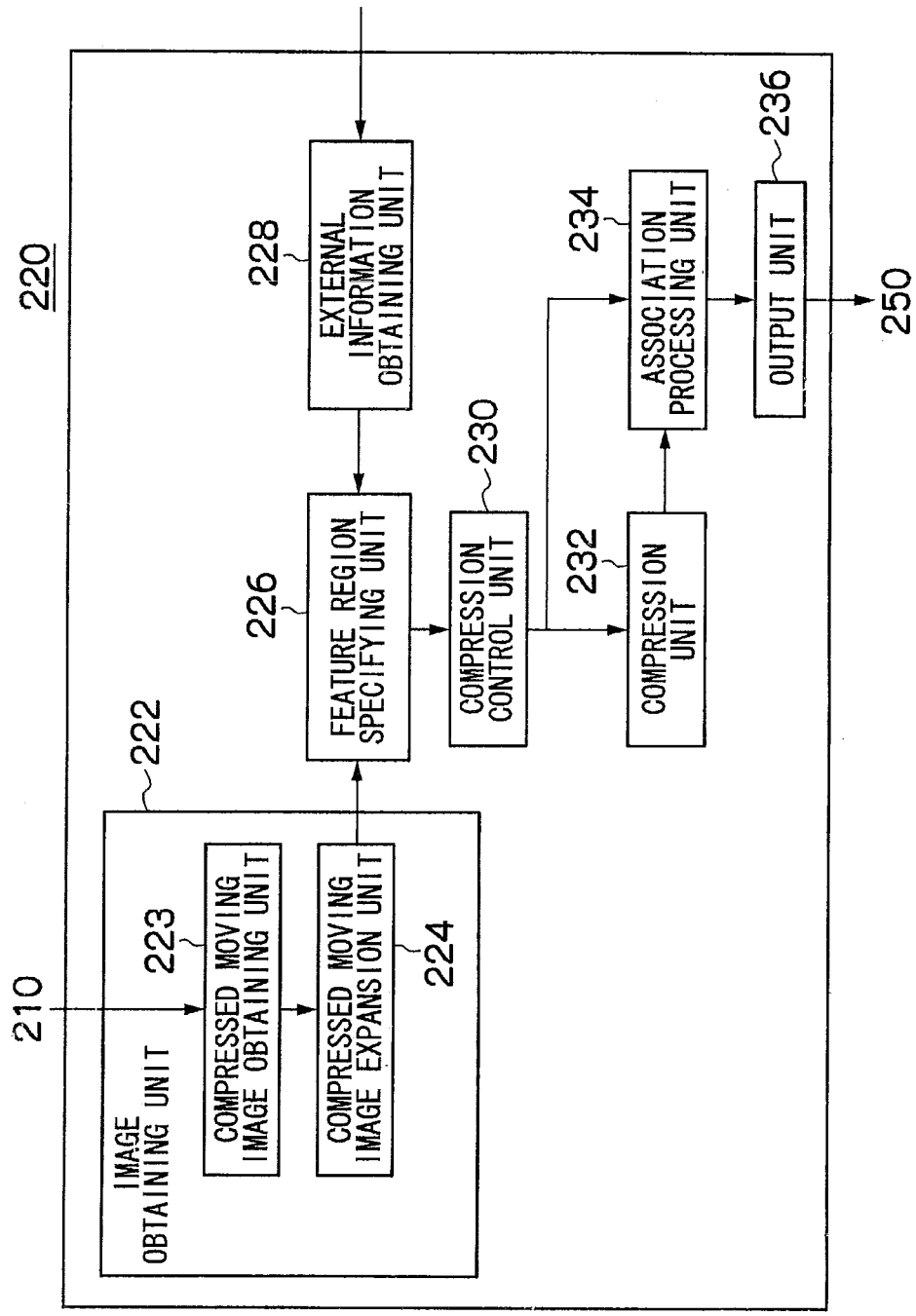
FIG. 8 is a block diagram illustrating a configuration example of an image processing apparatus 220 in FIG. 7.

FIG. 8 illustrates an example of a block configuration of the image processing apparatus 220. The image processing apparatus 220 includes an image obtaining unit 222, a feature region specifying unit 226, an external information obtaining unit 228, a compression control unit 230, a compression unit 232, an association processing unit 234, and an output unit 236. The image obtaining unit 222 has a compressed moving image obtaining unit 223 and a compressed moving image expansion unit 224.

The compressed moving image obtaining unit 223 obtains the coded moving image data generated by the image pickup device 210 (see FIG. 7). The compressed moving image expansion unit 224 expands the moving image data obtained by the compressed moving image obtaining unit 223, and thereby, generates the plurality of picked-up images included in the moving image. Specifically, the compressed moving image expansion unit 224 decodes the coded moving image data obtained by the compressed moving image obtaining unit 223, and extracts the plurality of picked-up images included in the moving image. It should be noted that the picked-up images included in the moving image may be frame images or field images.

The plurality of picked-up images obtained by the compressed moving image expansion unit 224 are supplied to the feature region specifying unit 226 and the compression unit 232. The feature region specifying unit 226 detects the feature regions from the moving image including the plurality of picked-up images. Specifically, the feature region specifying unit 226 detects the feature region from each of the plurality of picked-up images.

For example, the feature region specifying unit 226 detects an image region in which image content varies in the moving image, as the feature region. Specifically, the feature region specifying unit 226 may detect an image region including a moving object, as the feature region. The feature region specifying unit 226 can detect the plurality of feature regions of the different feature types from each of the plurality of picked-up images.

The feature type may be a type classified by a type of an object as an index, such as a person and a mobile object, and the like. Moreover, the type of the object may be decided based on a degree of coincidence in a shape of the object or a color of the object. In this way, the feature region specifying unit 226 may detect the plurality of feature regions including different types of objects, from the plurality of picked-up images.

Example 1 of Feature Region Detection Method

For example, the feature region specifying unit 226 may extract an object coinciding with a predefined shape pattern at the degree of coincidence equal to or higher than a predefined degree of coincidence, from each of the plurality of picked-up images, and detect the regions in the picked-up images including the extracted object, as the feature regions of the same feature type. It should be noted that a plurality of the shape patterns may be defined for each feature type. Moreover, examples, of the shape pattern can include the shape pattern of a person's face. It should be noted that different face patterns may be defined for a plurality of persons. Thereby, the feature region specifying unit 226 can detect different regions including different persons respectively, as different feature regions.

In addition to the above described person's face, the feature region specifying unit 226 can detect the region including a part of the human body, such as the person's head or the person's hand, or at least a part of the living body other than the human body, as the feature region.

If an image of the inside of the living body is processed, for example, if a configuration similar to the image processing system 200 is applied to the endoscope system, the particular tissue existing within the living body, such as the blood vessel or the like within the living body, and the tumor tissue within the living body can also be the object. In addition to the living body, the feature region specifying unit 226 may detect a region in which an image of the money, the card such as the cash card, the vehicle or the license plate of the vehicle has been picked up, as the feature region.

Example 2 of Feature Region Detection Method

Moreover, in addition to pattern matching by template matching or the like, the feature region specifying unit 226 can also detect the feature region, for example, based on a learning result provided by machine learning (for example, AdaBoost) described in Japanese Patent Application Laid-Open No. 2007-188419, or the like. For example, an image feature amount extracted from an image of a predefined subject and an image feature amount extracted from an image of a subject other than the predefined subject are used to learn a feature of the image feature amount extracted from the image of the predefined subject. Then, the feature region specifying unit 226 may detect a region from which the image feature amount having the feature matching the learned feature is extracted, as the feature region.

In addition to the above described Examples 1 and 2, the feature region can be detected by various methods, and the feature region specifying unit 226 detects the plurality of feature regions from the plurality of picked-up images included in each of a plurality of moving images, by appropriate methods. Then, the feature region specifying unit 226 supplies information indicating the detected feature regions, to the compression control unit 230. It should be noted that the information indicating the feature regions can include feature region coordinate information indicating the position of the feature region, type information indicating a type of the feature region, and information identifying the moving image from which the feature region has been detected.

The compression control unit 230 controls a compression process performed for the moving image by the compression unit 232, based on the information indicating the feature regions which is obtained from the feature region specifying unit 226. The compression unit 232 compresses the picked-up image so that the feature region in the picked-up image and the region other than the feature region in the picked-up image are compressed at different strengths, under the control of the compression control unit 230. For example, the compression unit 232 compresses the picked-up image by reducing a resolution of the region other than the feature region in the picked-up image included in the moving image, more than a resolution of the feature region. In this way, the compression unit 232 compresses each image region in the picked-up image, at a strength depending on a degree of importance of the image region.

It should be noted that if the feature region specifying unit 226 detects the plurality of feature regions, the compression unit 232 may compress the images in the plurality of feature regions in the picked-up image, at strengths depending on the feature types of the feature regions, respectively. For example, the compression unit 232 may reduce resolutions of the images in the plurality of feature regions in the picked-up image, to resolutions defined depending on the feature types of the feature regions.

The association processing unit 234 associates the information specifying the feature region detected from the picked-up image, with the picked-up image. Specifically, the association processing unit 234 associates the information specifying the feature region detected from the picked-up image, with a compressed moving image including the picked-up image as a moving-image component image. Then, the output unit 236 outputs the compressed moving image data associated with the information specifying the feature region, by the association processing unit 234, to the image processing apparatus 250.

The external information obtaining unit 228 obtains data used for a process for specifying the feature region by the feature region specifying unit 226, from the outside of the image processing apparatus 220. The feature region specifying unit 226 specifies the feature region by using the data obtained by the external information obtaining unit 228. The data obtained by the external information obtaining unit 228 will be described in connection with a parameter storage unit 650 illustrated in FIG. 9 to be described later.

Configuration Example of Feature Region Specifying Unit 226

Figure 9:
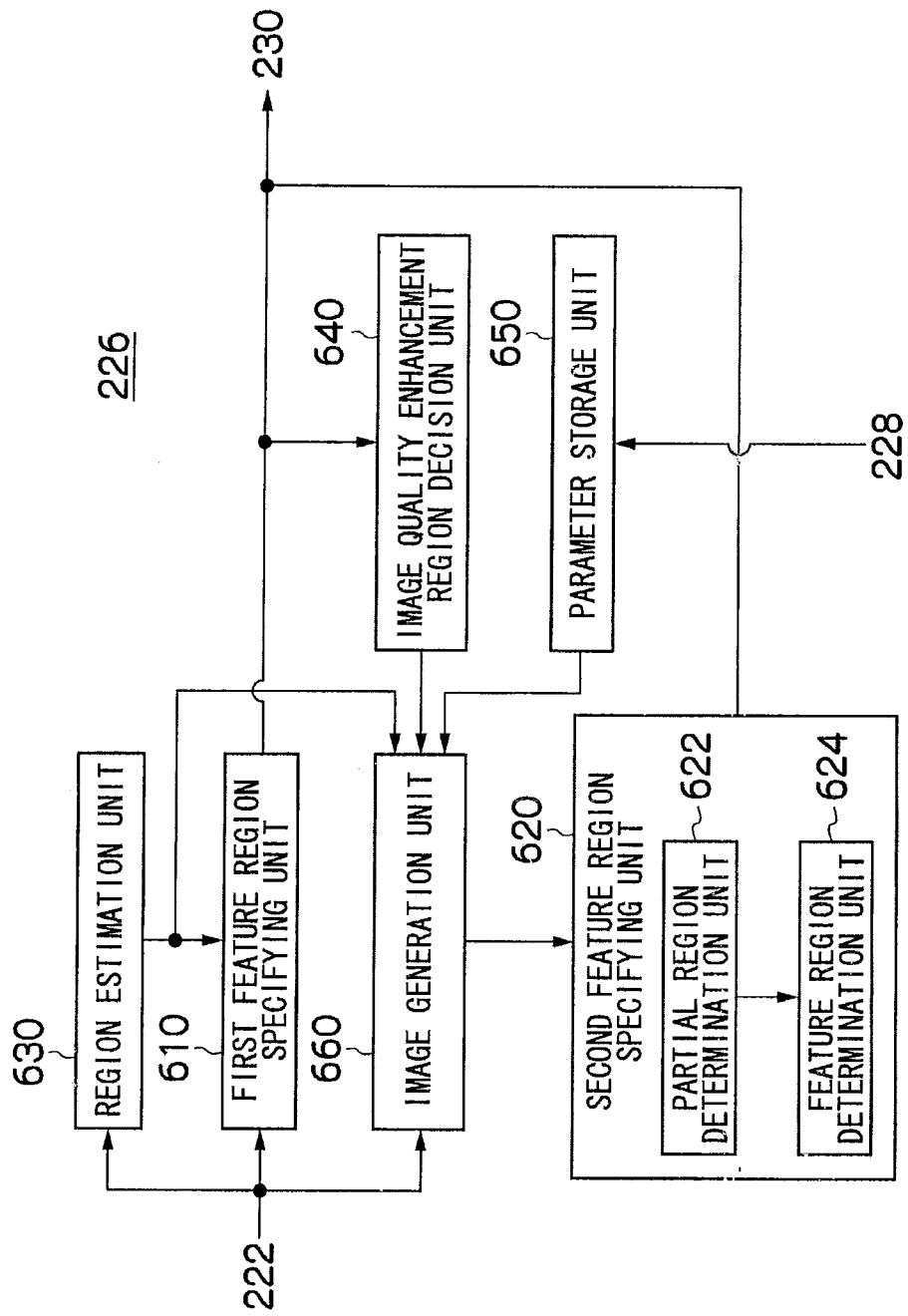
FIG. 9 is a block diagram illustrating a configuration example of a feature region specifying unit 226 in FIG. 8.

FIG. 9 illustrates an example of a block configuration of the feature region specifying unit 226. The feature region specifying unit 226 has a first feature region specifying unit 610, a second feature region specifying unit 620, a region estimation unit 630, an image quality enhancement region decision unit 640, the parameter storage unit 650, and an image generation unit 660. The second feature region specifying unit 620 includes a partial region determination unit 622 and a feature region determination unit 624.

The first feature region specifying unit 610 obtains the picked-up image which is the moving-image component image included in the moving image, from the image obtaining unit 222, and specifies the feature region from this obtained picked-up image. The first feature region specifying unit 610 may specify the feature region from the picked-up image by using the detection methods illustrated in the above described "Examples 1 and 2 of Feature Region Detection Method" to detect the feature region.

The image generation unit 660 generates a high-quality image in which the image quality enhancement is further applied to a region which is more likely to be specified as the feature region, in regions which are not specified as the feature region (corresponding to "first feature region") by the first feature region specifying unit 610, from the picked-up image. The image processing method according to the present invention can be used for a device which generates the high-quality image in this image generation unit 660.

The second feature region specifying unit 620 searches the high-quality image generated in the image generation unit 660, for a feature region (corresponding to "second feature region"). Both the feature regions specified by the first feature region specifying unit 610 and the second feature region specifying unit 620 are supplied as the feature regions specified by the feature region specifying unit 226, to the compression control unit 230.

It should be noted that the second feature region specifying unit 620 may search for the feature region more minutely than the first feature region specifying unit 610, based on the high-quality image obtained from the image generation unit 660. For example, in the second feature region specifying unit 620, there may be implemented a detector which detects the feature region with a higher degree of precision than detection precision with which the feature region is specified by the first feature region specifying unit 610. In other words, a detector which can perform the detection with a higher degree of precision than detection precision of a detector implemented as the first feature region specifying unit 610 may be implemented as the second feature region specifying unit 620.

Moreover, as another form, the second feature region specifying unit 620 may search for the feature region from the same input image as the image inputted to the first feature region specifying unit 610 (an image which is not subjected to an image quality enhancement process), more minutely than the first feature region specifying unit 610.

The image generation unit 660 may generate the high-quality image in which the image quality enhancement is more preferentially applied to the region which is more likely to be specified as the feature region, in the regions which are not specified as the feature regions by the first feature region specifying unit 610, from the picked-up image. Moreover, the image generation unit 660 may generate the high-quality image by the image processing for the picked-up image.

The image generation unit 660 may generate the high-quality image in which the image quality enhancement is further applied to the region which is more likely to be specified as the feature region, in regions which have not been specified as the feature regions by the first feature region specifying unit 610 after the first feature region specifying unit 610 has specified the feature region, from the picked-up image. In this way, "the regions which are not specified as the feature regions by the first feature region specifying unit 610" may be the regions which have not been specified as the feature regions by the first feature region specifying unit 610, at a stage where the first feature region specifying unit 610 has specified the feature region. In this case, the feature region is searched for again by the second feature region specifying unit 620.

In addition, "the regions which are not specified as the feature regions by the first feature region specifying unit 610" may be regions which are predicted not to be specified by the first feature region specifying unit 610, at a stage where the first feature region specifying unit 610 has not yet specified the feature region. For example, if the first feature region specifying unit 610 detects a region satisfying a predefined condition, as the feature region, "the regions which are not specified as the feature regions by the first feature region specifying unit 610" may be regions which do not satisfy the condition. The image generation unit 660 may generate the high-quality image at the stage where the first feature region specifying unit 610 has not yet specified the feature region.

It should be noted that, in this block diagram (FIG. 9), while the first feature region specifying unit 610 and the second feature region specifying unit 620 are illustrated as different functional blocks, the first feature region specifying unit 610 and the second feature region specifying unit 620 can naturally be implemented as a single functional element. For example, the first feature region specifying unit 610 and the second feature region specifying unit 620 can at least partially share a hardware element such as an electrical circuit for the feature region detection, a software element such as software for the feature region detection, and the like.

In the above description, a case where the image generation unit 660 generates the image in which the image quality enhancement is applied to the input image has been described by way of example. However, the image generation unit 660 may generate an image having a higher image quality than an image which is a target of a feature region specifying process for specifying the feature region by the first feature region specifying unit 610, and provide the generated image to the second feature region specifying unit 620. For example, if the first feature region specifying unit 610 applies predetermined image processing to the input image to specify the feature region, the image generation unit 660 may generate an image having a higher image quality than an image obtained by the image processing, and provide the generated image to the second feature region specifying unit 620.

The high-quality image generated by the image generation unit 660 only needs to be the image having the higher image quality than the image used for the feature region specifying process by the first feature region specifying unit 610, and includes both an image having a higher image quality than the input image and an image having a lower image quality than the input image. In this way, the image generation unit 660 generates the high-quality image in which the image quality of the region which is not specified as the feature region by the first feature region specifying unit 610 has been changed to an image quality depending on a likelihood of the region being specified as the feature region, from the input image. Moreover, the image generation unit 660 may generate the high-quality image having the image quality in precision depending on the likelihood of the region being specified as the feature region.

The region estimation unit 630 estimates a region which should be specified as the feature region in the picked-up image. For example, if the feature region specifying unit 226 should specify the region including the moving object in the moving image, as the feature region, the region estimation unit 630 estimates the region in which the moving object exists in the moving image. For example, the region estimation unit 630 estimates a position where the moving object exists, based on a position of the moving object extracted from one or more other picked-up images as the moving-image component images included in the same moving image, timings when other picked-up images have been picked up, and the like. Then, the region estimation unit 630 may estimate a region of a predetermined size including the estimated position, as the region in which the moving object exists in the moving image.

In this case, the first feature region specifying unit 610 specifies the region including the moving object, as the feature region, from the region estimated in the picked-up image by the region estimation unit 630. Then, the image generation unit 660 may generate a high-quality image in which the image quality enhancement is further applied to a region in which the region including the moving object has not been specified by the first feature region specifying unit 610, in the region estimated by the region estimation unit 630.

Thereby, if the detection of the moving object from a region in which the moving object is highly likely to exist has been failed, a likelihood of the moving object being able to be extracted through re-searching is increased. In this way, a probability of any feature region remaining without being detected in the feature region specifying unit 226 can be reduced.

The partial region determination unit 622 determines whether or not each of images in one or more partial regions existing at a predefined position in a particular image region satisfies a predefined condition. Then, based on a result of the determination in the partial region determination unit 622, the feature region determination unit 624 determines whether or not the particular image region is the feature region. For example, if it is determined whether or not the particular image region is the feature region, the partial region determination unit 622 determines whether or not each of a plurality of different partial regions on the particular image region satisfies the predefined condition. Then, if the number of partial regions for which a negative determination result is obtained is smaller than a predefined value, the feature region determination unit 624 determines that the particular image region is the feature region.

In the case where it is determined whether or not the particular image region is the feature region, if the second feature region specifying unit 620 performs the determination for the one or more partial regions existing at the predefined position in the particular image region, by the above described process, the image generation unit 660 may perform the image quality enhancement to the one or more partial regions when the image generation unit 660 generates the high-quality image in which the image quality enhancement is applied to the particular image region. Thereby, since the image quality enhancement can be applied to only regions which are effective for a feature region detection process, an amount of calculation required for a process for detecting the feature region again can be reduced.

The image quality enhancement region decision unit 640 decides the region to be applied with the image quality enhancement by the image generation unit 660. Specifically, the image quality enhancement region decision unit 640 decides a larger region to be applied with the image quality enhancement by the image generation unit 660 if the region is less likely to be specified as the feature region. The image generation unit 660 generates the high-quality image in which the image quality enhancement is further applied to the region decided by the image quality enhancement region decision unit 640. Thereby, the likelihood of the moving object being able to be extracted through the re-searching can be increased. Also, the probability of any feature region remaining without being detected in the feature region specifying unit 226 can be reduced.

The parameter storage unit 650 stores image processing parameters used for applying the image quality enhancement to an image, so as to be associated with feature amounts extracted from the image. Then, the image generation unit 660 generates the high-quality image in which the image quality enhancement is applied to an image quality enhancement target region, by using the image processing parameter stored in the parameter storage unit 650 so as to be associated with the feature amount matching an feature amount extracted from the image quality enhancement target region. The parameter storage unit 650 may store image processing parameters calculated by learning using a plurality of images from which feature amounts similar to one another have been extracted, as teacher images, so as to be associated with a feature amount representative of the similar feature amounts.

It should be noted that the image processing parameter may be image data having a spatial-frequency component in a frequency domain higher than a frequency domain which should be added to image data which is an image quality enhancement target. In addition, examples of the image processing parameter can include a vector, a matrix, a tensor, an n-dimensional mixture normal distribution, an n-dimensional mixture multinomial distribution, and the like, which convert input data into data representing a high-quality image if data of pixel values of a plurality of pixels or data of a plurality of feature amount components is the input data. It should be noted that, here, n is assumed to be an integer equal to or larger than 1. The image processing parameters will be described later in connection with operations of the image processing apparatus 250.

The external information obtaining unit 228 illustrated in FIG. 8 obtains at least one of the image processing parameters and the feature amounts to be stored in the parameter storage unit 650 (described in FIG. 9), from the outside. The parameter storage unit 650 stores at least one of the image processing parameters and the feature amounts obtained by the external information obtaining unit 228.

Figure 10:
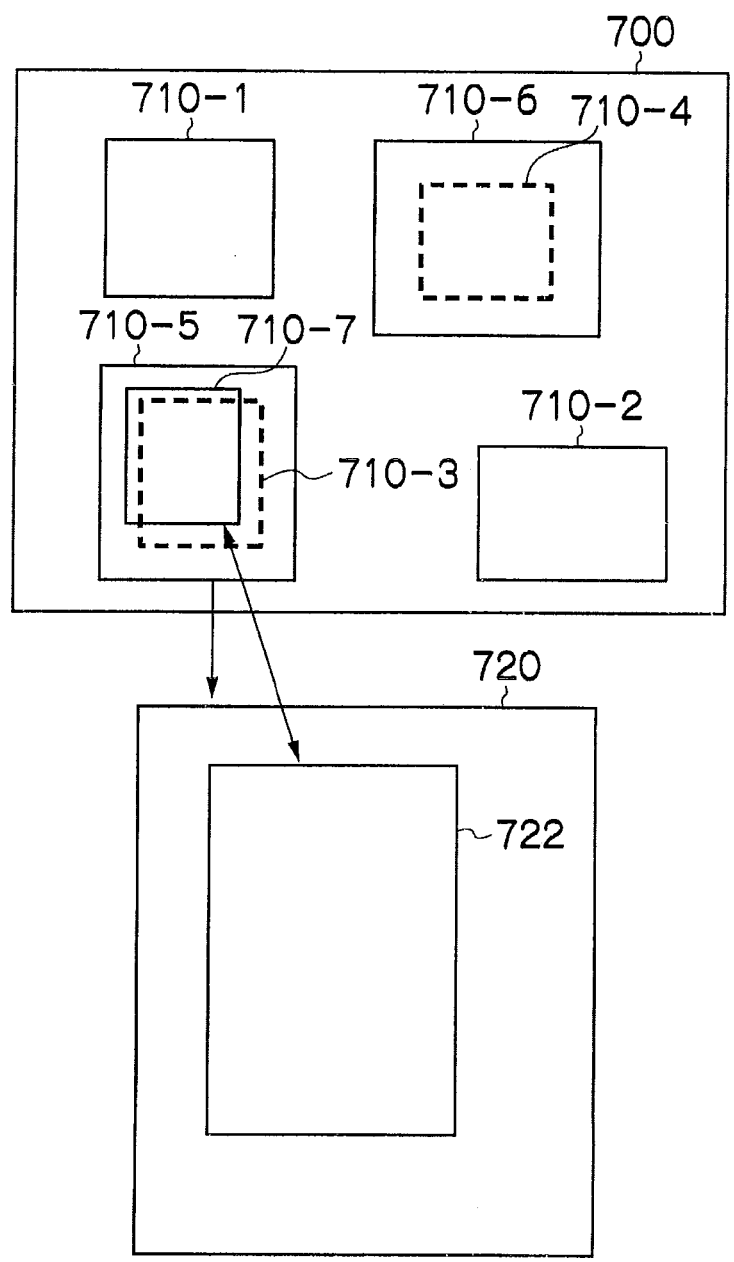
FIG. 10 is an explanatory diagram illustrating an example of a process for specifying a feature region from an image.

FIG. 10 illustrates an example of the feature region specifying process in the feature region specifying unit 226. Here, a process for specifying feature regions in a picked-up image 700 will be described.

The first feature region specifying unit 610 (see FIG. 9) calculates a degree of satisfaction of a predefined condition, for a plurality of image regions in the picked-up image 700, as illustrated in FIG. 10. Then, the first feature region specifying unit 610 specifies a region 710-1 and a region 710-2 which have the degree of satisfaction of the predefined condition which is larger than a first threshold, in the picked-up image, as the feature regions.

Moreover, the image quality enhancement region decision unit 640 (see FIG. 9) selects a region 710-3 and a region 710-4 which have the degree of satisfaction of the predefined condition which is equal to or smaller than the first threshold and larger than a second threshold, in the picked-up image (see FIG. 10). Then, the image quality enhancement region decision unit 640 decides a region 710-5 which includes the region 710-3 and has a size depending on the degree of satisfaction of the above described condition in the image in the region 710-3, as the target region of the image quality enhancement performed by the image generation unit 660. Moreover, the image quality enhancement region decision unit 640 decides a region 710-6 which includes the region 710-4 and has a size depending on the degree of satisfaction of the above described condition in the image in the region 710-4, as the target region of the image quality enhancement performed by the image generation unit 660.

In the example of FIG. 10, it is regarded that a degree of satisfaction smaller than that for the region 710-3 is calculated for the region 710-4, and the image quality enhancement region decision unit 640 decides the region 710-6 in which the region 710-4 has been enlarged at a larger enlargement ratio, as the target region of the image quality enhancement performed by the image generation unit 660 (see FIG. 9). In this way, the image quality enhancement region decision unit 640 decides the region obtained by enlarging the region having the degree of satisfaction of the condition which is larger than a predefined second threshold, at an enlargement ratio depending on the degree of satisfaction, as the target region of the image quality enhancement performed by the image generation unit 660.

Then, the second feature region specifying unit 620 (see FIG. 9) searches for the feature region from images in the region 710-5 and the region 710-6 which have been applied with the image quality enhancement (see FIG. 10). The second feature region specifying unit 620 may search for the region satisfying the above described condition, from the images in the region 710-5 and the region 710-6 which have been applied with the image quality enhancement, by a process similar to that in the first feature region specifying unit 610. Here, it is assumed that the second feature region specifying unit 620 has determined that a region 722 satisfies the above described condition, on an image 720 in the region 710-5 applied with the image quality enhancement. In this case, the feature region specifying unit 226 specifies a region 710-7 corresponding to the region 722 on the image 720, as the feature region, in addition to the region 710-1 and the region 710-2 which have been specified by the first feature region specifying unit 610.

In this way, the image generation unit 660 (see FIG. 9) generates a high-quality image in which the image quality enhancement is further applied to a region having a larger degree of satisfaction of a predetermined condition, in the regions which are not specified as the feature regions by the first feature region specifying unit 610, from the picked-up image. Specifically, the image generation unit 660 generates the high-quality image in which the image quality enhancement is further applied to the region having the degree of satisfaction of the above condition which is larger than the predefined second threshold, in the regions which are not specified as the feature regions by the first feature region specifying unit 610. Thereby, a likelihood of the feature region being extracted from a region which is highly likely to be the feature region can be increased, and the probability of any feature region remaining without being detected can be reduced.

As described above, the regions except the regions specified as the feature regions by the first feature region specifying unit 610 and the image quality enhancement target region are decided as non-feature regions which are not the feature regions. It should be noted that a value of the first threshold may be set so that a probability in which the region which is not the feature region is specified as the feature region becomes larger than a predefined value, based on a result of specifying the feature regions by the first feature region specifying unit 610 and the second feature region specifying unit 620, a pretest result, a posttest result or the like. Thereby, a likelihood of the non-feature region being included in the region specified as the feature region by the first feature region specifying unit 610 can be reduced. While the degree of satisfaction close to the first threshold may also be calculated for the non-feature region, a likelihood of such a region being erroneously detected as the feature region can be reduced by setting the first threshold as described above.

Moreover, a value of the second threshold may be set so that the degree of satisfaction calculated from the feature region becomes equal to or larger than the second threshold, based on the result of specifying the feature regions by the first feature region specifying unit 610 and the second feature region specifying unit 620, the pretest result, the posttest result or the like. Thereby, a likelihood of the feature region being included in the region for which the degree of satisfaction equal to or smaller than the second threshold is calculated can be reduced. While the degree of satisfaction close to the second threshold may also be calculated for the feature region, a likelihood of such a region being regarded as the non-feature region can be reduced by setting the second threshold as described above.

On the other hand, the feature region may be included in the region for which the degree of satisfaction which is larger than the second threshold and equal to or smaller than the first threshold is calculated, depending on the setting of the first threshold and the second threshold. According to the feature region specifying unit 226, the image quality enhancement is applied to such a region, and then, the feature region is searched for in such a region by the second feature region specifying unit 620. Therefore, the feature region and the non-feature region can be appropriately separated, and both a probability of failing to detect the feature region and a probability of the non-feature region being detected as the feature region can be reduced. In this way, according to the feature region specifying unit 226, a feature region detector having high sensitivity and high specificity can be provided.

It should be noted that the image generation unit 660 decides whether or not to perform the image quality enhancement process, depending on a relationship between the degree of satisfaction and the threshold, as described above, and in addition, may generate a high-quality image in which the image quality enhancement is applied to at least a partial image region of the input image in image quality enhancement precision depending on the degree of satisfaction of the above described condition. In this case, the image quality enhancement precision may be defined by a continuous function or a discontinuous function depending on the degree of satisfaction.

Figure 11:
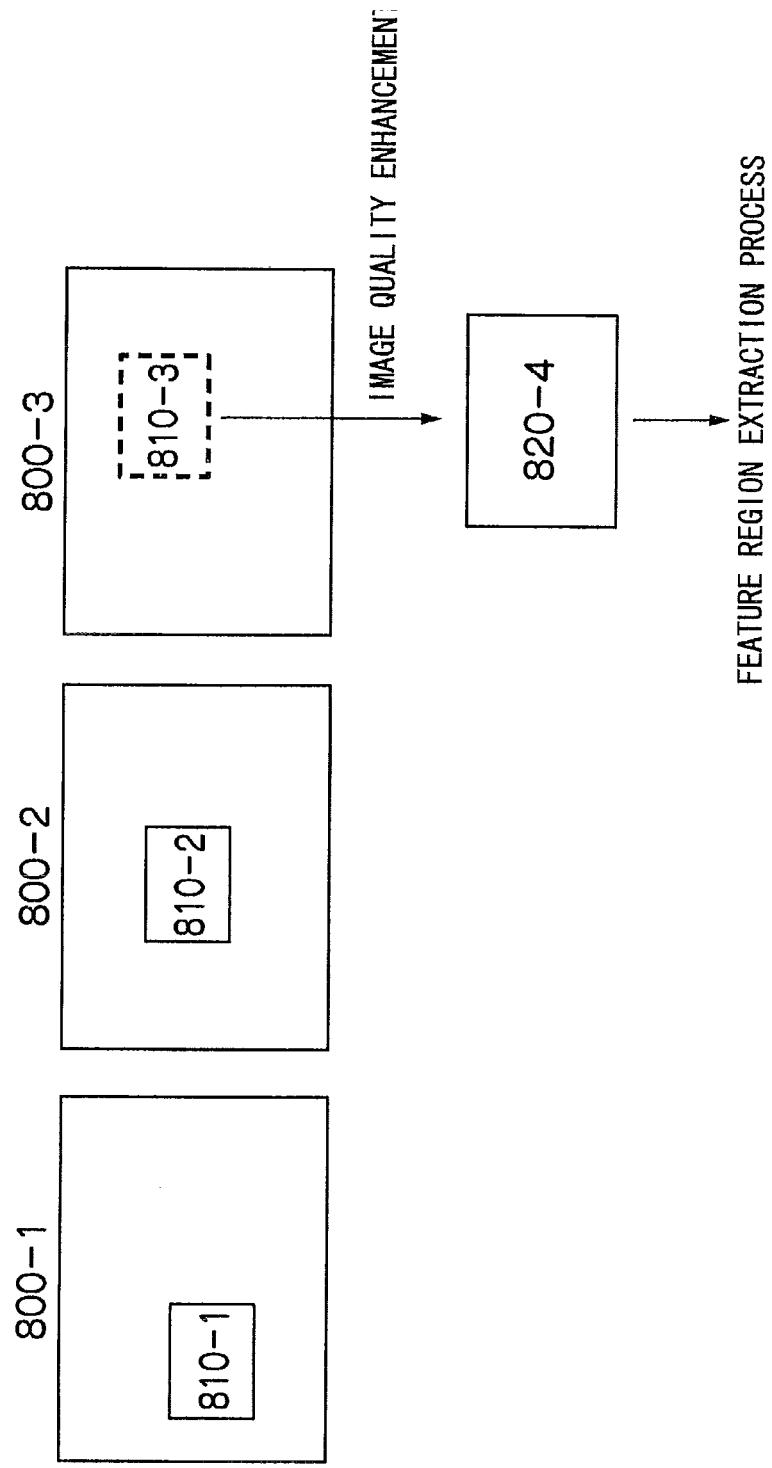
FIG. 11 is an explanatory diagram illustrating another example of the process for specifying the feature region from the image.

FIG. 11 illustrates another example of the feature region specifying process in the feature region specifying unit 226. Here, particularly, there is illustrated an example of the process in the feature region specifying unit 226 in a case where the region including the moving object is specified as the feature region from the moving image.

It is assumed that a region 810-1 and a region 810-2 are specified as the feature regions, respectively in a picked-up image 800-1 and a picked-up image 800-2, by the first feature region specifying unit 610 or the second feature region specifying unit 620 (see FIG. 9), as illustrated in FIG. 11. Here, it is assumed that objects in which an image of the same subject has been picked up exist in the region 810-1 and the region 810-2.

In this case, the region estimation unit 630 (see FIG. 9) decides a region 810-3 as a region in which the object of the same subject should exist in a picked-up image 800-3, based on positions of the region 810-1 and the region 810-2 on the respective images, a timing when each of the picked-up image 800-1 and the picked-up image 800-2 has been picked up, as well as a timing when the picked-up image 800-3 has been picked up (FIG. 11). For example, the region estimation unit 630 calculates a speed of the moving object on the image region, from the positions of the region 810-1 and the region 810-2 on the respective images, and the timing when each of the picked-up image 800-1 and the picked-up image 800-2 has been picked up. Then, based on the calculated speed, the position of the region 810-2, and a time difference between the timing when the picked-up image 800-2 has been picked up and the timing when the picked-up image 800-3 has been picked up, the region estimation unit 630 decides the region 810-3 as the region in which the object of the same subject should exist.

The first feature region specifying unit 610 (see FIG. 9) searches for the moving object from the region 810-3 (FIG. 11). If the moving object is not detected from the region 810-3 by the first feature region specifying unit 610, the image generation unit 660 generates a high-quality image 820-4 in which the image quality enhancement is applied to the region 810-3 (FIG. 11). Then, the second feature region specifying unit 620 searches for the moving object from the high-quality image 820-4. Thereby, a likelihood of the moving object being extracted from a region from which the moving object is highly likely to be detected can be increased, and a probability of any moving object remaining without being detected can be reduced.

It should be noted that the image generation unit 660 (see FIG. 9) may generate the high-quality image 820-4 in which the image quality enhancement is further applied to a region closer to the center in the region 810-3. Thereby, a strength of the image quality enhancement can be reduced for a region with a low probability of the moving object existing. Consequently, in comparison with a case where the image quality enhancement is uniformly performed for all the regions at a high strength, an amount of calculation required for the image quality enhancement may be able to be reduced.

Figure 12:
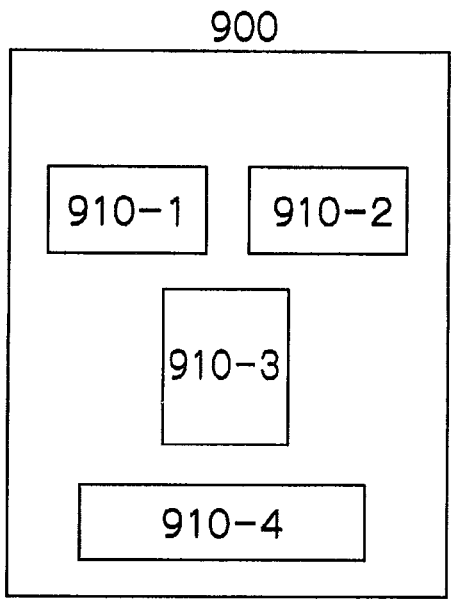
FIG. 12 is an explanatory diagram illustrating an example of a feature region determination process performed by a second feature region specifying unit 620 in FIG. 9.

FIG. 12 illustrates an example of a feature region determination process performed by the second feature region specifying unit 620 as described in FIG. 9. When the second feature region specifying unit 620 determines whether or not a particular image region 900 is the feature region, the second feature region specifying unit 620 extracts feature amounts from partial regions 910-1 to 4 in a predetermined positional relationship within the image region 900. At this time, the second feature region specifying unit 620 extracts the feature amount of a predefined type depending on a position of each partial region 910 within the image region 900, from each partial region 910.

The second feature region specifying unit 620 calculates a degree of satisfaction of a predefined condition in the feature amount extracted from an image in the partial region 910, for each partial region 910. The second feature region specifying unit 620 determines whether or not the image region 900 is the feature region, based on the degree of satisfaction calculated for each partial region 910. The second feature region specifying unit 620 may determine that the image region 900 is the feature region, if a weighted total value of the degrees of satisfaction is larger than a predefined value. Moreover, the second feature region specifying unit 620 may determine that the image region 900 is the feature region, if the number of the partial regions 910 for which the degree of satisfaction larger than a predefined value is calculated is larger than a predefined value.

The above described process from the extraction of the feature amount to the calculation of the degree of satisfaction can be implemented by an image filter. Moreover, the above described process can be implemented as a weak classifier. Moreover, the position of the partial region 910 may be defined depending on the type of the object which should be extracted as the feature region. For example, if a region including an object of a person's face should be detected as the feature region, the partial region 910 may be defined at a position where discrimination power for the object of the person's face becomes higher than a predefined value. High discrimination power may mean that a discrimination result is highly likely to be true for the object of the person's face and the discrimination result is highly likely to be false for objects other than the person's face.

Here, the image generation unit 660 (see FIG. 9) does not apply the image quality enhancement to the region other than the partial region 910, and applies the image quality enhancement to only the partial region 910. Then, as described above, the second feature region specifying unit 620 extracts the feature region from the image applied with the image quality enhancement, and determines whether or not the image region 900 is the feature region. Thereby, a probability of the feature region being detected can be increased while the image region to be applied with the image quality enhancement is limited, and accordingly, the feature region can be detected at a high speed, with a high probability. It should be noted that, in the above description, while the feature region determination process in the second feature region specifying unit 620 has been described, the first feature region specifying unit 610 may also determine whether or not the image region is the feature region, by the same process.

The processes in the first feature region specifying unit 610 and the second feature region specifying unit 620 can be implemented by a plurality of weak classifiers. A case where a total of N weak classifiers are used for the implementation will be described below by way of example. In the first feature region specifying unit 610, Nf weak classifiers are used to discriminate whether or not the image region is the feature region. The degree of satisfaction is calculated based on a result of the discrimination, and as described above, the region having the degree of satisfaction larger than the first threshold is decided as the feature region, and the region having the degree of satisfaction equal to or smaller than the second threshold is decided as the non-feature region.

The region having the degree of satisfaction which is equal to or smaller than the first threshold and larger than the second threshold is applied with the image quality enhancement by the image generation unit 660. In the second feature region specifying unit 620, the Nf weak classifiers used in the first feature region specifying unit 610, and Nb weak classifiers other than the Nf weak classifiers are used to discriminate whether or not the image applied with the image quality enhancement is the feature region. For example, it may be discriminated whether or not the image is the feature region, based on the degree of satisfaction calculated from respective discrimination results in the Nf+Nb weak classifiers.

In the regions which have not been specified as the feature regions by the first feature region specifying unit 610, the feature region may be specified by processes different from one another, for a plurality of regions defined depending on a result of comparison of a third threshold which is smaller than the first threshold and larger than the second threshold, with the degree of satisfaction. For example, for the region for which the degree of satisfaction larger than the third threshold has been calculated, the image quality enhancement is not applied by the image generation unit 660, and it may be discriminated whether or not the region is the feature region, by the Nf+Nb weak classifiers in the second feature region specifying unit 620. On the other hand, for the region for which the degree of satisfaction equal to or smaller than the third threshold has been calculated, the image quality enhancement is applied by the image generation unit 660, and it may be discriminated whether or not the region is the feature region, by the Nf+Nb weak classifiers in the second feature region specifying unit 620.

The number Nb of the weak classifiers used in the process in the second feature region specifying unit 620 may be adjusted depending on the degree of satisfaction. For example, as the degree of satisfaction is smaller, more weak classifiers may be used in the second feature region specifying unit 620 to discriminate whether or not the region is the feature region.

As described above, as the degree of satisfaction is lower, the second feature region specifying unit 620 may more minutely search for the feature region from the image having the changed image quality. Examples of a weak classifier configuration in at least one of the first feature region specifying unit 610 and the second feature region specifying unit 620 as described above can include a weak classifier configuration using the AdaBoost.

The first feature region specifying unit 610 and the second feature region specifying unit 620 may detect the feature region from a low-resolution image group in which each image is formed in multiresolution representation. In this case, the image generation unit 660 may generate the low-resolution image group by achieving multiresolution in higher precision than achieving multiresolution in the first feature region specifying unit 610. Examples of a multiresolution achieving process in the first feature region specifying unit 610 can include a reduction process using the Bicubic method.

Moreover, examples of the multiresolution achieving process in the second feature region specifying unit 620 can include a reduction process based on prior learning. The second feature region specifying unit 620 may generate the low-resolution image group from the input image by using an image processing parameter obtained by learning using an image of an original size and an image having a target resolution. It should be noted that an image having the target resolution including smaller folding noise is more preferably used for the learning. For example, images obtained by different image pickup devices having different numbers of image pickup elements can be used for the learning.

The image processing method according to the present invention is applicable as the image quality enhancement process described in connection with FIGS. 9 to 12. In other words, when the image generation unit 660 generates the high-quality image in which the image quality enhancement is further applied to the region which is more likely to be specified as the feature region, an image processing technique for the image quality enhancement according to the present invention as illustrated in FIGS. 1 to 6 may be used.

The resolution enhancement process is not limited to the resolution enhancement process, and examples of the image quality enhancement process can include the tone increasing process for increasing the number of tones, and the color increasing process for increasing the number of colors.

The image processing method according to the present invention is applicable to these processes.

It should be noted that if the picked-up image which is the image quality enhancement target is the moving-image component image (the frame image or the field image) of the moving image, a pixel value of another picked-up image may be used to apply the image quality enhancement, in the image quality enhancement process such as the resolution enhancement, the color increasing, the tone increasing, the noise reduction, the artifact reduction for reducing the artifacts such as the block noise and the mosquito noise, the blurring reduction, the sharpening, and the frame rate increasing. For example, the image quality enhancement may be applied by using a shift in a position where an image of a mobile object is picked up, which is caused by a difference between image pickup timings. In other words, the image generation unit 660 may generate the high-quality image by using a picked-up image which is a moving-image component image included in a moving image, and another moving-image component image included in the moving image.

In addition to the process using a plurality of moving-image component images, examples of the noise reduction process can include processes described in Japanese Patent Application Laid-Open No. 2008-167949, Japanese Patent Application Laid-Open No. 2008-167950, Japanese Patent Application Laid-Open No. 2008-167948, and Japanese Patent Application Laid-Open No. 2008-229161. For example, the image generation unit 660 can reduce the noise by using a result of prior learning using an image including a larger amount of noise and an image including a less amount of noise. As in the present embodiment, if an amount of noise of an image picked up by visible light is reduced, an image picked up under a less amount of environmental light can be used for the prior learning, instead of using an image picked up at a low dose, for the prior learning as described in Japanese Patent Application Laid-Open No. 2008-167949. Moreover, in the sharpening process, examples of the sharpening process in higher precision can include a process using a filter of a larger filter size and a process for sharpening in more directions.

Configuration Example of Compression Unit 232

Figure 13:
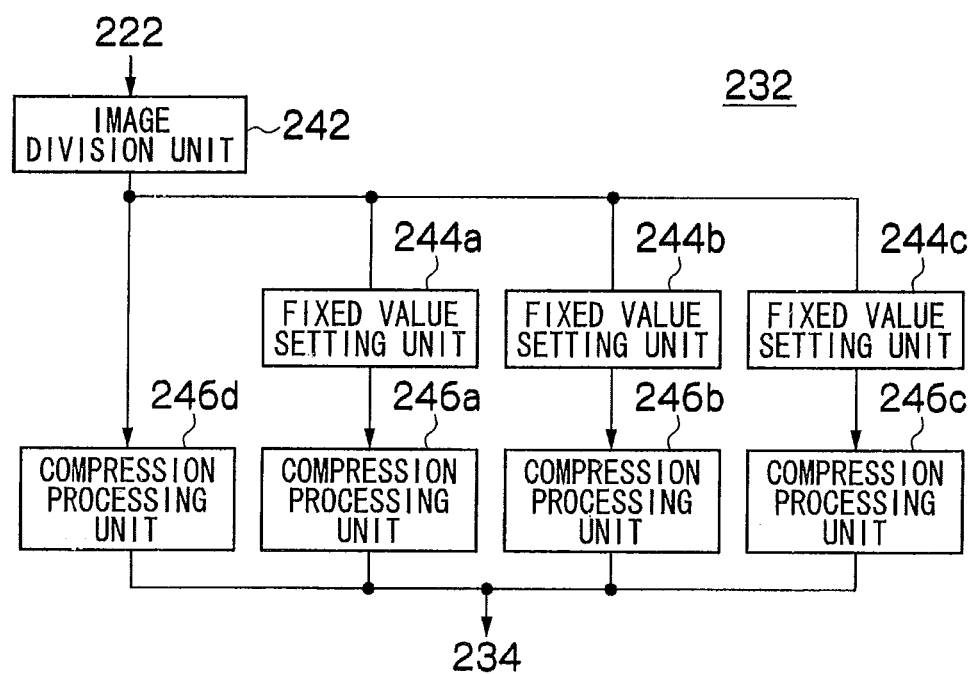
FIG. 13 is a block diagram illustrating a configuration example of a compression unit 232 in FIG. 8.

FIG. 13 illustrates an example of a block configuration of the compression unit 232 described in FIG. 8. The compression unit 232 has an image division unit 242, a plurality of fixed value setting units 244a-c (hereinafter, may be collectively referred to as "fixed value setting unit 244"), and a plurality of compression processing units 246a-d (hereinafter, may be collectively referred to as "compression processing unit 246).

The image division unit 242 obtains the plurality of picked-up images from the image obtaining unit 222. Then, the image division unit 242 divides each of the plurality of picked-up images into the feature region and a background region other than the feature region. Specifically, the image division unit 242 divides the plurality of picked-up images into a plurality of respective feature regions and a background region other than the feature regions. Then, the compression processing unit 246 compresses a feature region image which is an image in the feature region, and a background region image which is an image in the background region, respectively at different strengths. Specifically, the compression processing unit 246 compresses a feature region moving image including a plurality of the feature region images, and a background region moving image including a plurality of the background region images, respectively at the different strengths.

More specifically, the image division unit 242 divides the plurality of picked-up images so as to generate the feature region moving image for each of a plurality of the feature region types. Then, the fixed value setting unit 244 sets a pixel value of the region other than the feature region of each feature type, as a fixed value, for each of the feature region images included in a plurality of the feature region moving images generated for each feature type.

Specifically, the fixed value setting unit 244 sets the pixel value of the region other than the feature region, to a predefined pixel value. Then, the compression processing units 246a-c compress the plurality of feature region moving images, for each feature type in an MPEG or another coding format.

The fixed value setting units 244a-c set the feature region moving image of a first feature type, the feature region moving image of a second feature type, and the feature region moving image of a third feature type, as the fixed values, respectively. Then, the compression processing units 246a-c compress the feature region moving image of the first feature type, the feature region moving image of the second feature type, and the feature region moving image of the third feature type, which have been set as the fixed values by the fixed value setting units 244a-c, respectively.

It should be noted that each of the compression processing units 246a-c compresses the feature region moving image at a predefined strength depending on the feature type. For example, the compression processing unit 246 may convert the feature region moving image into a moving image having a predefined different resolution depending on the feature type of the feature region, and compress the converted feature region moving image. In addition, if the compression processing unit 246 compresses the feature region moving image by MPEG coding, the compression processing unit 246 may compress the feature region moving image by a predefined different quantization parameter depending on the feature type.

Moreover, the compression processing unit 246d compresses the background region moving image. This compression processing unit 246d may compress the background region moving image at a strength higher than a compression strength used by any of the compression processing units 246a-c. The feature region moving images and the background region moving image, which have been compressed by the compression processing unit 246, are supplied to the association processing unit 234 (see FIG. 8).

As described in FIG. 13, since the region other than the feature region is set as the fixed value by the fixed value setting unit 244, if the compression processing unit 246 performs predictive coding by means of the MPEG coding or the like, a difference amount between a predicted image and the image in the region other than the feature region can be significantly reduced. Consequently, the compression unit 232 can compress the feature region moving image at a higher compression ratio.

It should be noted that, in the configuration of FIG. 13, the plurality of compression processing units 246 included in the compression unit 232 compress the images in the plurality of feature regions and the image in the background region, respectively. However, in another form, the compression unit 232 may have a single compression processing unit 246, and the single compression processing unit 246 may compress the images in the plurality of feature regions and the image in the background region, respectively at the different strengths. For example, the images in the plurality of feature regions and the image in the background region may be sequentially supplied to the single compression processing unit 246 in a time division manner, and the single compression processing unit 246 may sequentially compress the images in the plurality of feature regions and the image in the background region, respectively at the different strengths.

In addition, the single compression processing unit 246 may compress the images in the plurality of feature regions and the image in the background region, respectively at the different strengths, by quantizing image information in the plurality of feature regions and image information in the background region, respectively by different quantization coefficients. Moreover, images in which the images in the plurality of feature regions and the image in the background region are converted to have different image qualities respectively may be supplied to the single compression processing unit 246, and the single compression processing unit 246 may compress the images in the plurality of feature regions and the image in the background region, respectively. Moreover, as described above, in a form in which the single compression processing unit 246 performs the quantization by the different quantization coefficient for each region, or the single compression processing unit 246 compresses the image converted to have the different image quality for each region, the single compression processing unit 246 may compress the entire single image, or may compress the images divided by the image division unit 242 as described in this figure, respectively. It should be noted that if the single compression processing unit 246 compresses the entire single image, since a division process does not need to be performed by the image division unit 242 and a fixed value setting process does not need to be performed by the fixed value setting unit 244, the compression unit 232 does not need to have the image division unit 242 and the fixed value setting unit 244.

Configuration Example 2 of Compression Unit 232

Figure 14:
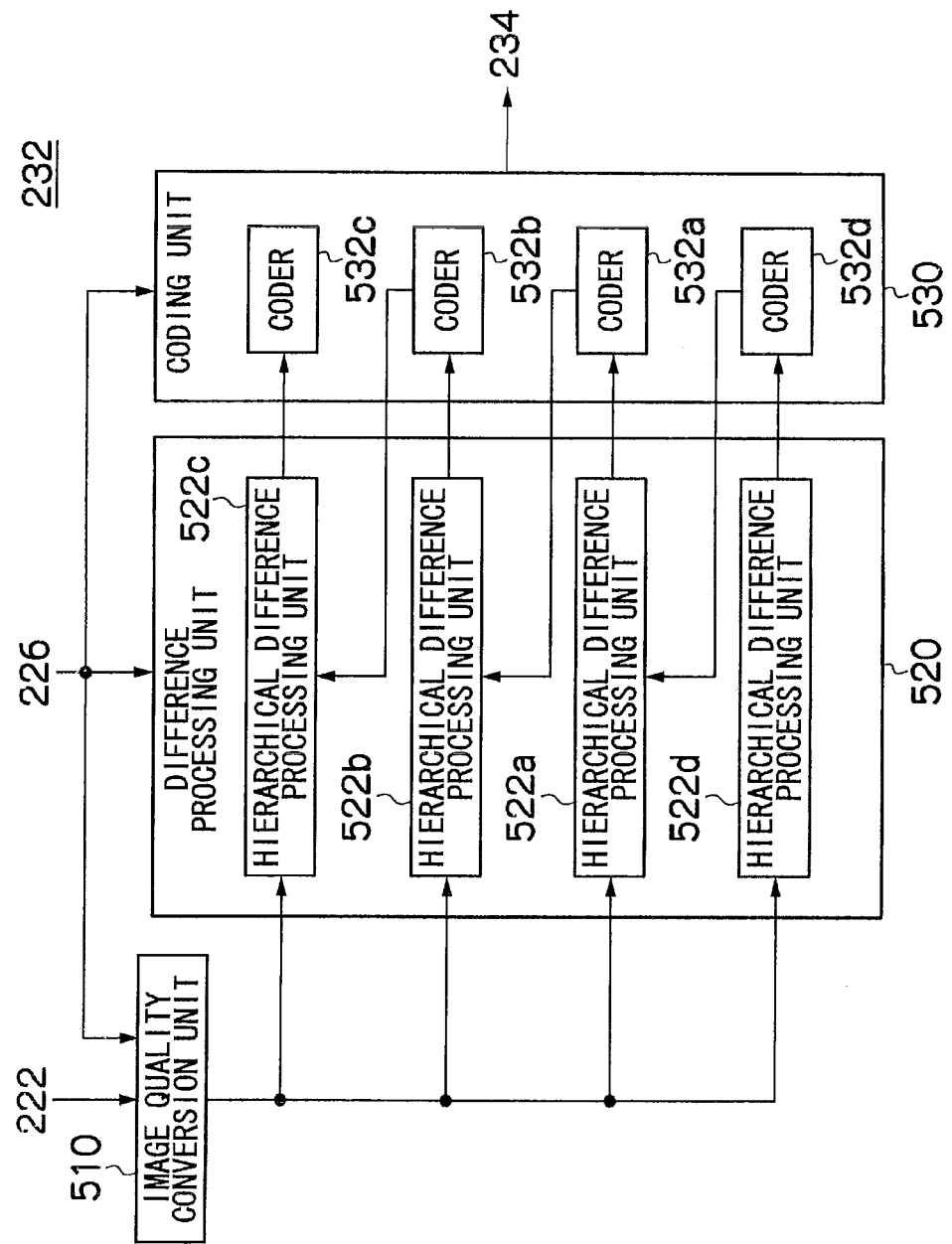
FIG. 14 is a block diagram illustrating another configuration example of the compression unit 232.

FIG. 14 illustrates another example of the block configuration of the compression unit 232 described in FIG. 8. The compression unit 232 in this configuration compresses the plurality of picked-up images by a spatial scalable coding process depending on the feature type.

The compression unit 232 illustrated in FIG. 14 has an image quality conversion unit 510, a difference processing unit 520, and a coding unit 530. The difference processing unit 520 includes a plurality of hierarchical difference processing units 522*a-d* (hereinafter collectively referred to as "hierarchical difference processing unit 522"). The coding unit 530 includes a plurality of coders 532*a-d* (hereinafter collectively referred to as "coder 532").

The image quality conversion unit 510 obtains the plurality of picked-up images from the image obtaining unit 222. Moreover, the image quality conversion unit 510 obtains information specifying the feature regions detected by the feature region specifying unit 226 and information specifying the feature types of the feature regions. Then, the image quality conversion unit 510 replicates the picked-up images so as to generate the same number of picked-up images as the number of the feature types of the feature regions. Then, the image quality conversion unit 510 converts the generated picked-up images into images having resolutions depending on the feature types.

For example, the image quality conversion unit 510 generates the picked-up image converted to have a resolution depending on the background region (hereinafter referred to as "low-resolution image"), the picked-up image converted to have a first resolution depending on the first feature type (hereinafter referred to as "first resolution image"), the picked-up image converted to have a second resolution depending on the second feature type (hereinafter referred to as "second resolution image"), and the picked-up image converted to have a third resolution depending on the third feature type (hereinafter referred to as "third resolution image"). It should be noted that, here, it is assumed that the first resolution image has the resolution higher than that of the low-resolution image, the second resolution image has the resolution higher than the first resolution image, and the third resolution image has the resolution higher than the second resolution image.

Then, the image quality conversion unit 510 supplies the low-resolution image, the first resolution image, the second resolution image and the third resolution image, to the hierarchical difference processing unit 522*d*, the hierarchical difference processing unit 522*a*, the hierarchical difference processing unit 522*b*, and the hierarchical difference processing unit 522*c*, respectively. It should be noted that the image quality conversion unit 510 performs the above described image quality conversion process for each of the plurality of picked-up images, and thereby supplies the moving image to each hierarchical difference processing unit 522.

It should be noted that the image quality conversion unit 510 may convert a frame rate of the moving image to be supplied to each hierarchical difference processing unit 522, depending on the feature type of the feature region. For example, the image quality conversion unit 510 may supply the moving image having the frame rate lower than that of the moving image to be supplied to the hierarchical difference processing unit 522*a*, to the hierarchical difference processing unit 522*d*. Moreover, the image quality conversion unit 510 may supply the moving image having the frame rate lower than that of the moving image to be supplied to the hierarchical difference processing unit 522*b*, to the hierarchical difference processing unit 522*a*, and may supply the moving image having the frame rate lower than that of the moving image to be supplied to the hierarchical difference processing unit 522*c*, to the hierarchical difference processing unit 522*b*. It should be noted that the image quality conversion unit 510 may convert the frame rate of the moving image to be supplied to the hierarchical difference processing unit 522, by thinning the picked-up image depending on the feature type of the feature region.

The hierarchical difference processing unit 522*d* and the coder 532*d* apply the predictive coding to the background region moving image including a plurality of the low-resolution images. Specifically, the hierarchical difference processing unit 522 generates a difference image with respect to a predicted image generated from another low-resolution image. Then, the coder 532*d* quantizes a conversion coefficient obtained by converting the difference image into a spatial-frequency component, and codes the quantized conversion coefficient by entropy coding or the like. It should be noted that such a predictive coding process may be performed for each partial region in the low-resolution image.

Moreover, the hierarchical difference processing unit 522*a* applies the predictive coding to a first feature region moving image including a plurality of the first resolution images supplied by the image quality conversion unit 510. Similarly, the hierarchical difference processing unit 522*b* and the hierarchical difference processing unit 522*c* apply the predictive coding to a second feature region moving image including a plurality of the second resolution images and a third feature region moving image including a plurality of the third resolution images, respectively. Hereinafter, specific operations of the hierarchical difference processing unit 522*a* and the coder 532*a* will be described.

The hierarchical difference processing unit 522a decodes the first resolution image coded by the coder 532d, and enlarges the decoded image into an image having the same resolution as the first resolution. Then, the hierarchical difference processing unit 522a generates a difference image between the enlarged image and the low-resolution image. At this time, the hierarchical difference processing unit 522a sets a difference value in the background region to 0. Then, the coder 532a codes the difference image similarly to the coder 532d. It should be noted that a coding process performed by the hierarchical difference processing unit 522a and the coder 532a may be applied for each partial region in the first resolution image.

If the hierarchical difference processing unit 522a codes the first resolution image, the hierarchical difference processing unit 522a compares an amount of codes predicted in a case where the difference image with respect to the low-resolution image is coded, with an amount of codes predicted in a case where a difference image with respect to a predicted image generated from another first resolution image is coded. If the latter amount of codes is smaller, the hierarchical difference processing unit 522a generates the difference image with respect to the predicted image generated from another first resolution image. It should be noted that if it is predicted that the amount of codes becomes smaller when the coding is performed without taking the difference from the low-resolution image or the predicted image, the hierarchical difference processing unit 522a may not take the difference from the low-resolution image or the predicted image.

Moreover, the hierarchical difference processing unit 522a may not set the difference value in the background region to 0. In this case, the coder 532a may set data obtained after coding difference information in the region other than the feature region, to 0. For example, the coder 532a may set the conversion coefficient obtained after the conversion into the frequency component, to 0. It should be noted that motion vector information obtained in a case where the hierarchical difference processing unit 522d has performed the predictive coding is supplied to the hierarchical difference processing unit 522a. The hierarchical difference processing unit 522a may use the motion vector information supplied by the hierarchical difference processing unit 522d, to calculate a motion vector for the predicted image.

Operations of the hierarchical difference processing unit 522b and the coder 532b are generally the same as the operations of the hierarchical difference processing unit 522a and the coder 532a, except that the second resolution image is coded, and that a difference from the first resolution image after the coding by the coder 532a may be taken if the second resolution image is coded. Therefore, descriptions of the operations of the hierarchical difference processing unit 522b and the coder 532b are omitted. Similarly, operations of the hierarchical difference processing unit 522c and the coder 532c are generally the same as the operations of the hierarchical difference processing unit 522a and the coder 532a, except that the third resolution image is coded, and that a difference from the second resolution image after the coding by the coder 532b may be taken if the third resolution image is coded. Therefore, descriptions of the operations of the hierarchical difference processing unit 522c and the coder 532c are omitted.

As described above, the image quality conversion unit 510 generates a low-quality image in which the image quality is converted into a low image quality, and a feature region image having the image quality higher than the low-quality image in at least the feature region, from each of the plurality of picked-up images. Then, the difference processing unit 520 generates a feature region difference image indicating a difference image between the image in the feature region in the feature region image and the image in the feature region in the low-quality image. Then, the coding unit 530 codes the feature region difference image and the low-quality image, respectively.

Moreover, the image quality conversion unit 510 generates a low-quality image in which the resolution is reduced, from the plurality of picked-up images, and the difference processing unit 520 generates a feature region difference image between the image in the feature region in the feature region image and an image in which the image in the feature region in the low-quality image is enlarged. Moreover, the difference processing unit 520 generates a feature region difference image having a spatial-frequency component in which a difference between the feature region image and the enlarged image has been converted into a spatial-frequency domain, in the feature region, and having a data amount of the spatial-frequency component which has been reduced in the region other than the feature region.

As described above, the compression unit 232 performs the coding hierarchically by coding the differences among the images in a plurality of layers having different resolutions. As is also obvious from this point, a part of a compression system with the compression unit 232 in this configuration obviously includes a compression system according to H.264/SVC. It should be noted that if the image processing apparatus 250 expands such a hierarchized and compressed moving image, moving image data in each layer is decoded, and for a region coded using a hierarchical difference, a process for addition with the picked-up image decoded in the layer in which the difference has been taken is performed, and thereby, the picked-up image having an original resolution can be generated.

(Description of Image Processing Apparatus 250)

Figure 15:
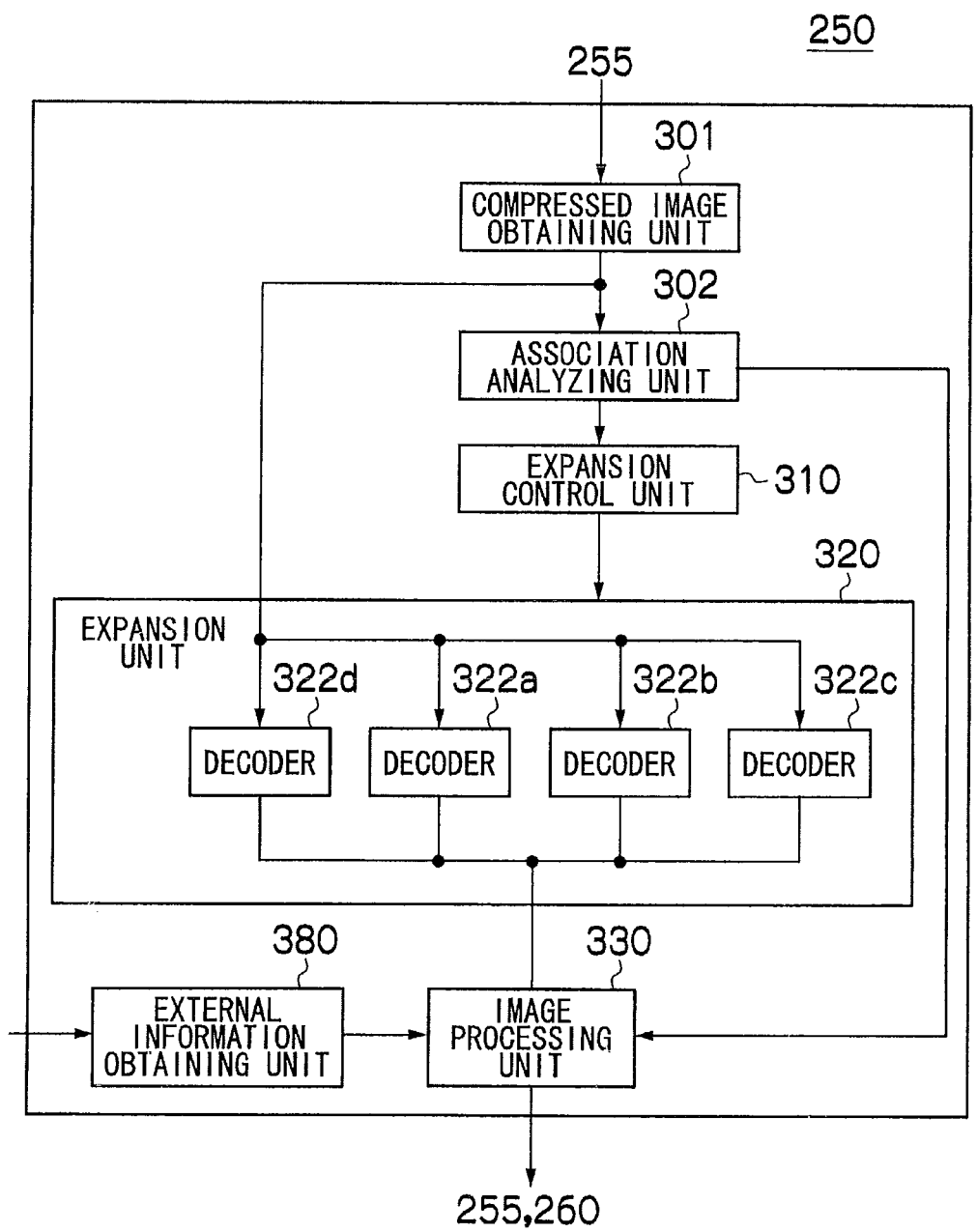
FIG. 15 is a block diagram illustrating a configuration example of an image processing apparatus 250 in FIG. 7.

FIG. 15 illustrates an example of a block configuration of the image processing apparatus 250 illustrated in FIG. 7. As illustrated in FIG. 15, the image processing apparatus 250 includes a compressed image obtaining unit 301, an association analyzing unit 302, an expansion control unit 310, an expansion unit 320, an external information obtaining unit 380, and an image processing unit 330. The expansion unit 320 has a plurality of decoders 322a-d (hereinafter collectively referred to as "decoder 322").

The compressed image obtaining unit 301 obtains the compressed moving image compressed by the image processing apparatus 250. Specifically, the compressed image obtaining unit 301 obtains the compressed moving image including the plurality of feature region moving images and the background region moving image. More specifically, the compressed image obtaining unit 301 obtains the compressed moving image with the feature region information attached thereto.

The association analyzing unit 302 separates the compressed moving image into the plurality of feature region moving images with the background region moving image, and the feature region information, and supplies the plurality of feature region moving images and the background region moving image to the expansion unit 320. Moreover, the association analyzing unit 302 analyzes the feature region information, and supplies the position and the feature type of the feature region to the expansion control unit 310 and the image processing unit 330.

The expansion control unit 310 controls an expansion process performed by the expansion unit 320, depending on the position and the feature type of the feature region which have been obtained from the association analyzing unit 302. For example, the expansion control unit 310 causes the expansion unit 320 to expand each region in the moving image indicated by the compressed moving image, depending on the compression system used by the compression unit 232 to compress each region in the moving image depending on the position and the feature type of the feature region.

The decoder 322 decodes any one of the plurality of feature region moving images and the background region moving image, which have been coded. Specifically, the decoder 322a, the decoder 322b, the decoder 322c and the decoder 322d decode the first feature region moving image, the second feature region moving image, the third feature region moving image, and the background region moving image, respectively.

The image processing unit 330 synthesizes the plurality of feature region moving images and the background region moving image, which have been expanded by the expansion unit 320, so as to generate a single moving image. Specifically, the image processing unit 330 generates a single moving image to be displayed, by synthesizing the picked-up images included in the background region moving image with the images in the feature regions on the picked-up images included in the plurality of feature region moving images. It should be noted that the image processing unit 330 may generate the moving image to be displayed in which the image qualities of the feature regions have been enhanced more than the background region. For this conversion process with the image quality enhancement, the image processing method according to the present invention can be used.

Then, the image processing unit 330 outputs the feature region information obtained from the association analyzing unit 302, and the moving image to be displayed, to the display device 260 or the image DB 255 (see FIG. 7). The image DB 255 may record the position of the feature region, the feature type of the feature region and the number of the feature regions, which are indicated by the feature region information, so as to be associated with information identifying the picked-up image included in the moving image to be displayed, in a nonvolatile storage medium such as a hard disk.

The external information obtaining unit 380 obtains data used for image processing in the image processing unit 330, from the outside of the image processing apparatus 250. The image processing unit 330 uses the data obtained by the external information obtaining unit 380 to perform the image processing. The data obtained by the external information obtaining unit 380 will be described in connection with FIG. 16.

Configuration Example of Image Processing Unit 330

Figure 16:
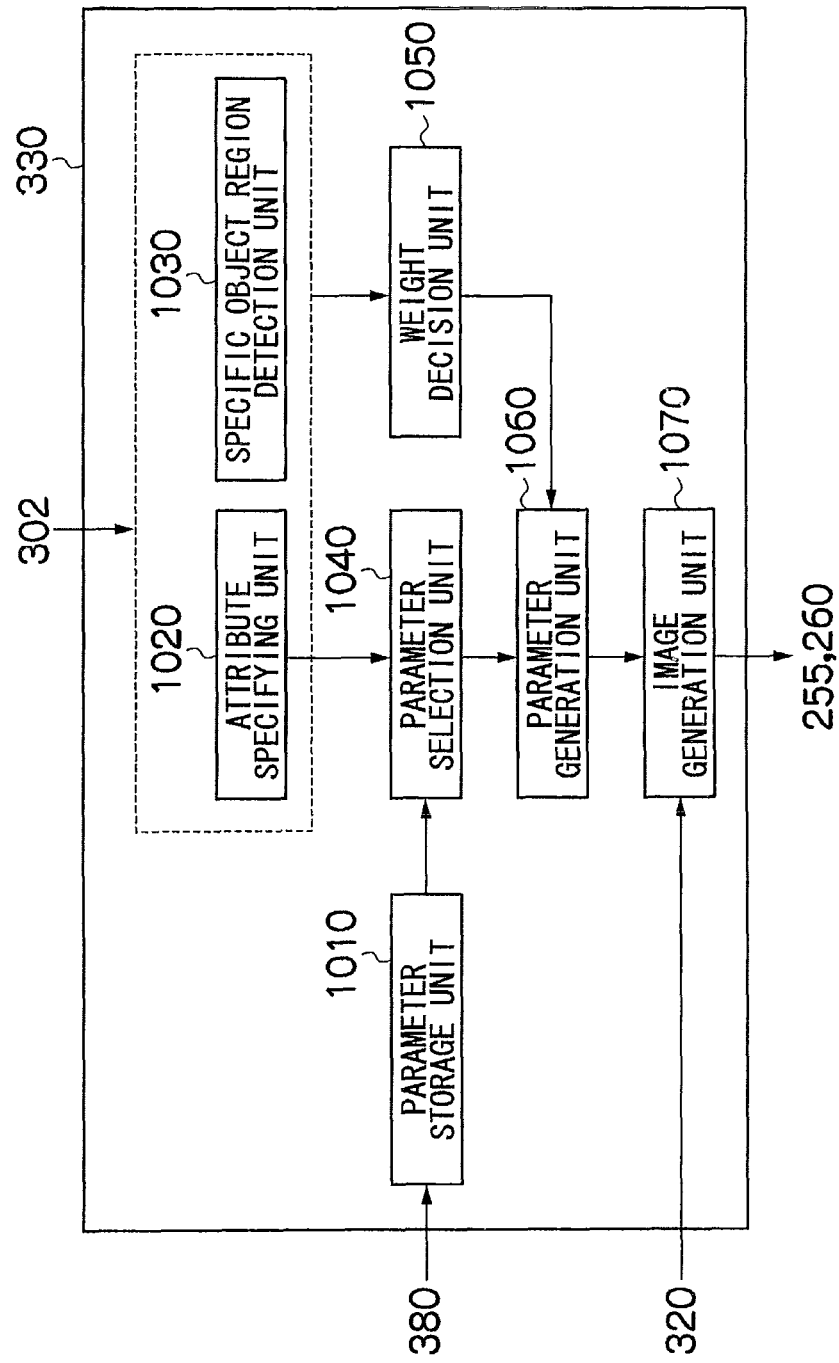
FIG. 16 is a block diagram illustrating a configuration example of an image processing unit 330 in FIG. 15.

FIG. 16 illustrates an example of a block configuration of the image processing unit 330 included in the image processing apparatus 250 described in FIG. 15. As illustrated in FIG. 16, the image processing unit 330 includes a parameter storage unit 1010, an attribute specifying unit 1020, a specific object region detection unit 1030, a parameter selection unit 1040, a weight decision unit 1050, a parameter generation unit 1060, and an image generation unit 1070.

The parameter storage unit 1010 stores a plurality of the image processing parameters used for applying the image quality enhancement to subject images with respective attributes respectively, so as to be associated with a plurality of the attributes for the subject image, respectively. The attribute specifying unit 1020 specifies the attributes of the subject image included in the input image. The input image as herein referred to may be the frame image obtained by the expansion unit 320. The parameter selection unit 1040 more preferentially selects the plurality of image processing parameters stored in the parameter storage unit 1010 so as to be associated with the attributes which more closely match the attributes specified by the attribute specifying unit 1020. The image generation unit 1070 uses the plurality of image processing parameters selected by the parameter selection unit 1040 together, to generate a high-quality image in which the image quality enhancement is applied to the subject image included in the input image. For this conversion process with the image quality enhancement, the image processing method according to the present invention is used.

Here, examples of the attribute can include a state of the subject, such as a direction of the subject. In other words, the parameter storage unit 1010 stores the plurality of image processing parameters so as to be associated with the plurality of attributes indicating the state of the subject whose image has been picked up as the subject image, respectively. The attribute specifying unit 1020 specifies the state of the subject whose image has been picked up as the subject image included in the input image, from the subject image.

Examples of the state of the subject can include the direction of the subject when the image of the subject has been picked up. The direction of the subject may be, for example, a direction of the face of a person as an example of the subject. In this case, the parameter storage unit 1010 stores the plurality of image processing parameters so as to be associated with the plurality of attributes indicating the direction of the subject whose image has been picked up as the subject image, respectively. The attribute specifying unit 1020 specifies the direction of the subject whose image has been picked up as the subject image included in the input image, from the subject image.

In addition, the attribute may be a kind of the subject. Examples of the kind of the subject can include, for example, sex of the person as the subject, age of the person, a facial expression of the person whose image has been picked up, behavior of the person whose image has been picked up, a posture of the person whose image has been picked up, race of the person whose image has been picked up, clothes (eye glasses, sunglasses, a mask, a hat and the like) which the person whose image has been picked up wears, an illumination state and the like. The parameter storage unit 1010 may store the plurality of image processing parameters so as to be associated with the plurality of attributes including at least any of these various attributes, respectively. In this case, the attribute specifying unit 1020 specifies the attribute corresponding to the subject whose image has been picked up as the subject image included in the input image, from the subject image.

The weight decision unit 1050 decides weights for the plurality of image processing parameters in a case where the image quality enhancement is applied to the subject image included in the input image. Then, based on the weights decided by the weight decision unit 1050, the image generation unit 1070 uses the plurality of image processing parameters selected by the parameter selection unit 1040 together, to generate the high-quality image in which the image quality enhancement is applied to the input image. It should be noted that the weight decision unit 1050 may decide the weights so that the image processing parameters associated with the attributes which more closely match the specified attributes are weighted more.

The parameter generation unit 1060 generates a composite parameter in which the plurality of image processing parameters selected by the parameter selection unit 1040 are synthesized. Then, the image generation unit 1070 generates the high-quality image by applying the image quality enhancement to the subject image included in the input image by using the composite parameter generated by the parameter generation unit 1060.

It should be noted that, in the above description, the generation of the image processing parameters depending on the attributes of the subject has been described. In addition, the image processing unit 330 may vary the strength of the image quality enhancement on the image.

The parameter storage unit 1010 stores a specific parameter which is an image processing parameter used for applying the image quality enhancement to an image of a specific object, and a non-specific parameter which is an image processing parameter used for applying the image quality enhancement to an image in which no object is specified. The non-specific parameter may be a general-purpose image processing parameter having a certain effect of the image quality enhancement, regardless of the object, as will be described later.

The specific object region detection unit 1030 detects a specific object region which is a region of the specific object, from the input image. The specific object may be an object of the subject which should be detected as the feature region. Then, the weight decision unit 1050 decides weights for the specific parameter and the non-specific parameter in a case where the image quality enhancement is applied to the input image from which the specific object region has been detected.

The weight decision unit 1050 decides the weight for an image in the specific object region in the input image so that the specific parameter is weighted more than the non-specific parameter. Thereby, the image quality enhancement can be appropriately applied to the specific object which should be detected as the feature region. Moreover, the weight decision unit 1050 decides the weight for an image in a non-specific object region which is a region other than the specific object region so that the non-specific parameter is weighted more than the specific parameter. Thereby, the image quality enhancement using the image processing parameter dedicated to the specific object can be prevented from being performed.

Based on the weights decided by the weight decision unit 1050, the image generation unit 1070 uses the specific parameter and the non-specific parameter together to generate the high-quality image in which the image quality enhancement is applied to the input image.

The parameter storage unit 1010 stores the specific parameter calculated by performing the learning using a plurality of images of the specific object as the learning images (also referred to as "training images"), and the non-specific parameter calculated by performing the learning using a plurality of images which are not the images of the specific object, as the learning images. Thereby, the specific parameter specialized for the specific object can be calculated. Moreover, a general-purpose specific parameter for various objects can be calculated.

It should be noted that, in the prior learning, the image processing parameter using spatial variance information such as edge information on the learning images, instead of luminance information itself on the learning images, has been desirably learned. The image quality enhancement process which is robust to illumination variation, particularly, low-frequency illumination change, can be realized by using edge information in which information in a low-spatial-frequency domain has been reduced.

The parameter generation unit 1060 may generate the composite parameter by synthesizing the non-specific parameter with the specific parameter by using the weights decided by the weight decision unit 1050. The image generation unit 1070 may generate the high-quality image by applying the image quality enhancement to the input image by using the composite parameter generated by the parameter generation unit 1060.

In the above described example, the operations have been described in a case where the plurality of image processing parameters selected based on the attributes of the subject which are specified by the attribute specifying unit 1020 are used to generate the high-quality image. In addition, the image generation unit 1070 may apply the image quality enhancement to the subject image included in the input image by using a different combination of the plurality of image processing parameters. For example, the image generation unit 1070 may apply the image quality enhancement to the subject image included in the input image by using a different combination of a plurality of predefined image processing parameters. Then, the image generation unit 1070 may select at least one image from a plurality of images obtained by applying the image quality enhancement, based on comparison with the input image, and set the selected image as the high-quality image. For example, the image generation unit 1070 may more preferentially select an image whose image content is more similar to the input image, in the plurality of images obtained by applying the image quality enhancement, as the high-quality image.

The parameter selection unit 1040 may select the different combination of the plurality of image processing parameters based on the attributes of the subject which are specified from the input image. The image generation unit 1070 may use the selected plurality of image processing parameters to apply the image quality enhancement to the subject image included in the input image. Then, the image generation unit 1070 may select at least one image from the plurality of images obtained by the image quality enhancement, based on the comparison with the input image, and set the selected image as the high-quality image.

As described above, even if the parameter storage unit 1010 stores a limited number of the image processing parameters, the image processing apparatus 250 can perform the image quality enhancement by using the image processing parameter which can handle the images of the subject with the various attributes. It should be noted that, in addition to the resolution enhancement, the tone increasing and the color increasing, examples of the image quality enhancement can include the noise reduction, the artifact reduction, the blurring reduction, the sharpening, the frame rate increasing and the like. The parameter storage unit 1010 can store the image processing parameters for these various image quality enhancement processes.

The external information obtaining unit 380 described in FIG. 15 obtains the image processing parameters to be stored in the parameter storage unit 1010 (see FIG. 16), from the outside. The parameter storage unit 1010 stores the image processing parameters obtained by the external information obtaining unit 380. Specifically, the external information obtaining unit 380 obtains at least one of the specific parameter and the non-specific parameter, from the outside. The parameter storage unit 1010 stores at least one of the specific parameter and the non-specific parameter which have been obtained by the external information obtaining unit 380.

Figures 17, 18:
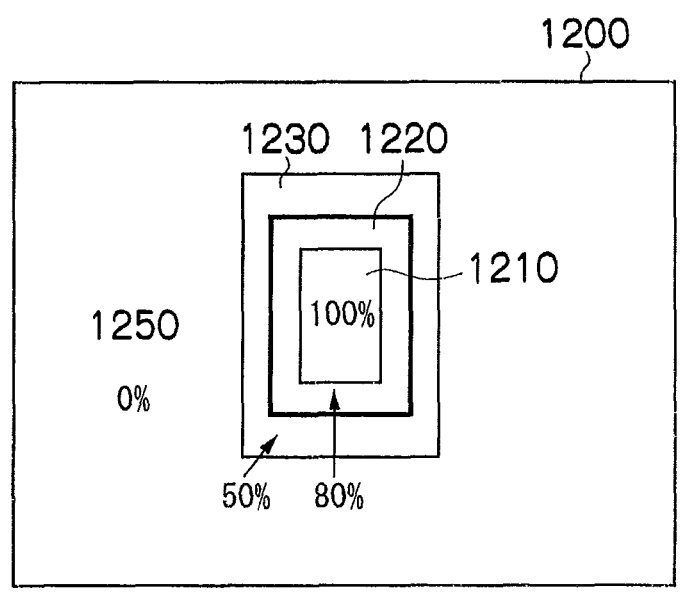
FIG. 17 is a diagram illustrating an example of parameters stored in a parameter storage unit 1010 in FIG. 16, in a table format.
FIG. 18 is a diagram illustrating an example of weighting a specific parameter.

FIG. 17 illustrates an example of the parameters stored in the parameter storage unit 1010, in a table format. The parameter storage unit 1010 stores specific parameters A0, A1 . . . which are the image processing parameters for the person's face, so as to be associated with the directions of the face. The specific parameters A0 and A1 have been previously calculated by the prior learning using images of corresponding directions of the face as the learning images.

Here, a process for calculating the specific parameter A by the prior learning will be described with a resolution enhancement process with weighted addition of pixel values of the peripheral pixels around the noted pixel, as an example. Here, it is assumed that a pixel value y of the noted pixel is calculated by the weighted addition of pixel values $x_i$ of n peripheral pixels (where i=1 to n). In other words, it is assumed that $y=\Sigma(w_i \times i)$. Here, $\Sigma$ denotes addition for i. $w_i$ is a weight coefficient for the pixel values $x_i$ of the peripheral pixels, and the weight coefficient $w_i$ becomes the specific parameter A which should be calculated by the prior learning.

It is assumed that m face images in which images of a face in a particular direction have been picked up are used as the learning images. If the pixel value of the noted pixel of a k-th (where k=1 to m) learning image is $y_k$, $y_k$ is represented as $y_k=\Sigma w_i \times k_i$. In this case, the weight coefficient $w_i$ can be calculated by a calculation process such as a least square method. For example, $w_i$ which substantially minimizes the square of a vector in which a k-th component $e_k$ is represented as $e_k=y_k-\Sigma(w_i \times k_i)$ can be calculated by the calculation process such as the least square method. The specific parameters A corresponding to respective face directions can be calculated by performing the above described process for calculating the specific parameter, for the face images in a plurality of face directions.

Moreover, the parameter storage unit 1010 stores a non-specific parameter B for the object which is not the person's face. The non-specific parameter B has been previously calculated by the prior learning using images of a wide variety of subjects as the learning images. It should be noted that the non-specific parameter B can be calculated by a prior learning process similar to that for the specific parameter A. For example, the non-specific parameter B can be calculated by using the images other than the person, instead of the face images, as the learning images, in a prior learning process for calculating the specific parameter A.

FIG. 18 illustrates an example of weighting the specific parameter. It is assumed that a region 1210 and a region 1220 within a bold line in an image 1200 have been detected as the feature region. The weight decision unit 1050 (see FIG. 16) decides a specific parameter weight coefficient of 100% and a non-specific parameter weight coefficient of 0%, for the region 1210 at a more inner position in this feature region. Moreover, the specific parameter weight coefficient of 80% and the non-specific parameter weight coefficient of 20% are decided for the region 1220 which is near the non-feature region and outside the region 1210 within the feature region (inside a bold line frame).

Moreover, for regions outside the feature region, the specific parameter weight coefficient of 50% and the non-specific parameter weight coefficient of 50% are decided for a region 1230 near the feature region. In addition, the specific parameter weight coefficient of 0% and the non-specific parameter weight coefficient of 100% are decided for a region 1250 at a further outer position.

In this way, the weight decision unit 1050 (see FIG. 16) decides the weights for an image in a region at a more inner position in the specific object region in the input image, so that the specific parameter is weighted more. Moreover, the weight decision unit 1050 decides the weights for an image in the non-specific object region which is the region other than the specific object region, so that the specific parameter is weighted more for the region which is closer to the specific object region. In this way, the weight decision unit 1050 decreases the specific parameter weight coefficients in stages from the center of the feature region toward the outside, from the feature region toward the non-feature region. Moreover, the weight decision unit 1050 may sequentially decrease the weight coefficients in proportion to a distance from the center of the feature region, a distance from a surrounding region around the feature region, or the like, in addition to decreasing the weight coefficients in stages. For example, the weight decision unit 1050 may decide the weight coefficients having values decreasing in a manner of exponentiation or exponentially with respect to a distance x. For example, the values of the weight coefficients are decreased with respect to the distance x according to a function such as 1/x, 1/x2 or e−x.

It should be noted that the weight decision unit 1050 may control the weight coefficients depending on detection reliability as the feature region. Specifically, the weight decision unit 1050 decides the weights for the image in the specific object region having larger detection reliability as the specific object region, so that the specific parameter is weighted more.

If it is assumed that the specific object has existed in a region which has not been detected as the feature region, it may be impossible to discriminate whether or not the specific object exists even if the image quality enhancement is applied to the region by using the general-purpose non-specific parameter. According to the image processing unit 330, the image quality enhancement process which has an effect of the specific parameter for the specific object is performed even to the region which has not been detected as the feature region. Therefore, it may be possible to easily discriminate whether or not the specific object exists, from the image applied with the image quality enhancement.

It should be noted that the specific parameter may be an image processing parameter in which the plurality of image processing parameters described in connection with FIG. 17 have been synthesized. For example, it is assumed that an image of a person's face in profile by 15° from a frontal face is included in the detected feature region. In this case, the weight decision unit 1050 decides the weight coefficient of 25% for the specific parameter A0, and decides the weight coefficient of 75% for the specific parameter A1. Then, the parameter generation unit 1060 generates a composite parameter in which the specific parameter A0 and the specific parameter A1 are synthesized by using the weight coefficients of 25% and 75%, respectively. Then, the image generation unit 1070 performs the image quality enhancement by using an image processing parameter obtained by weighting the composite parameter generated by a parameter synthesizing unit, and the non-specific parameter, in percentages illustrated in FIG. 18.

For example, if an image processing parameter (the specific parameter or the non-specific parameter) for the image quality enhancement with the weighted addition of the peripheral pixels is used, the parameter generation unit 1060 may perform the weighted addition for the weight coefficient of the image processing parameter by using the weight coefficient decided by the weight decision unit 1050, and calculate a composite parameter represented by an obtained weight coefficient. Examples of image processing parameters for which the addition is enabled can include the spatial-frequency component in the spatial-frequency domain or the pixel data itself (for example, image data of the high-frequency component), in addition to the weight coefficient.

In addition, if the image quality enhancement process is represented by a vector operation, a matrix operation or a tensor operation for a feature amount vector or the like, the parameter generation unit 1060 may generate the composite parameter by the weighted addition or multiplication for a vector, a matrix, a tensor, an n-dimensional mixture normal distribution, or an n-dimensional mixture multinomial distribution, as the image processing parameter. It should be noted that, here, n is assumed to be an integer equal to or larger than 1. For example, blurring due to synthesis on a vector which cannot be represented by a scalar may be able to be reduced by performing vector interpolation in a feature vector space. For example, calculation for setting a sum of a feature vector in which a feature vector in a direction of 0° is multiplied by a coefficient of 0.25, and a feature vector in which a feature vector in a direction of 20° is multiplied by a coefficient of 0.75, as a feature vector in a direction of 15° can be shown as an example. Moreover, the blurring due to the synthesis may be able to be further reduced by performing interpolation on a locality preserving projection (LPP) space as described above. It should be noted that the parameter generation unit 1060 can calculate the composite parameter from the specific parameter and the non-specific parameter. Moreover, the parameter generation unit 1060 can also calculate the composite parameter from a plurality of the different specific parameters.

If the image generation unit 1070 generates the high-quality image by using the specific parameter and the non-specific parameter, the image generation unit 1070 may generate the high-quality image by adding image information obtained by performing image processing using the specific parameter, and image information obtained by performing image processing using the non-specific parameter, by using the weight coefficients decided by the weight decision unit 1050. In addition, the image generation unit 1070 may also generate the high-quality image by performing the image processing using the non-specific parameter, for the image information obtained by performing the image processing using the specific parameter. A similar process is applicable to the image quality enhancement process using a plurality of the specific parameters. Examples of the image data as herein referred to can include the pixel value itself, a feature amount vector in a feature amount space, a matrix, an n-dimensional mixture normal distribution, an n-dimensional mixture multinomial distribution, and the like. For example, the blurring due to the synthesis on the vector which cannot be represented by the scalar may be able to be reduced by performing the vector interpolation in the feature vector space.

In the image quality enhancement process described in FIGS. 17 and 18, the plurality of image processing parameters used in a case where the image quality enhancement is applied to the feature region are selected by the parameter selection unit 1040, based on the direction of the face of the person specified from the image within the feature region. In addition, the image generation unit 1070 uses the plurality of image processing parameters selected by the parameter selection unit 1040, to generate a single image applied with the image quality enhancement.

In addition, the image generation unit 1070 may generate each of a plurality of images in which the image quality enhancement is applied to the feature region, from each of a plurality of combinations of the image processing parameters stored in the image generation unit 1070. Then, the image generation unit 1070 may generate an image which is most similar to the image within the feature region, in the obtained plurality of images, as the high-quality image in which the image quality enhancement is applied to the feature region.

For example, the image generation unit 1070 generates an image in which the image quality enhancement is applied to the image in the feature region, by using a composite parameter generated from the specific parameter A0 corresponding to the direction of 0° and the specific parameter A1 corresponding to the direction of 20°. The image generation unit 1070 further generates one or more images in which the image quality enhancement is applied to the image in the feature region, by using one or more composite parameters generated from other one or more combinations of the specific parameters.

Then, the image generation unit 1070 compares each of the generated plurality of images with the image within the feature region to calculate a degree of coincidence of image content. The image generation unit 1070 decides the image from which the highest degree of coincidence is obtained, in the generated plurality of images, as the high-quality image.

It should be noted that if the plurality of images in which the image quality enhancement is applied to the image in the feature region are generated, the image generation unit 1070 may apply the image quality enhancement to the image in the feature region by using each of a plurality of composite parameters based on a plurality of sets of predefined specific parameters. In this case, the parameter selection unit 1040 may select the plurality of sets of predefined specific parameters without performing a process for specifying the direction of the face by the attribute specifying unit 1020.

In addition, the parameter selection unit 1040 may select a plurality of sets of the specific parameters based on the direction of the face of the person specified from the image within the feature region. For example, the parameter selection unit 1040 stores information specifying the plurality of sets of the specific parameters and information specifying the direction of the face of the person, so as to be associated with each other, and may select the plurality of sets of the specific parameters stored so as to be associated with the direction of the face of the person specified from the image within the feature region. Then, the plurality of images in which the image quality enhancement is applied to the image in the feature region may be generated by applying the image quality enhancement to the image within the feature region by using each of the plurality of composite parameters based on the selected plurality of sets.

Moreover, if the plurality of images in which the image quality enhancement is applied to the image in the feature region are generated, the image generation unit 1070 may apply the image quality enhancement to the image in the feature region by using each of the plurality of specific parameters. Then, the image generation unit 1070 may generate an image which is most similar to the image within the feature region, in the obtained plurality of images, as the high-quality image in which the image quality enhancement is applied to the feature region. Also in this case, the parameter selection unit 1040 may select the plurality of predefined specific parameters without performing the process for specifying the direction of the face by the attribute specifying unit 1020, and the parameter selection unit 1040 may select the plurality of specific parameters based on the direction of the face of the person specified from the image within the feature region.

As described in connection with FIG. 17, an image processing parameter (specific parameter) which applies the image quality enhancement to a face image in a particular face direction can be calculated from a learning image of the particular face direction. The image processing parameters are also similarly calculated for other of the plurality of face directions, respectively, and thereby, the image processing parameter corresponding to each of the plurality of face directions can be calculated. Then, the parameter storage unit 1010 previously stores each calculated image processing parameter so as to be associated with the corresponding face direction. It should be noted that while the image processing parameter for applying the image quality enhancement to the face image may be an image processing parameter for applying the image quality enhancement to the entire face, the image processing parameter for applying the image quality enhancement to the face image may also be an image processing parameter for applying the image quality enhancement to at least a part of the object included in the face image, such as an image of an eye, an image of a mouth, an image of a nose, or an image of an ear.

The face direction is an example of the direction of the subject, and a plurality of image processing parameters corresponding to a plurality of the directions of the subject, respectively, can also be calculated for other directions of the subject, similarly to the face direction. If the subject is the person, examples of the direction of the subject can include a direction of a human body, and more specifically, examples of the direction of the human body can include a direction of the body, a direction of a hand, and the like. Moreover, also if the subject is other than the person, the plurality of image processing parameters for applying the image quality enhancement to the subject images in which images of the subject in the plurality of directions have been picked up, respectively, can be calculated similarly to the face image.

The direction of the subject is an example of the state of the subject, and the state of the subject can be further classified by the person's facial expression. In this case, the plurality of image processing parameters stored in the parameter storage unit 1010 apply the image quality enhancement to face images with respective different particular facial expressions, respectively. For example, the plurality of image processing parameters stored in the parameter storage unit 1010 apply the image quality enhancement to the face of the person in each of states of delight, anger, sorrow and pleasure, the face of the person in a state of tension, and the like, respectively.

Moreover, the state of the subject can be classified by the person's behavior. In this case, the plurality of image processing parameters stored in the parameter storage unit 1010 apply the image quality enhancement to images of the person in states of respective different particular behaviors. For example, the plurality of image processing parameters stored in the parameter storage unit 1010 apply the image quality enhancement to an image of the person in a state of running, an image of the person in a state of walking at a quick pace, an image of the person in a state of being about to run, an image of the person in a state of searching for something, and the like, respectively.

Moreover, the state of the subject can be classified by the person's posture. In this case, the plurality of image processing parameters stored in the parameter storage unit 1010 apply the image quality enhancement to images of the person in states of respective different particular postures, respectively. For example, the plurality of image processing parameters stored in the parameter storage unit 1010 apply the image quality enhancement to an image of the person in a state of bending down, an image of the person in a state of putting the hand in a pocket, an image of the person in a state of folding aims, an image of the person in a state where the direction of the face and the direction of the body do not coincide with each other, and the like, respectively.

Moreover, the state of the subject can be classified by the person's clothes. In this case, the plurality of image processing parameters stored in the parameter storage unit 1010 apply the image quality enhancement to images of the person in states of wearing respective different particular clothes, respectively. For example, the plurality of image processing parameters stored in the parameter storage unit 1010 apply the image quality enhancement to an image of the person wearing eye glasses, an image of the person wearing sunglasses, an image of the person wearing a mask, an image of the person wearing a hat, and the like, respectively.

As described above, the subject is classified into the plurality of attributes correspondingly to a plurality of the states of the subject. In addition, the subject can be classified into the plurality of attributes by the kind of the subject. Examples of the kind of the subject can include the race of the person. Examples of the race of the person can include regionally classified races such as the Asian race and the European race, races classified in terms of physical anthropology, and the like. In this case, the plurality of image processing parameters stored in the parameter storage unit 1010 apply the image quality enhancement to images of persons classified into respective corresponding races, respectively.

Moreover, the kind of the subject can be classified by the sex of the person, such as male or female. In this case, the plurality of image processing parameters stored in the parameter storage unit 1010 apply the image quality enhancement to images of persons of corresponding sexes, such as an image of a male or a female. Moreover, the kind of the subject can be classified by an age group of the person. In this case, the plurality of image processing parameters stored in the parameter storage unit 1010 apply the image quality enhancement to images of persons in corresponding generations, such as an image of a person in his teens, and an image of a person in his twenties.

The attributes of the subject image are defined by the kind of the subject, the plurality of states of the subject, or a combination thereof as illustrated above. Then, the parameter storage unit 1010 previously stores the image processing parameters for applying the image quality enhancement to the subject images belonging to the respective attributes, so as to be associated with the respective defined attributes. The image processing parameters to be stored by the parameter storage unit 1010 can be calculated by a method similar to the method of calculating the image processing parameters for the respective face directions. For example, if the attributes have been defined in terms of the facial expressions, an image processing parameter for applying the image quality enhancement to an image of a smiling face can be calculated by performing the prior learning using a plurality of images in which images of smiling faces have been picked up, as the learning images. Also for images of other facial expressions such as an image of an angry face, the plurality of image processing parameters for applying the image quality enhancement to the face images of the respective facial expressions, respectively, can be calculated by similarly performing the prior learning, respectively. Also for the respective attributes defined in terms of the behavior, the posture, the clothes, the race, the sex, the age and the like, the image processing parameters can be similarly calculated.

The attribute specifying unit 1020 can specify the attributes of the subject image, for example, by applying a classifier which has been previously calculated by boosting with the AdaBoost or the like, to the subject image. For example, a plurality of the face images in which the images of the face in the particular direction have been picked up are used as the teacher images, and the weak classifiers are integrated by a boosting process to generate the classifier. Depending on whether an identification result is true or false, which is obtained when the subject image is applied to the generated classifier, it can be determined whether or not the subject image is the face image in the particular face direction. For example, if the identification result of true is obtained, it can be determined that the inputted subject image is the face image in the particular face direction.

Also for other of the plurality of face directions, the plurality of classifiers corresponding to the respective face directions can be generated by similarly generating the classifiers by the boosting process. The attribute specifying unit 1020 applies the plurality of classifiers to the subject image, respectively, and can specify the face direction based on whether the identification result obtained from each classifier is true or false. In addition to the face direction, one or more other attributes defined in terms of the facial expression, the sex and the like can also be specified by applying the classifiers generated for the respective attributes by the boosting process, respectively. The attribute specifying unit 1020 can specify the attribute by applying the classifier learned for each attribute by various methods such as linear discrimination analysis and the Gaussian mixture model, in addition to the learning with the boosting, to the subject image.

Configuration Example of Display Device 260

Figure 19:
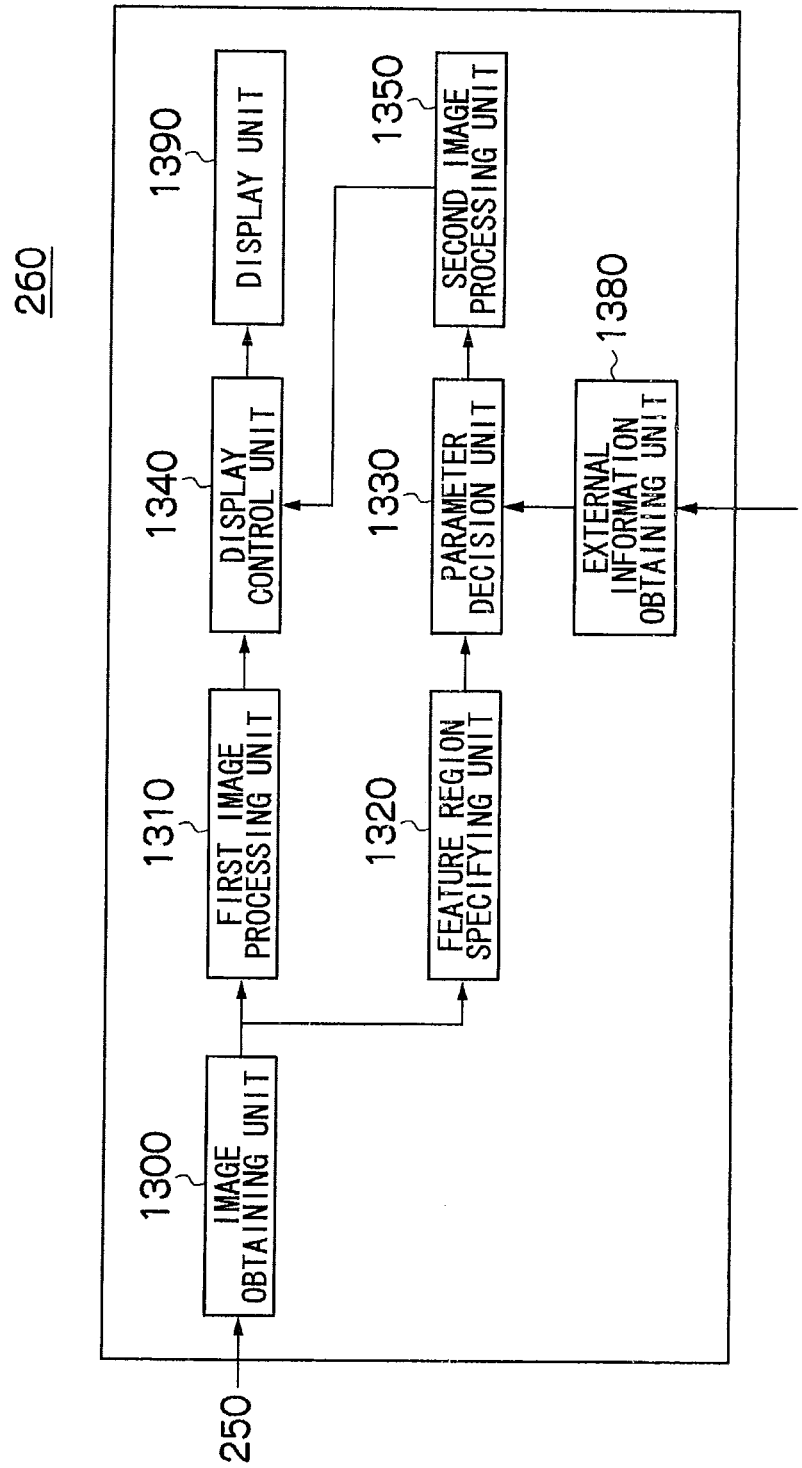
FIG. 19 is a block diagram illustrating a configuration example of a display device 260 in FIG. 7.

FIG. 19 illustrates an example of a block configuration of the display device 260 in FIG. 7. As illustrated in FIG. 19, the display device 260 has an image obtaining unit 1300, a first image processing unit 1310, a feature region specifying unit 1320, a parameter decision unit 1330, a display control unit 1340, a second image processing unit 1350, an external information obtaining unit 1380, and a display unit 1390.

The image obtaining unit 1300 obtains the input image. The input image as herein referred to may be the frame image included in the moving image received from the image processing apparatus 250. The first image processing unit 1310 generates a predetermined-quality image in which the image quality enhancement is applied to the input image, by using a predefined image processing parameter. For example, if the first image processing unit 1310 performs the resolution enhancement, the first image processing unit 1310 generates the predetermined-quality image by using an image processing parameter of a system requiring a smaller amount of calculation than a predefined value, such as a simple interpolation enlargement process.

The display control unit 1340 displays the predetermined-quality image generated by the first image processing unit 1310, on the display unit 1390. In this way, the display unit 1390 displays the predetermined-quality image.

The feature region specifying unit 1320 specifies the plurality of feature regions in the input image. The feature region specifying unit 1320 may specify the plurality of feature regions in the input image, in a state where the display unit 1390 displays the predetermined-quality image. It should be noted that the image processing apparatus 250 may attach the information specifying the feature regions to the moving image as attached information, and transmits the attached information to the display device 260. The feature region specifying unit 1320 may specify the plurality of feature regions by extracting the information specifying the feature regions, from the information attached to the moving image obtained by the image obtaining unit 1300.

The parameter decision unit 1330 decides an image processing parameter for further applying the image quality enhancement to the image in each of the plurality of feature regions, for each of the plurality of feature regions. For example, the parameter decision unit 1330 decides an image processing parameter for applying the image quality enhancement to the image in each of the plurality of feature regions at a different strength, for each of the plurality of feature regions. "Applying the image quality enhancement at a different strength" may mean the image quality enhancement with a different amount of calculation, the image quality enhancement with the different amount of calculation per unit area, the image quality enhancement in a system of the image quality enhancement requiring the different amount of calculation, and the like.

The second image processing unit 1350 uses the image processing parameter decided by the parameter decision unit 1330, to generate a plurality of high-quality feature region images in which the image quality enhancement is applied to the images in the plurality of feature regions, respectively. The display control unit 1340 displays the plurality of feature region images in the plurality of feature regions in the predetermined-quality image displayed by the display unit 1390. In this way, at a stage where the high-quality image is generated, the display control unit 1340 causes the high-quality image to be displayed instead of the predetermined-quality image which has been already displayed by the display unit 1390. Since the display unit 1390 quickly generates and displays the predetermined-quality image, a user can observe surveillance video having a certain image quality, substantially without any delay.

The parameter decision unit 1330 may decide the image processing parameter for each of the plurality of feature regions, based on the degree of importance of the image in each of the plurality of feature regions. Information indicating the degree of importance may be attached to the above described attached information. Moreover, the degree of importance may be previously defined depending on the kind of the subject in the feature region. The degree of importance for each kind of the subject may be set by the user observing the display unit 1390. The parameter decision unit 1330 decides an image processing parameter for applying the image quality enhancement to the feature region having a larger degree of importance at a greater strength. Consequently, the user can observe the image in which an important feature region has a higher image quality.

The parameter decision unit 1330 decides the image processing parameter for each of the plurality of feature regions, based on the feature type of the image in each of the plurality of feature regions. Moreover, the parameter decision unit 1330 may decide the image processing parameter for each of the plurality of feature regions, based on the type of the subject whose image has been picked up within the plurality of feature regions. In this way, the parameter decision unit 1330 may directly decide the image processing parameter depending on the type of the subject.

It should be noted that the parameter decision unit 1330 decides the image processing parameter based on throughput required for applying the image quality enhancement to the plurality of feature regions respectively in the second image processing unit 1350. Specifically, the parameter decision unit 1330 decides an image processing parameter for applying the image quality enhancement at a greater strength if smaller throughput is required.

For example, the parameter decision unit 1330 may decide an image processing parameter for performing the resolution enhancement at a greater strength if areas of the plurality of feature regions are smaller. Then, the second image processing unit 1350 uses the image processing parameter decided by the parameter decision unit 1330, to generate the plurality of high-quality feature region images in which the resolution enhancement is applied to the images in the plurality of feature regions, respectively. Moreover, the parameter decision unit 1330 may decide an image processing parameter for performing the image quality enhancement at the greater strength if the number of pixels in the plurality of feature regions is smaller.

Moreover, the parameter decision unit 1330 decides the image processing parameter based on possible throughput which is throughput allowed in the second image processing unit 1350. Specifically, the parameter decision unit 1330 may decide an image processing parameter for performing the image quality enhancement at the greater strength if the possible throughput is smaller.

Consequently, a degree of the image quality enhancement can be controlled depending on an amount of calculation which can be processed by the second image processing unit 1350. Consequently, it may be possible to prevent a load on the display unit 1390 from being overload due to the image quality enhancement process, and also prevent the display of the image from being delayed. If the display unit 1390 can process a large amount of calculation, the high-quality image is quickly generated and thus can be observed.

As described above, examples of the image quality enhancement can include the resolution enhancement. Specifically, the parameter decision unit 1330 decides the image processing parameter for applying the resolution enhancement to the image in each of the plurality of feature regions, for each of the plurality of feature regions. The second image processing unit 1350 uses the image processing parameter decided by the parameter decision unit 1330, to generate the plurality of high-quality feature region images in which the resolution enhancement is applied to the images in the plurality of feature regions, respectively. Here, "performing the resolution enhancement at the greater strength" includes performing the resolution enhancement in high precision, and generation of a high-quality image having a larger number of pixels.

In addition to the resolution enhancement, the examples of the image quality enhancement process can include the tone increasing, the color increasing process, the noise reduction, the artifact reduction, the blurring reduction and the sharpening. Also for these various kinds of the image quality enhancement, similar to the resolution enhancement, the parameter decision unit 1330 can decide the image processing parameters for performing the various kinds of the image quality enhancement, for each of the plurality of feature regions, and the second image processing unit 1350 can use the image processing parameters decided by the parameter decision unit 1330, to generate the plurality of high-quality feature region images in which the various kinds of the image quality enhancement have been applied to the images in the plurality of feature regions, respectively.

It should be noted that, as described above, the image obtaining unit 1300 may obtain the plurality of moving-image component images included in the moving image, as the input images. The parameter decision unit 1330 decides an image processing parameter for increasing the frame rate of each of the plurality of feature regions, for each of the plurality of feature regions. Then, the second image processing unit 1350 may use the image processing parameter decided by the parameter decision unit 1330, to generate the plurality of high-quality feature region images whose frame rates have been increased.

The parameter decision unit 1330 decides the image processing parameter based on the frame rate of the moving image. Specifically, the parameter decision unit 1330 may decide an image processing parameter for performing the image quality enhancement at the greater strength if the frame rate of the moving image is smaller. The second image processing unit 1350 may generate the moving image applied with the image quality enhancement, by using the decided image processing parameter to apply the image quality enhancement to the input images, respectively. It should be noted that, also for the image quality enhancement performed by the second image processing unit 1350, similar to the image quality enhancement performed by the image processing apparatus 250, concepts of the resolution enhancement, the color increasing, the tone increasing, the noise reduction, the artifact reduction for reducing the artifacts such as the block noise and the mosquito noise, the blurring reduction and the sharpening may be included, and the second image processing unit 1350 can generate the image applied with the image quality enhancement by performing these processes.

In this way, the display device 260 can decide the strength of the image quality enhancement, based on a data amount of the image to be applied with the image quality enhancement, and an amount of calculation which can be assigned to the image quality enhancement process. According to the display device 260, an image having a certain quality can be quickly provided to the user, and also, the display of the image applied with the image quality enhancement process can be prevented from being significantly delayed. Consequently, the display device 260 can prevent the overload due to the image quality enhancement process, and can smoothly reproduce the moving image provided by the image processing apparatus 250.

It should be noted that the external information obtaining unit 1380 obtains a decision condition for deciding the image processing parameter for each feature region, from the outside of the display device 260. The parameter decision unit 1330 decides the image processing parameter for each of the plurality of feature regions, based on the decision condition obtained by the external information obtaining unit 1380. Examples of the decision condition can include conditions having the degree of importance of the feature region, the feature type of the feature region, the required throughput, the area of the feature region, the number of pixels in the feature region, the possible throughput and the like, as parameters.

Figure 20:
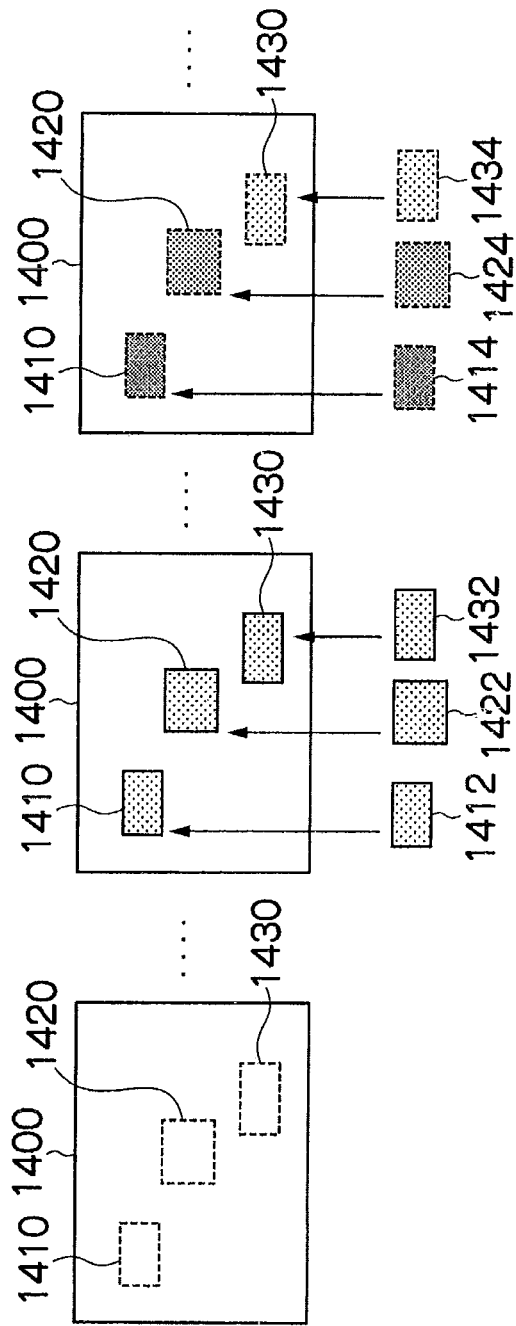
FIG. 20 is a diagram illustrating an example of a display area for the image.

FIG. 20 illustrates an example of a display area 1400 for the image. The display area 1400 is assumed to be a region in which the input image is displayed by the display unit 1390. Here, it is assumed that three feature regions have been specified from the input image. It is assumed that the images in these feature regions are displayed in a feature region area 1410, a feature region area 1420, and a feature region area 1430, within the display area 1400.

If the image obtaining unit 1300 described in FIG. 19 obtains the input image, the display control unit 1340 directly displays the obtained input image in the display area 1400 on the display unit 1390.

In a state where the input image is displayed, the second image processing unit 1350 applies a predetermined resolution enhancement process requiring the amount of calculation smaller than a predefined value, such as simple interpolation, to the image in each feature region, to generate the predetermined-quality image of the image in each feature region (first resolution enhancement stage). In this first resolution enhancement stage, the strength of the resolution enhancement does not depend on the data amount of the image such as the number of pixels and the frame rate in the feature region, the degree of importance of the feature region, the type of the subject, as well as an allowable calculation amount in the second image processing unit 1350, and the like, and the second image processing unit 1350 applies the resolution enhancement process at a predetermined strength. It should be noted that an amount of calculation required for applying the resolution enhancement process to the entire input image at the predetermined strength may be constantly assigned to the second image processing unit 1350.

When the first resolution enhancement stage is completed, and a predetermined-quality image 1412, a predetermined-quality image 1422, and a predetermined-quality image 1432 are generated, the display control unit 1340 displays the predetermined-quality image 1412, the predetermined-quality image 1422, and the predetermined-quality image 1432, in the feature region area 1410, the feature region area 1420, and the feature region area 1430 corresponding to the respective images.

In a state where the predetermined-quality image 1412, the predetermined-quality image 1422, and the predetermined-quality image 1432 are displayed, the second image processing unit 1350 performs the resolution enhancement process at the strength decided for each feature region by the parameter decision unit 1330, and generates the high-quality image of the image in each feature region (second resolution enhancement stage). In this second resolution enhancement stage, the strength of the resolution enhancement is the strength decided by the parameter decision unit 1330, and depends on the data amount of the image such as the number of pixels and the frame rate in the feature region, the degree of importance of the feature region, the type of the subject, as well as the allowable calculation amount in the second image processing unit 1350.

When the second resolution enhancement stage is completed, and a high-quality image 1414, a high-quality image 1424 and a high-quality image 1434 are generated, the display control unit 1340 displays the high-quality image 1414, the high-quality image 1424 and the high-quality image 1434, in the feature region area 1410, the feature region area 1420, and the feature region area 1430 corresponding to the respective images.

In this way, since the second image processing unit 1350 performs the resolution enhancement at the strength depending on a current load amount and the amount of calculation required for the image quality enhancement, the high-quality image can be quickly provided to the user to the extent possible.

Examples of Other Forms of Image Processing System

Figure 21:
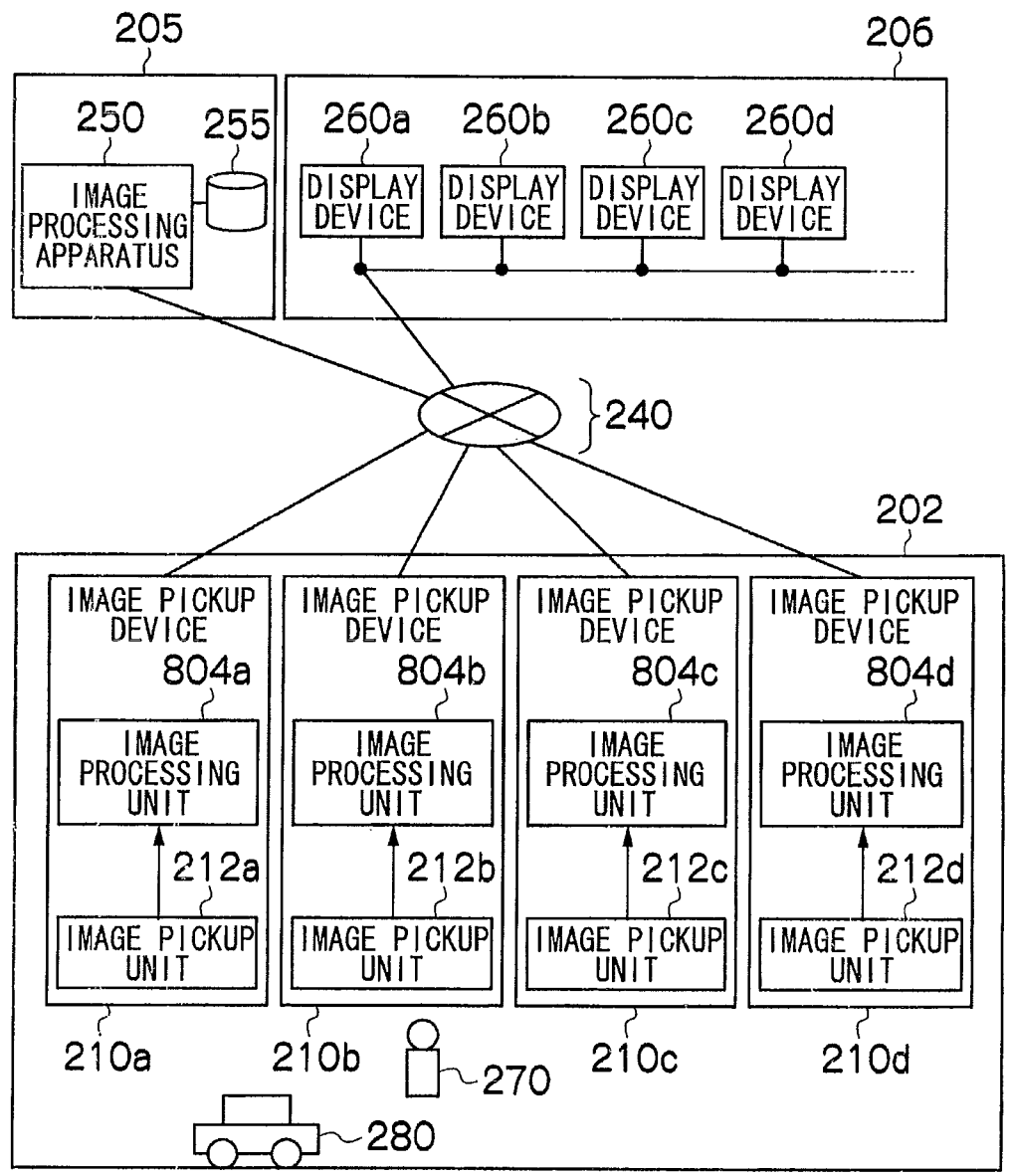
FIG. 21 is a configuration diagram illustrating an example of the image processing system according to another embodiment.

FIG. 21 illustrates an example of an image processing system 201 according to another embodiment. A configuration of the image processing system 201 in the present embodiment is the same as the configuration of the image processing system 200 described in FIG. 7, except that the image pickup devices 210a-d have image processing units 804a-d (hereinafter collectively referred to as "image processing unit 804"), respectively.

The image processing unit 804 has components included in the image processing apparatus 220 described in FIG. 7, except the image obtaining unit 222. In addition, a function and an operation of each component included in the image processing unit 804 may be generally the same as a function and an operation of each component included in the image processing apparatus 220, except that each component included in the image processing unit 804 processes the moving image picked up by the image pickup unit 212, while each component included in the image processing apparatus 220 processes the moving image obtained by the expansion process performed by the compressed moving image expansion unit 224. Also in the image processing system 201 in such a configuration, effects similar to the effects described in connection with the image processing system 200 in FIGS. 7 to 20 can be obtained.

The image processing unit 804 may obtain the moving image including the plurality of picked-up images represented in the RAW format, from the image pickup unit 212, and compress the plurality of picked-up images represented in the RAW format, which are included in the obtained moving image, directly in the RAW format. It should be noted that the image processing unit 804 may detect one or more feature regions from the plurality of picked-up images represented in the RAW format. Moreover, the image processing unit 804 may compress the moving image including the plurality of picked-up images compressed in the RAW format. It should be noted that the image processing unit 804 can compress the moving image by a compression method described as the operations of the image processing apparatus 220 in connection with FIGS. 7 to 12. Moreover, the image processing apparatus 250 can obtain the plurality of picked-up images represented in the RAW format, by expanding the moving image obtained from the image processing unit 804. The image processing apparatus 250 enlarges each of the plurality of picked-up images represented in the RAW format, which have been obtained by the expansion, for each region, and applies a synchronization process for each region. At this time, the image processing apparatus 250 may apply the synchronization process in higher precision in the feature region than in the region other than the feature region.

It should be noted that the image processing apparatus 250 may apply the super-resolution processing to the image in the feature region in the picked-up image obtained by the synchronization process. The image processing method according to the present invention is applicable as the super-resolution processing in the image processing apparatus 250.

Moreover, the image processing apparatus 250 may apply the super-resolution processing to each object included in the feature region. For example, if the feature region includes the face image of the person, the image processing apparatus 250 applies the super-resolution processing to each face part (for example, the eye, the nose, the mouth or the like) as an example of the object. In this case, the image processing apparatus 250 previously stores learning data such as a model as described in Japanese Patent Application Laid-Open No. 2006-350498, for each face part (for example, the eye, the nose, the mouth or the like). Then, the image processing apparatus 250 may use the learning data selected for each face part included in the feature region, to apply the super-resolution processing to an image of each face part.

The learning data such as the model may be stored for each combination of a plurality of the facial expressions, the plurality of face directions, and a plurality of illumination conditions. The facial expressions include faces in the respective states of delight, anger, sorrow and pleasure, and a straight face, and the face directions include a front direction, an upper direction, a lower direction, a right direction, a left direction and a back direction. The illumination conditions include conditions of illumination intensity and an illumination direction. The image processing apparatus 250 may apply the super-resolution processing to the face image by using the learning data corresponding to the combination of the facial expression, the face direction and the illumination condition.

The facial expression and the face direction can be specified based on image content of the face image included in the feature region. Moreover, the facial expression can be specified by a shape of the mouth and/or the eye, and the face direction can be specified by a positional relationship among the eye, the mouth, the nose and the ear, or the like. The illumination intensity toward the face and the illumination direction can be specified based on the image content of the face image, such as a position and a size of a shadow. The facial expression, the face direction and the illumination condition may be specified in the image processing unit 804, and the facial expression, the face direction and the illumination condition which have been specified may be transmitted so as to be associated with the image, from the output unit 236. The image processing apparatus 250 may apply the super-resolution processing by using the learning data corresponding to the facial expression, the face direction and the illumination condition which have been received from the output unit 236.

Moreover, as the learning data such as the model, a model of each face part can be used in addition to a model representing the entire face. In addition, a model of the face of each sex and/or race can be used. The model is not limited to the person, and the model can be stored for each kind of the object to be monitored, such as a vehicle or a ship.

It should be noted that, also in the configuration of the image processing system 200 described in connection with FIGS. 7 to 27, the image processing apparatus 250 or the display device 260 can apply the above described super-resolution processing as the image quality enhancement process, to the image in the feature region. Moreover, in the image processing system 200 and the image processing system 201, the compression unit 232 can also further compress the picked-up image by representing the image by using a principal component vector and the weight coefficient, similarly to the above described image processing apparatus 220.

The operations as the image processing systems 200 and 201 have been described above with the monitoring system as the example. As other uses of the present invention, the present invention is applicable to the image quality enhancement process and the coding for a document scanned by a scanner device such as a duplicating machine. For example, if respective regions of a character, a drawing, a table, a photograph and the like are regarded as the feature regions, the image quality enhancement process such as the above described super-resolution processing is applicable as the resolution enhancement process for these regions. Moreover, the feature region detection process and the compression process as described above are applicable to the detection and the coding of these feature regions. Similarly, also in the endoscope system, the feature region detection process, the image quality enhancement process and the compression process as described above are applicable to the detection, the image quality enhancement and the coding of parts in the body.

[Variation 1]

In the above described image processing systems 200 and 201, while the example has been described in which the plurality of the image pickup devices 210*a-d* are included, the number of the image pickup devices 210 is not particularly limited, and may be one. Moreover, the number of the display devices 260 is not particularly limited either, and may be one.

[Variation 2]

In the above described image processing systems 200 and 201, the feature region has been specified from the picked-up image (the frame image or the field image) in the moving image data, which, however, is not limited to the moving image data, and the specification is also applicable to still image data. Of course, the above described first embodiment is also applicable to both the moving image data and the still image data.

[Variation 3]

In the above described image processing systems 200 and 201, while the configuration has been described in which the plurality of feature regions can be detected from a single picked-up image, the number of the feature regions in the image processing method according to the present invention is not particularly limited, and there may be one feature region for one picked-up image.

[Variation 4]

A device which obtains a learning image group is not limited to an aspect in which an image group of a pair of a high-quality image and a low-quality image is previously prepared, and the image pair may be obtained by giving only a high-quality image and generating a low-quality image from the high-quality image. For example, an aspect is also possible in which a processing device which performs a process for reducing the image quality (an image quality reduction processing device) is included in the image processing apparatus, a learning image having the high image quality is inputted, and thereby, the image quality of this learning image is reduced in the same apparatus so as to obtain a learning image pair.

Moreover, in such a case of the image processing systems 200 and 201 described in FIGS. 7 and 21, the learning image is not limited to an aspect in which the learning image is provided from a previously prepared database or the like, and learning content can also be updated based on an image which is actually captured by the image pickup device 210 or an image (partial image) cut out from the image, through the operations of the system. It is possible to attempt to further improve conversion precision by capturing an appropriate learning image and redoing the learning step, depending on the use of the system or an installation location of the image pickup device. Of course, also in the above described first embodiment, it is possible to attempt to further improve the conversion precision by capturing the appropriate learning image and redoing the learning step.

In the first and second embodiments, the applications and the variations according to the present invention as described above, constituent features can be changed, added or deleted in a range not deviating from the gist of the present invention.

What is claimed is:

1. An image processing method, comprising:
   a setting step of setting interpolation filter coefficients which are used in an interpolation calculation and generated from a high-frequency/high-quality image which is generated by extracting a high-frequency component of a high-quality image, and a high-frequency/low-quality image which is generated by extracting a high-frequency component of a low-quality image, the high-quality image and the low-quality image being in a pair having image qualities different from each other, as well as from a representative high-frequency image corresponding to any of a previously set number of classes into which the high-frequency/low-quality image is converted as representative values, and setting the representative high-frequency image;
   a high-frequency/low-quality image generation step of generating a high-frequency/low-quality image by extracting a high-frequency component of a low-quality image which is an input image in a restoration processing; and
   a high-quality-image generation step of generating a super-high-frequency component which does not exist in the high-frequency/low-quality image by applying an interpolation calculation process using the set interpolation filter coefficients and the set representative high-frequency image to each pixel of the generated high-frequency/low-quality image, and including the generated super-high-frequency component into the low-quality image to generate a high quality image which has an image quality higher than the low-quality image.

2. The image processing method according to claim 1, further comprising:
an obtaining step of obtaining the interpolation filter coefficients and the representative high-frequency image.

3. The image processing method according to claim 1, wherein
the interpolation filter coefficients and the representative high-frequency image are generated in a learning step using a learning image pair including a high-quality learning image and a low-quality learning image having image qualities different from each other, and
the learning step comprises:
a low-quality learning image generation step of generating the low-quality learning image from the high-quality learning image;
a high-frequency/low-quality learning image generation step of generating a high-frequency/low-quality learning image by extracting a high-frequency component of the low-quality learning image;
a representative high-frequency image generation step of generating a representative high-frequency image in which the generated high-frequency/low-quality learning image is converted into a same number of classes as a previously set number of learning representatives, as representative values;
a high-frequency/high-quality image generation step of generating the high-frequency/high-quality image by extracting the high-frequency component of the high-quality image; and
an interpolation filter coefficient generation step of generating the interpolation filter coefficients from the high-frequency/low-quality image, the high-frequency/high-quality image and the representative high-frequency image.

4. The image processing method according to claim 2, wherein
the interpolation filter coefficients and the representative high-frequency image are generated in a learning step using a learning image pair including a high-quality learning image and a low-quality learning image having image qualities different from each other, and
the learning step comprises:
a low-quality learning image generation step of generating the low-quality learning image from the high-quality learning image;
a high-frequency/low-quality learning image generation step of generating a high-frequency/low-quality learning image by extracting a high-frequency component of the low-quality learning image;
a representative high-frequency image generation step of generating a representative high-frequency image in which the generated high-frequency/low-quality learning image is converted into a same number of classes as a previously set number of learning representatives, as representative values;
a high-frequency/high-quality image generation step of generating the high-frequency/high-quality image by extracting the high-frequency component of the high-quality image; and
an interpolation filter coefficient generation step of generating the interpolation filter coefficients from the high-frequency/low-quality image, the high-frequency/high-quality image and the representative high-frequency image.

5. The image processing method according to claim 3, further comprising:
a number of learning representatives obtaining step of obtaining the number of learning representatives.

6. The image processing method according to claim 4, further comprising:
a number of learning representatives obtaining step of obtaining the number of learning representatives.

7. The image processing method according to claim 1, wherein
the high-quality-image generation step generates the super-high-frequency component which does not exist in the high-frequency/low-quality image, by executing an interpolation process represented in a form of a product of result of an interpolation coefficient calculation having at least the high-frequency/low-quality image included in a parameter and a weight coefficient having at least the high-frequency/low-quality image included in a parameter and represented as a multiple sum for the number of classes of at least any one of a Gaussian mixture distribution and a mixture multinomial distribution, by using the representative high-frequency image, the high-frequency/low-quality image, the interpolation filter coefficients, and a weight depending on the low-quality image which is the input image in the restoration processing for each class.

8. The image processing method according to claim 6, wherein
the high-quality-image generation step generates the super-high-frequency component which does not exist in the high-frequency/low-quality image, by executing an interpolation process represented in a form of a product of result of an interpolation coefficient calculation having at least the high-frequency/low-quality image included in a parameter and a weight coefficient having at least the high-frequency/low-quality image included in a parameter and represented as a multiple sum for the number of classes of at least any one of a Gaussian mixture distribution and a mixture multinomial distribution, by using the representative high-frequency image, the high-frequency/low-quality image, the interpolation filter coefficients, and a weight depending on the low-quality image which is the input image in the restoration processing for each class.

9. The image processing method according to claim 7, wherein the interpolation process is executed using following equation:

$$x' = \Sigma[(A'_i \cdot z' + B'_i) \times w_i'\{(z_i' - z'), \pi_i\}]$$

where x' is the super-high-frequency component which does not exist in the high-frequency/low-quality image, z'i is the representative high-frequency image, z' is the image vector of the high-frequency/low-quality image, A'i is an interpolation matrix of the class i corresponding to each process target pixel, B'i is an bias vector, $\pi_i$ is a contribution rate of each class of the target pixel, and wi is the weight.

10. The image processing method according to claim 8, wherein the interpolation process is executed using following equation:

$$x' = \Sigma[(A'_i \cdot z' + B'_i) \times w_i'\{(z_i' - z'), \pi_i\}]$$

where x' is the super-high-frequency component which does not exist in the high-frequency/low-quality image, z'i is the representative high-frequency image, z' is the image vector of the high-frequency/low-quality image, A'i is an interpolation matrix of the class i corresponding to each process target pixel, B'i is an bias vector, $\pi_i$ is a contribution rate of each class of the target pixel, and wi is the weight.

11. The image processing method according to claim 1, further comprising:
an enlargement step of applying an enlargement process to the low-quality image so as to cause the number of pixels in the low-quality image which is the input image in the restoration processing, to correspond to the number of pixels in the high-quality image after being restored; and
an addition step of adding a processing result in the enlargement step and a processing result in the high-quality-image generation step.

12. The image processing method according to claim 10, further comprising:
an enlargement step of applying an enlargement process to the low-quality image so as to cause the number of pixels in the low-quality image which is the input image in the restoration processing, to correspond to the number of pixels in the high-quality image after being restored; and
an addition step of adding a processing result in the enlargement step and a processing result in the high-quality-image generation step.

13. The image processing method according to claim 1, further comprising:
a normalization processing step of applying a normalization process to the generated high-frequency/low-quality image.

14. The image processing method according to claim 12, further comprising:
a normalization processing step of applying a normalization process to the generated high-frequency/low-quality image.

15. The image processing method according to claim 1, wherein
the high-quality-image generation step comprises an interpolation calculation process execution determining step of determining whether or not to execute the interpolation calculation process, depending on any of a size of a data value included in the high-frequency/low-quality image, a frequency of a data value exceeding a predetermined size, and an accumulated value of the data value exceeding the predetermined size.

16. The image processing method according to claim 14, wherein
the high-quality-image generation step comprises an interpolation calculation process execution determining step of determining whether or not to execute the interpolation calculation process, depending on any of a size of a data value included in the high-frequency/low-quality image, a frequency of a data value exceeding a predetermined size, and an accumulated value of the data value exceeding the predetermined size.

17. The image processing method according to claim 15, further comprising:
a threshold obtaining step of obtaining a threshold used for determining whether or not to execute the interpolation calculation process.

18. The image processing method according to claim 16, further comprising:
a threshold obtaining step of obtaining a threshold used for determining whether or not to execute the interpolation calculation process.

19. The image processing method according to claim 15, wherein
the addition step executes a process for adding the processing result in the high-quality-image generation step and the processing result in the enlargement step, when it is determined in the interpolation calculation process execution determining step that the interpolation calculation process in the high-quality-image generation step is executed.

20. The image processing method according to claim 16, wherein
the addition step executes a process for adding the processing result in the high-quality-image generation step and the processing result in the enlargement step, when it is determined in the interpolation calculation process execution determining step that the interpolation calculation process in the high-quality-image generation step is executed.

21. The image processing method according to claim 15, further comprising:
a switching step of selectively switching whether a processing result in the addition step is outputted or the processing result in the enlargement step is outputted,
wherein the switching step outputs the processing result in the addition step when it is determined in the interpolation calculation process execution determining step that the interpolation calculation process in the high-quality-image generation step is executed, and outputs the processing result in the enlargement step when it is determined in the interpolation calculation process execution determining step that the interpolation calculation process in the high-quality-image generation step is not executed.

22. The image processing method according to claim 16, further comprising:
a switching step of selectively switching whether a processing result in the addition step is outputted or the processing result in the enlargement step is outputted,
wherein the switching step outputs the processing result in the addition step when it is determined in the interpolation calculation process execution determining step that the interpolation calculation process in the high-quality-image generation step is executed, and outputs the processing result in the enlargement step when it is determined in the interpolation calculation process execution determining step that the interpolation calculation process in the high-quality-image generation step is not executed.

23. The image processing method according to claim 1, further comprising:
a feature region specifying step of specifying a feature region in the high-frequency/low-quality image; and
a compression step of compressing an image portion in the feature region at a first compression strength, while compressing a region other than the feature portion at a second compression strength higher than the first compression strength, in the high-frequency/low-quality image,
wherein the high-quality-image generation step applies the interpolation calculation process using the set interpolation filter coefficients and the set representative high-frequency image to at least the feature region.

24. The image processing method according to claim 18, further comprising:
a feature region specifying step of specifying a feature region in the high-frequency/low-quality image; and
a compression step of compressing an image portion in the feature region at a first compression strength, while compressing a region other than the feature portion at a second compression strength higher than the first compression strength, in the high-frequency/low-quality image, wherein the high-quality-image generation step applies the interpolation calculation process using the set interpolation filter coefficients and the set representative high-frequency image to at least the feature region.

25. The image processing method according to claim 20, further comprising:

a feature region specifying step of specifying a feature region in the high-frequency/low-quality image; and a compression step of compressing an image portion in the feature region at a first compression strength, while compressing a region other than the feature portion at a second compression strength higher than the first compression strength, in the high-frequency/low-quality image, wherein the high-quality-image generation step applies the interpolation calculation process using the set interpolation filter coefficients and the set representative high-frequency image to at least the feature region.

26. The image processing method according to claim 22, further comprising:

a feature region specifying step of specifying a feature region in the high-frequency/low-quality image; and a compression step of compressing an image portion in the feature region at a first compression strength, while compressing a region other than the feature portion at a second compression strength higher than the first compression strength, in the high-frequency/low-quality image, wherein the high-quality-image generation step applies the interpolation calculation process using the set interpolation filter coefficients and the set representative high-frequency image to at least the feature region.

27. An image processing method, comprising:

a low-quality learning image generation step of generating a low-quality learning image having an image quality lower than a high-quality image, from a high-quality learning image;

a high-frequency/low-quality learning image generation step of generating a high-frequency/low-quality learning image by extracting a high-frequency component of the low-quality learning image;

a representative high-frequency image generation step of generating a representative high-frequency image in which the generated high-frequency/low-quality learning image is converted into a same number of classes as a previously set number of learning representatives, as representative values;

a high-frequency/high-quality image generation step of generating a high-frequency/high-quality image by extracting a high-frequency component of the high-quality image; and an interpolation filter coefficient generation step of generating interpolation filter coefficients from the high-frequency/low-quality learning image, the high-frequency/high-quality image and the representative high-frequency image.

28. An image processing apparatus, comprising:

a setting device which sets interpolation filter coefficients which are used in an interpolation calculation and generated from a high-frequency/high-quality image which is generated by extracting a high-frequency component of a high-quality image, and a high-frequency/low-quality image which is generated by extracting a high-frequency component of a low-quality image, the high-quality image and the low-quality image being in a pair having image qualities different from each other, as well as from a representative high-frequency image corresponding to any of a previously set number of classes into which the high-frequency/low-quality image is converted as representative values, and sets the representative high-frequency image;

a high-frequency/low-quality image generation device which generates a high-frequency/low-quality image by extracting a high-frequency component of a low-quality image which is an input image in a restoration processing; and a high-quality-image generation device which generates a super-high-frequency component which does not exist in the high-frequency/low-quality image by applying an interpolation calculation process using the set interpolation filter coefficients and the set representative high-frequency image to each pixel of the generated high-frequency/low-quality image, and including the generated super-high-frequency component into the low-quality image to generate a high quality image which has an image quality higher than the low-quality image.

29. A non-transitory recording medium comprising a computer-readable code of a program which causes a computer to function as:

a setting device which sets interpolation filter coefficients which are used in an interpolation calculation and generated from a high-frequency/high-quality image which is generated by extracting a high-frequency component of a high-quality image, and a high-frequency/low-quality image which is generated by extracting a high-frequency component of a low-quality image, the high-quality image and the low-quality image being in a pair having image qualities different from each other, as well as from a representative high-frequency image corresponding to any of a previously set number of classes into which the high-frequency/low-quality image is converted as representative values, and sets the representative high-frequency image;

a high-frequency/low-quality image generation device which generates a high-frequency/low-quality image by extracting a high-frequency component of a low-quality image which is an input image in a restoration processing; and a high-quality-image generation device which generates a super-high-frequency component which does not exist in the high-frequency/low-quality image by applying an interpolation calculation process using the set interpolation filter coefficients and the set representative high-frequency image to each pixel of the generated high-frequency/low-quality image, and including the generated super-high-frequency component into the low-quality image to generate a high quality image which has an image quality higher than the low-quality image.

* * * * *